(12) United States Patent
Koga et al.

(10) Patent No.: US 6,242,117 B1
(45) Date of Patent: Jun. 5, 2001

(54) CERAMICS, CERAMIC BLANK, MANUFACTURING METHOD THEREOF, SANITARY EARTHENWARE AND MANUFACTURING METHOD THEREOF

(75) Inventors: Naoki Koga; Masaki Taneo; Motoshi Yasuda; Shozo Tateyama; Akio Matsumoto; Toshiya Nishikawa; Masato Otsu; Fumio Hongo, all of Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 09/101,740

(22) PCT Filed: Jan. 20, 1997

(86) PCT No.: PCT/JP97/00100

§ 371 Date: Jul. 16, 1998

§ 102(e) Date: Jul. 16, 1998

(87) PCT Pub. No.: WO97/26223

PCT Pub. Date: Jul. 24, 1997

(30) Foreign Application Priority Data

Jan. 18, 1996 (JP) .................................... 8-038635

(51) Int. Cl.$^7$ ...................................... B32B 9/00
(52) U.S. Cl. .................. 428/701; 428/426; 428/697; 428/699; 428/702; 501/32; 501/141; 264/651; 264/66

(58) Field of Search .................. 428/426, 697, 428/699, 701, 702; 501/32, 141; 264/651, 66

(56) References Cited

U.S. PATENT DOCUMENTS

| 4,717,695 | * | 1/1988 | Oda | 501/143 |
| 4,843,047 | * | 6/1989 | Oda | 501/143 |
| 5,372,976 | * | 12/1994 | Matsumoto et al. | 501/32 |

FOREIGN PATENT DOCUMENTS

| 0784036 | 7/1997 | (EP) . |
| 41-14814 | 8/1966 | (JP) . |
| 43-19866 | 8/1968 | (JP) . |
| 2-40015 | 9/1990 | (JP) . |
| 2-275753 | 11/1990 | (JP) . |
| 6-56516 | 3/1994 | (JP) . |

* cited by examiner

Primary Examiner—Deborah Jones
Assistant Examiner—Jason Resnick
(74) Attorney, Agent, or Firm—Carrier, Blackman & Associates, P.C.; Joseph P. Carrier; William D. Blackman

(57) ABSTRACT

Ceramics with a glaze applied to the surface of ceramic blank, the bending strength of which ceramic blank is 100 Mpa or higher or the firing shrinkage rate is 7% or higher and the porosity is 7.5% or higher.

49 Claims, 8 Drawing Sheets

CERAMICS, CERAMIC BLANK, MANUFACTURING METHOD THEREOF, SANITARY EARTHENWARE AND MANUFACTURING METHOD THEREOF

TECHNICAL FIELD

The present invention refers to ceramics of high strength and excellent thermal shock resistance, ceramics of small firing shrinkage and firing deformation, a production method thereof, a ceramic blank constituting ceramics and a sanitary ware as an application of these ceramics.

BACKGROUND ART

1. Ceramic Blank

As important characteristics of ceramic blank applied to sanitary ware, the strength of materials, thermal shock resistance and corrosion resistance can be mentioned. In addition, because ceramic products are produced by treating a powdered material to a state corresponding to its own compaction method, compacting it with the compaction method fit for the shape of a product and thereafter firing it, the characteristics of a material exhibited during the process from the material charging step to the firing step also become important, as well as the aforementioned characteristics. The important characteristics during this process include the strength at the compacting stage (referred to as wet strength in this specification because a compaction assistant such as water is generally used in the compaction of ceramics), the strength of materials after the completion of drying treatment after the compaction (referred to as dry strength), the shrinkage during the drying (referred to as dry shrinkage) and the shrinkage during the firing (referred to as firing shrinkage), and the deformation due to softening of materials during the firing (firing deformation). Among these characteristics, corrosion resistance is not particularly at issue in general applications of ceramic materials since ceramic materials fired at high temperatures have an excellent corrosion resistance.

These characteristics of ceramic materials have a plus or minus correlation between individual pairs and therefore a technical difficulty is recognized in improving all characteristics, so that there are the following problems according to the relevant art practices.

(1) Reinforcing method and thermal shock resistance of materials

The strength of ceramic blank varies with different species and a blank made using pottery stones, feldspar and clay as chief materials and densely sintering them (hereinafter, referred to as vitreous blank) has a bending strength on the order of 40–80 MPa.

Such a vitreous blank comprises a crystal phase and a glass phase, the crystal phase contains quartz and mullite. Quartz in the crystal phase is originally present in raw materials and mullite is deposited from $SiO_2$ and $Al_2O_3$ components, mainly of aluminum silicate minerals, in the firing process. And, the glass phase is made of silicate glass mainly comprising $SiO_2$ and containing alkali or alkaline earth oxides.

On the other hand, in recent years, a high-strength ceramic blank in which quartz in the blank is replaced with corundum to enhance the strength has been used in place of vitreous blank. Such blank is called alumina porcelain and applied to tableware, insulators or the like.

For example, applications disclosed in Japanese patent publication Nos. 41-14914, 43-19866, 2-40015 and 7-68061 and Japanese laid-open patent publication No. 6-232970 are known.

The ceramic blank disclosed in Japanese patent publication No. 41-14914 has a crystal phase ratio of 35–75% with the crystal phase comprising cristobalite, quartz and mullite, that disclosed in Japanese Patent publication No. 43-19866 is made by adding cristobalite, alumina and mullite to the crystal phase of an ordinary blank, those disclosed in Japanese patent publication Nos. 2-40015 and 7-68061 have a crystal ratio of 40% or more with the crystal phase containing corundum, mullite, cristobalite and quartz, and all of them intend to promote the ceramic strength and reduce the firing deformation. In addition, Japanese laid-open patent publication No. 6-232970 discloses application of alumina porcelain to sanitary ware.

The bending strength of alumina porcelain is 150–300 MPa, so that reinforcement of not less than twice the strength of vitreous blank is possible. The principle of this reinforcement is considered as follows.

With the vitreous blank, a large difference in thermal expansion coefficient between the quartz and the glass phases in the blank causes minute cracks (microcracks) to occur around quartz due to strain during the cooling process in the firing. The presence of these microcracks lowers the original strength.

By contraries, with the alumina porcelain, since quartz is replaced with corundum, the amount of microcracks decreases and the strength is enhanced.

In addition, because uniformly dispersing more minute and stronger corundum particles than quartz in the blank prevents cracks from occurring due to stress breakage from proceeding, the strength is further enhanced.

Such alumina porcelain has an excellent characteristic in strength, but when utilized in the same uses with the vitreous blank, the following points become at issue.

Though containing numbers of microcracks present in it as mentioned above, the vitreous blank is excellent from the standpoint of thermal shock resistance since these microcracks relax the stress occurring due to thermal shock.

On the other hand, with a conventional alumina porcelain, since microcracks decrease in number as mentioned above, thermal shock resistance lowers and in particular with large articles such sanitary ware, there is a problem that articles may break during the cooling process in the firing.

In addition, with a conventional alumina porcelain, since the added amount of alumina is increased to reinforce the blank, the ratio of crystal phase in this blank is higher than in the vitreous blank. With a higher crystal phase ratio, however, the molten amount of raw material particles decreases which changes in the glass phase serving to forward the sintering, so that there is a worsening tendency of sintering.

For this reason, sintering at higher firing temperatures has been considered for use with the conventional alumima porcelain as compared to the vitreous blank, but sintering at a lower temperature is desirable from the viewpoint of firing cost, and because the same firing temperature as with the vitreous blank also has an advantage that firing can be performed at the same production facility as the vitreous blank.

On the other hand, to sinter the alumina porcelain blank at a lower temperature, a method for increasing the content of $Na_2O$ or $K_2O$ serving as a sintering assistant to accelerate the vitrification of raw materials, and a method for further pulverizing the powder of raw materials are also carried out.

In the case of increasing the content of a sintering assistant, however, since the viscosity of vitrified raw materials in the blank during the firing decreases, the firing deformed amount of the blank due to stress such as dead weight during the firing is forced to increase, so that the deformed amount at the production stage of products increases.

As mentioned above, conventional alumina porcelain ceramics have problems of being poor firstly in thermal shock resistance and secondly in sintering.

With respect to sintering problems, there is a method for increasing the content of a sintering assistant or a method for further pulverizing the powder of raw materials, but a new problem of increase in the firing deformed amount of the blank takes place alternatively as discussed.

(2) Reduction method of firing deformed amount and matching of glaze.

Ceramic blank is applied to various products. For civil life, tableware and sanitary ware are mainly used and insulator set and such others are used to commercial purposes, but generally in these products, ceramic blank alone is not employed and glaze is applied to the surface thereof from the viewpoint of ornament or function for use.

As glaze, for example, Bristle glaze is mainly employed for sanitary ware. This Bristle glaze, mainly comprising $RO_2$(acidic oxide with a main constituent of $SiO_2$), $R_2O_2$ (amphoteric oxide with a main constituent of $Al_2O_3$) or $R_2O+RO$ (basic oxide mainly constituent of $K_2O$, $Na_2O$, $Ca_2O$, $Zn_2O$, $MgO$, $BaO$ and $SrO$) and if necessary containing emulsifier such as zirconia and tin oxide and various stains, is applied to a dried blank and is fired at the same temperature as the blank.

And as mentioned above, if raw material powder is further pulverized to reduce the firing deformed amount, the deformation during the firing decreases, but application of glaze such as Bristle glaze to the surface of blank would lead to an increase in the shrinkage of blank at the initiating temperature for melting of glaze in the firing process as compared with the raw material powder material which is not further pulverized, so that there is a problem that rivelling or peeling in the glaze is generated due to the resultant distortion. Alternatively, if sintering assistant is increased in quantity, the viscosity of vitrified raw materials decreases and sintering proceeds rapidly, so that a similar problem takes place.

(3) Sintering density of materials and strength of blank.

Generally, ceramic materials improve in strength with denser sintering. However, with ceramic materials partly or abundantly containing glaze like subjects of the present disclosure, the firing deformation due to the softening of materials increases with the progress of sintering in materials. Accordingly, with ceramic materials partly or abundantly containing glaze, if the firing shrunk amount or firing deformed amount of materials is reduced by limiting the sintering density to a low extent, the strength of materials lowers as a result.

(4) Wet strength, dry strength and dry shrinkage of materials.

Wet strength, dry strength and dry shrunk amount of materials are very important characteristics in the production of products. Particularly in the production of large-sized products such as sanitary ware, high wet strength and dry strength are required. In addition, the dry shrunk amount is preferably smaller to purposes of preventing any tearing in the drying step. With conventional ceramics, these characteristics are yet insufficient and from the viewpoint of strength for breakage or the like of products during handling in the production step, the thickness of materials is forced to be increased to a greater extent than necessary. Furthermore, because of a large dry shrunk amount, a gradual drying is required to prevent the occurrence of tearing, so that there is a problem of taking much time in drying.

2. Sanitary ware (1) Sanitary ware is heavy and correspondingly has a personal burden for producers, distributors, constructors and such others who handle same.

This is because characteristics of blank are a primary factor and from the relation between the deformation due to the softening of blank during the firing and the strength of blank, it is required to keep the blank thickness equal to or larger than a predetermined thickness, thereby leading to a heavy weight of products. On the other hand, it is difficult to make the blank thickness of sanitary ware thinner for a lighter weight. When the blank thickness decreases, the deformed amount of blank during the firing increases nearly at the inverse proportion to the square of blank thickness, whereas the strength decreases at the direct proportion to the square of blank thickness, so that a reduced blank thickness will lead to an increase in the deformation and a radical fall in the strength of products. As an alternative method, it is considered to achieve a reduction in weight by utilizing a blank of small specific weight, but there is a problem that a blank of small specific weight is generally low in strength.

(2) Dimensional accuracy is poor and the production of large-sized articles is difficult. The degree of freedom in design is low when applied to sanitary ware.

Because of being made of ceramic blank, sanitary ware is generally low in the degree of freedom in design, poor in dimensional accuracy and presents difficulties in the production of large-sized products and consequently has many problems associated therewith. Especially because the demand of consumers for design is elevated, an improvement in the design of sanitary ware has become a great problem.

In addition, sanitary ware is conventionally molded by slurry slip molding and fired after the molded products have been dried. Deformation due to the shrinkage and softening of blank during the firing in this production process forms a principal factor for worsening the degree of freedom in design and dimensional accuracy and hindering the production of large-sized articles. With conventional sanitary ware, a large firing shrinkage and deformation present a problem in achieving the promotion of an increase in the degree of freedom in design or the like. On the other hand, if a reduction in firing shrinkage or deformation is intended, a decrease in the strength of blank presents a problem and an increase in blank thickness for the prevention of a decrease in the strength of products will cause a problem of an increase in weight.

DISCLOSURE OF THE INVENTION

With respect to ceramics and ceramic blank, the present invention was made for the purpose of enhancement in thermal shock resistance, increase in the matching of glaze, decrease in firing deformation, decrease in firing shrinkage, combined decrease in firing deformation and shrinkage and increase in strength, increase in wet and dry strength and decrease in dry shrinkage.

And with respect to sanitary ware, the present invention was made for the purpose of providing a lighter weight product by a decrease in thickness, defining the material characteristics such as strength and firing deformation required for a lighter weight product by a decrease in thickness, providing a lighter weight product by a decrease in the specific weight of materials used therefor, defining the material characteristics such as bulk density and ratio of corundum required to decrease the specific weight of the materials, preventing the occurrence of dry tear accompanying a decrease in the thickness of materials, and for providing an improvement in product design and defining the material characteristics such as strength, firing deformation, and firing shrinkage required to improve the design.

For achieving the above purposes, according to the invention there are provided ceramics and ceramic blank wherein a high bending strength and an improved matching with the glaze is intended and a production method thereof, ceramics and ceramic blank wherein a relatively high strength and a decreased firing shrinkage and deformation is intended and a production method thereof, and applications of the above ceramics and ceramic blank to sanitary ware. As used herein "ceramics" is meant to encompass a ceramic product.

To be specific,the ceramics according to one aspect of the invention are ceramics with a glaze applied to the surface of ceramic blank, wherein the bending strength of which ceramic blank is 100 MPa or higher or the firing shrinkage rate is 7% or higher and the porosity is 7.5% or higher. In ceramics having a bending strength not lower than 100 MPa and a firing shrinkage rate not lower than 7%, a further increase in strength or firing shrinkage rate will lead to a decrease in porosity and thus wrinkling and peeling are likely to occur. Thus, the porosity is set to 7.5% or higher according to the invention. A high porosity means that the temperature at which the blank begins to melt is high, and usually since the beginning melting temperature of a glaze is typically higher than that of the blank, the difference in beginning melting temperatures from the blank to the glaze becomes smaller. Accordingly, at the start of melting in the glaze, the blank does not shrink so much and forms no wrinkles. Incidentally, it was confirmed in consequence of experiments that a high porosity would lead to an enhancement in matching with the glaze.

Additionally, such ceramics according to the invention may have a water absorbing rate is set to 3% or lower. By firing the ceramics until the water absorbing rate decreases to 3% or lower, a bending strength not lower than 100 MPa or a firing shrinkage rate not lower than 7% can be achieved. Incidentally, since excessive firing would lead to occurrence of bubbles and a lowering of strength, firing to a degree less than when bubbling occurs is preferable.

Further, such ceramics according to the invention may have a crystal phase which contains corundum. The content of corundum easily enables a bending strength not lower than 100 MPa or a firing shrinkage rate not lower than 7% to be achieved.

Such ceramics according to the invention may also meet at least one of the conditions that the thermal shock resistance is 120° C. or higher, that the firing deformed amount is 25 mm or smaller and that the deformed amount after the reheating at 1200° C. is 15 mm or smaller, is satisfied. By setting the thermal shock resistance to the above value, cracking during cooling after the firing can be reduced, while by setting the firing deformed amount and the deformed amount after the reheating at 1200° C. to the above values, the deformation of products for a decreased blank thickness can be suppressed.

According to another aspect of the invention, the ceramics are obtained by firing products after molding by the slurry slip molding method. For rough-shaped products such as insulator set to be molded by extrusion molding, neither thermal shock resistance nor designing is so much required, but products molded by the slurry slip molding method have a thin portion and thick portion and designing of a fine shape is required, so that there is need for solving such a task peculiar to slurry slip molding.

The ceramics of the invention include sanitary ware. For sanitary ware, because hollows and thin portions therein are many, sufficient thermal shock resistance is required, and since demands for designing or aesthetics rather than for function have been elevated in recent years, the slurry slip molding method is effective for producing same.

A production method for ceramics according to the invention comprises the step of firing after the step of molding of starting slurry by slurry slip molding, wherein for the concentration of the starting slurry, letting the total starting slurry be 100 in the volume ratio, the starting solid portion is 42–52% and the viscosity of the starting slurry is 1000 cp or lower. By such starting slurry characteristics, the wet and dry strength can be made larger and the dry shrinkage can be made smaller.

A ceramic blank according to another aspect of the invention comprises crystal and glass phases with alkaline oxides and alkaline earth oxides contained in the glass phase wherein the mole ratio of alkaline earth oxides to the total amount of alkaline oxides and alkaline earth oxides is set to 30 mol % or higher. The presence of alkaline oxides and alkaline earth oxides lowers the viscosity of the glass phase and thus vitrification of raw materials is accelerated, so that a poor sintering property can be solved. Furthermore, by setting the amount of alkaline earth oxides to 30 mol % or higher, preferably 50 mol % or higher, the temperature at which raw materials begin to vitrify or the temperature at which the viscosity of the vitrified raw materials begins to lower rises, so that the temperature difference from such temperature to the sintering temperature can be minimized. In other words, the porosity (the amount of closed pores) remaining in the blank during the sintering becomes smaller the longer the time difference from when the viscosity of the glass phase begins to be lowered until the sintering is. In the present invention, by making the above temperature difference smaller, this time difference can be correspondingly shortened, thereby increasing the residual porosity. And the more the residual porosity, the better the thermal shock resistance of blank becomes. Incidentally, a decrease in the strength of blank has been feared with increasing residual porosity, but it has been confirmed experimentally that the strength of blank is not lowered so much even if the residual porosity increases.

Such ceramic blank according to the invention may further include a crystal phase containing corundum. The content of corundum in the crystal phase enables a high strength to be maintained.

Further, such ceramic according to the invention may have a glaze is applied to the surface thereof. As mentioned above, by setting the mole ratio of alkaline earth oxides to 30 mol % or higher, sintering in a lower temperature region than the temperature at which a glaze begins to melt can be allowed to proceed slowly, thereby suppressing the shrinkage of blank lower and preventing wrinkling or peeling in the glaze from occurring. At temperatures above the temperature at which the glaze begins to melt, since sintering proceeds rapidly, a high strength at the time of sintering can be secured.

Such ceramic blank with a glaze on its surface may be fired so that the firing shrinkage rate reaches to 7% or higher. Firing so that the firing shrinkage rate reaches to 7% or higher enables a high strength to be realized. That is, the bending strength can be made 100 MPa or higher. Incidentally, with increasing firing shrinkage rate, a lowering of thermal shock resistance due to a decrease in porosity has been feared. However, for a mole ratio of alkaline earth oxides not lower than 30 mol %, it has been confirmed experimentally that a porosity not lower than a predetermined value can be secured even if the firing shrinkage rate increases and the thermal shock resistance is not lowered so much. Like this, a firing shrinkage rate not lower than 7% enables the porosity and thermal shock resistance to be made 7.5% or higher and 120° C. or higher, respectively.

Further, such ceramic blank according to the invention may have its composition adjusted based on the firing temperature thereof. Particularly, the total amount (wt %) of alkaline oxides and alkaline earth oxides relative to the whole blank is determined corresponding to firing temperatures as follows:

7 wt % or lower for firing below 1200° C.;

5 wt % or lower for firing at temperatures ranging from 1200° C. to 1300° C. exclusive;

4 wt % or lower for firing at temperatures ranging from 1300° C. to 1400° C. exclusive; and 2.5 wt % or lower for firing at or above 1400° C.

Alkaline oxides and alkaline earth oxides referred to here represent the sintering flux portion serving as fusing agent of blank, and for example, when cordierite, steatite or the like is contained as crystal remaining in the fired blank, an alkaline earth oxide such as MgO, a constituent of these, or an alkaline oxide of same kind is not contained therein.

By setting weight percents relative to firing temperatures as mentioned above, the firing deformed amount can be controlled, for example, below 20 mm.

Such ceramic blank according to the invention may have its mole ratio of alkaline earth oxides relative to the total amount of alkaline oxides and alkaline earth oxides set to 70 mol % or lower. In such a ceramic, the firing deformed amount can be further reduced.

The ceramic blank according to the invention may also be composed such that, letting the whole blank be 100, the glass phase is 25–75 wt % and the crystal phase is 30–70 wt %; letting the whole glass phase be 100 concerning chemical composition of main components constituting the glass phase, $SiO_2$ is 50–80 wt % and $Al_2O_3$ is 10–35 wt %; and letting the whole crystal phase be 100 concerning main minerals constituting the crystal phase, corundum is 10–60 wt %, mullite is 1–30 wt % and quartz is 1–30 wt %. If the content of corundum is 60 wt % or smaller, it is effective for making sanitary ware or the like thinner and lighter because the specific weight of the whole blank is maintained small. Incidentally, the lower limit of corundum is preferably 16 wt % or higher.

Further, the ceramic blank of the invention may be composed such that letting the total amount of alkaline earth oxides be 100, CaO is 20–80 mol %. In this manner, the firing deformed amount can be made small.

Still further, the ceramic blank according to the invention may also be composed such that a raw material comprising corundum as principal mineral or a raw material which generates corundum after firing, clay material and sintering assistant material are employed as main raw materials, quartz material, pottery stone material or the like is added to the raw materials if necessary and with the steps of molding, drying and firing, at least one of dolomite, calcium carbonate, magnesium carbonate, barium carbonate, strontium carbonate and magnesium hydroxide is employed aside from feldspars as the sintering assistant material. The raw material which generates corundum after firing is desirably diaspore ($\alpha$-$Al_2O_3 \cdot H_2O$) and preferably alum shale because the heating loss associated therewith is small. In other words, if a raw material to generate corundum after the firing is employed, the amount of heating loss (due to the removal of crystallization water by firing) occurring in these raw materials during the firing step may hinder the sintering of the blank. An increase in heating loss will be a cause of hindrance of sintering, increase in firing shrinkage and lowering of blank strength. From these factors it follows that use of other raw materials which generate corundum after sintering, but which have a large heating loss, such as gibbsite ($\gamma$-Al2O$_3 \cdot 3H_2O$), as principal mineral are unsuitable, and the above raw materials of small heating loss are preferable. In addition, diaspore is advantageous for the reinforcement of materials because of being monohydrate of $\alpha$-$Al_2O_3$ (corundum) and accompanied with no crystal modification of converting into corundum after the removal of crystallization water, unlike gibbsite (hydrate of $\gamma$-$Al_2O_3 \cdot 3H_2O$). Though there are raw materials comprising diaspore as principal mineral, alum shale is the most suitable raw material from the viewpoint of its reserves and price.

Additionally, the ceramic blank according to the invention may also be composed such that, letting the whole raw material be 100, the total amount of corundum, mullite and quartz amounts to 60 wt % or smaller. In such a manner, the amount of sintering assistant needed for solving a poor sintering property can be secured.

Such ceramic blank according to the invention may further have an average grain size of the above raw materials is set to 1–10 $\mu$m. In this manner, the action effect by addition of alkaline earth oxides can be fully obtained.

Such ceramic blank according to the invention may also have average grain size of quartz contained in the raw material set to 25 $\mu$m or smaller. In this manner, the action effect by addition of alkaline earth oxides can be fully obtained and the amount of microcracks generated due to the presence of quartz in the blank is suppressed, which is effective for the reinforcement of blank.

According to a further aspect of the invention, a ceramic blank comprises glass phase and crystal phase with corundum and quartz contained in the main constituents of the crystal phase and sintered by firing wherein the difference between the temperature at which the firing shrinkage rate of the aforesaid blank becomes maximum and the temperature at which the firing shrinkage rate becomes half of the aforesaid maximum is set to 110° C. or lower. In such an arrangement, the time taken from initiating vitrification of the raw material or initiating viscosity decrease of the vitrified raw material until the completion of sintering is shortened and the residual porosity is increased, thereby enabling the thermal shock resistance of blank to be enhanced.

Another production method for ceramic blank according to the invention, wherein the blank includes glass phase and crystal phase with corundum and quartz contained in the main constituents of the crystal phase, comprises the step of sintering by firing such that the firing temperature is raised within the range of 110° C. or lower after the firing shrinkage rate of the aforesaid blank reaches half of the maximum shrinkage rate, whereby the firing shrinkage rate of the blank is allowed to reach the maximum shrinkage rate. In such an arrangement, the residual porosity is increased, thereby enabling the thermal shock resistance of blank to be enhanced as with the above-mentioned ceramic blank of claim 20.

According to yet another aspect of the invention, ceramic blank comprises glass phase and crystal phase with corundum and quartz contained in the main constituents of the crystal phase and sintered by firing with a glaze applied to the surface of the blank, wherein the firing shrinkage rate of the blank at the temperature where the aforesaid glaze begins to melt or shrink is set to 4.5% or lower. In such a manner, the temperature difference between the temperature at which raw materials begin to vitrify or the viscosity of vitrified raw materials begins to reduce, and the temperature at which the glaze begins to melt is decreased, so that the shrinkage amount of the blank until the glaze begins to melt can be suppressed to a small extent.

A related method for producing ceramic blank according to the invention, wherein the blank comprises glass phase and crystal phase with corundum and quartz contained in the main constituents of the crystal phase, includes the step of sintering by firing with a glaze applied to the surface of the blank such that the glaze begins to melt or shrink at the time where the firing shrinkage rate of the aforesaid blank is within 4.5%. In such a manner, the temperature difference between the temperature at which raw materials begin to vitrify or the viscosity of vitrified raw materials begins to reduce, and the temperature at which the glaze begins to melt is decreased, so that the shrinkage amount of the blank until the glaze begins to melt can be suppressed to a small extent as with the above-mentioned ceramic blank.

A ceramic blank according to the invention may also comprise glass phase and crystal phase with corundum and quartz contained in the main constituents of the crystal phase and sintered by firing, wherein the difference between the temperature at which the firing shrinkage rate of the aforesaid blank becomes maximum and the temperature at which the firing shrinkage rate becomes a half of the aforesaid maximum is set to the range from 75° C. to 110° C. inclusive. In such a arrangement, the firing deformed amount of the blank is suppressed to a small extent. To be specific, it has been confirmed experimentally that with a decrease in the aforesaid temperature difference, the firing deformed amount first decreases, then increases in reverse. Thus, according to the present invention, the sintering deformed amount can be suppressed to a small extent by setting the aforesaid temperature difference within the aforesaid range.

A production method for ceramic blank according to the invention, wherein the blank comprises glass phase and crystal phase with corundum and quartz contained in the main constituents of the crystal phase, includes the step of sintering by firing, wherein by raising the firing temperature within the range of 110° C. or less after the firing shrinkage rate of the aforesaid blank reaches a half of the maximum shrinkage rate, the firing shrinkage rate of the blank is allowed to reach the maximum shrinkage rate. In such an arrangement, again, the firing deformed amount can be suppressed to a small extent.

According to yet another aspect of the invention, ceramic blank comprises glass phase and crystal phase, with alumina contained in the crystal phase being present entirely as composite minerals with other minerals, and alkaline oxides and alkaline earth oxides contained in the glass phase, wherein the total amount of alkaline oxides and alkaline earth oxides relative to the whole blank is 5.5 wt % or lower and the average grain size of raw materials is 7 μm or smaller. In this manner, even ceramic blank having no corundum can obtain the characteristics prescribed above in relation to other aspects of the invention.

According to still another aspect of the invention, ceramics include at least one of the conditions that the bending strength is 50 MPa or higher, that the porosity is 15% or higher, that the firing shrinkage rate is 9% or lower, that the firing deformed amount is 10 mm or smaller, that the deformed amount after the reheating at 1200° C. is 5 mm or smaller and that the bulk density is 2.4 g/cm³ is satisfied.

Such ceramics according to the invention may further contain corundum in the crystal phase thereof. The content of corundum enables a bending strength of 50 MPa or higher to be easily achieved.

Such ceramics according to the invention may also be molded by the slurry slip casting method. Adopting the slurry slip casting method enables complicated and large-sized products to be coped with.

Such ceramics may be sanitary ware.

According to yet another aspect of the invention, the composition of ceramic blank comprising crystal and glass phases with alkaline oxides and alkaline earth oxides contained in the glass phase, is controlled such that the total amount (wt %) of alkaline oxides and alkaline earth oxides relative to the whole blank is determined corresponding to firing temperatures as follows:

7 wt % or lower for firing at temperatures ranging from 1100° C. to 1130° C. exclusive;

6 wt % or lower for firing at temperatures ranging from 1130° C. to 1170° C. exclusive;

3.5 wt % or lower for firing at temperatures ranging from 1170° C. to 1200° C. exclusive; and 3 wt % or lower for firing at temperatures ranging from 1200° C. to 1300° C. exclusive;

2 wt % or lower for firing at temperatures ranging from 1300° C. to 1400° C. exclusive; and 1.5 wt % or lower for firing at or above 1400° C.

Alkaline oxides and alkaline earth oxides shown here represent the sintering flux portion serving as fusing agent of blank as mentioned above.

In the above arrangement, ceramics of the physical properties specified in claim 27 can be obtained. In order to achieve a bending strength on the order of 50 MPa, firing in such a manner that the firing shrinkage rate becomes 3% or higher is preferable.

Such ceramic blank according to the invention may contain corundum in the crystal phase. The content of corundum enables a bending strength of 50 MPa or higher to be easily achieved.

Such ceramic blank according to the invention, may contain mullite in the crystal phase and letting the whole blank be 100, the amount of mullite is 10 wt % or higher.

Such ceramic blank according to the invention may further have a glaze is applied to the surface thereof.

According to another aspect of the invention, ceramic blank comprises glass phase and crystal phase with corundum contained as a main constituent of the crystal phase, the glass phase containing alkaline oxides and alkaline earth oxides with $SiO_2$ as a main constituent wherein at least one of chamotte raw material and pyrophyllite is contained as raw material. By using chamotte raw material in part, the firing deformation or firing shrinkage of the blank can be further reduced without a decrease in strength.

The ceramic blank according to the invention may be such that the content of chamotte raw material is set to 10 wt % or higher. Since the use of too small an amount of the chamotte raw material would be ineffective, letting the whole raw material be 100, it is preferable that the used amount of the chamotte raw material is 10 wt % or more. However, the use of too much of the chamotte raw material limits the use of other raw materials and consequently is not preferable for characteristics of the blank. For example, an excessive decrease in the amount of raw material serving as a source of introducing corundum lowers the strength of the blank and an excessive decrease in clay raw material will lead to loss of plasticity, so that the molding becomes difficult. As the chamotte raw material used to such a purpose, chamotte raw material containing a large amount of alkaline metal or alkaline earth metal is not preferable.

Such ceramic blank according to the invention may use mullite chamotte as the chamotte raw material. When chamotte raw material is used, mullite chamotte is preferable. Chamotte raw material has various main materials. For example, one contains mullite, one contains quartz, one contains corundum and one contains several of them as the main mineral. When chamotte raw material comprising quartz as the main mineral is used, there occurs a problem that the firing deformation becomes large since quartz in chamotte raw material vitrifies in the sintering step of the blank and the blank softens. The degree of seriousness of this problem depends upon the amount of and the grain size of quartz contained in chamotte raw material. The smaller the grain size of quartz and the more the amount is, the greater the firing deformation is likely to become. Accordingly, even quartz-containing chamotte raw material is usable according to the invention if strictly selected concerning the grain size and the amount of quartz. On the other hand, when chamotte raw material comprising mullite as the main mineral is used, the firing deformation does not become large because the mullite in the chamotte raw material does not easily vitrify during the sintering step of blank.

Such ceramic blank of the invention may comprise glass phase and crystal phase with corundum contained as a main constituent of the crystal phase, the glass phase containing alkaline oxides and alkaline earth oxides with $SiO_2$ as a main constituent, wherein pyrophyllite is contained as raw material. For the same purpose as with the use of the chamotte raw material, raw material comprising pyrophyllite as the main mineral can be used in part. Because it is not subjected to firing treatment, unlike chamotte raw material, pyrophyllite raw material has no such plasticity as clay or pottery stone material comprising kaolinite or sericite as a main mineral. It is, however, advantageous in a molding method requiring plasticity to use pyrophyllite raw material rather than chamotte raw material, and its use also leads to cost reduction.

Such ceramic blank according to the invention may have a content of pyrophyllite in a range of 10 wt % or higher. The amount of pyrophyllite raw material used in the ceramic blank is fundamentally the same as with chamotte raw material, but because of having the plasticity, using a greater amount of pyrophyllite raw material than that of chamotte raw material is possible by reducing the amount of other plastic raw materials.

Such ceramic blank according to the invention may comprise a raw material with corundum as a main mineral or a raw material which generates corundum after firing, clay material and sintering assistant material are employed as main raw materials, quartz material, pottery stone material or the like is added to the main raw materials if necessary, molding and drying are performed after the raw materials are prepared to the average grain size of 10 $\mu$m or smaller and firing is performed, if necessary, after glazing.

And, again, such ceramic blank according to the invention may be sanitary ware. Because of having many hollows and being large-sized and of complicated shape, the sanitary ware needs thermal shock resistance.

Further, the sanitary ware according to the invention may have an average thickness of 20 mm or smaller. Incidentally, the average thickness is preferably 18 mm or smaller.

The sanitary ware according to the invention may consist of walls of ceramic blank and the thickness of the blank is set corresponding to the uses or shapes of the finished products. The average thickness referred to here means an average of thickness values for individual portions in one and the same product, noting that any given sanitary ware product will typically have portions with different thicknesses.

Further, the sanitary ware according to the invention may be a stool whose average thickness is 9 mm or smaller. Incidentally, the average thickness is preferably 8 mm or smaller.

And, the sanitary ware according to the invention may be a urinal whose average thickness is 16 mm or smaller. Incidentally, the average thickness is preferably 14 mm or smaller.

And, the sanitary ware according to the invention may be a urinal tank whose average thickness is 9 mm or smaller. Incidentally, the average thickness is preferably 8 mm or smaller.

And, the sanitary ware according to the invention may be a washbowl whose average thickness is 13 mm or smaller. Incidentally, the average thickness is preferably 11mm or smaller.

And, the sanitary ware according to the invention may be one having a dimension defined by the sum of height, width and depth of the product being less than 1600 mm and whose average thickness is 12 mm or smaller. Incidentally, the average thickness is preferably 10 mm or smaller.

And, the sanitary ware according to the invention may be one having a dimension defined by the sum of height, width and depth of the product being 1600 mm or larger and whose average thickness is 16 mm or smaller. Incidentally, the average thickness is preferably 14 mm or smaller.

And, the sanitary ware according to the invention may be one having a dimension defined by the sum of height, width and depth of the product being 2000 mm or larger and whose average thickness is 20 mm or smaller. Incidentally, the average thickness is preferably 18 mm or smaller.

And, the sanitary ware according to the invention may be sanitary ware wherein the ratio of the area for a single-wall portion thereof molded by sludge slip molding to the area for a double-wall portion thereof molded by solid slip molding is 0.5 or lower.

And, the sanitary ware according to the invention may further have a thickness around a hole for water to pass through made thicker than that of the outside portion thereof.

And, the sanitary ware according to the invention may be sanitary ware wherein the ratio of the average thickness for the double-wall portion molded by the solid slip molding to the average thickness for the single-wall portion molded by the sludge slip molding is 1.0 to 2.0.

DETAILED DESCRIPTION OF BEST MODE FOR CARRYING OUT THE INVENTION

Figure 1:
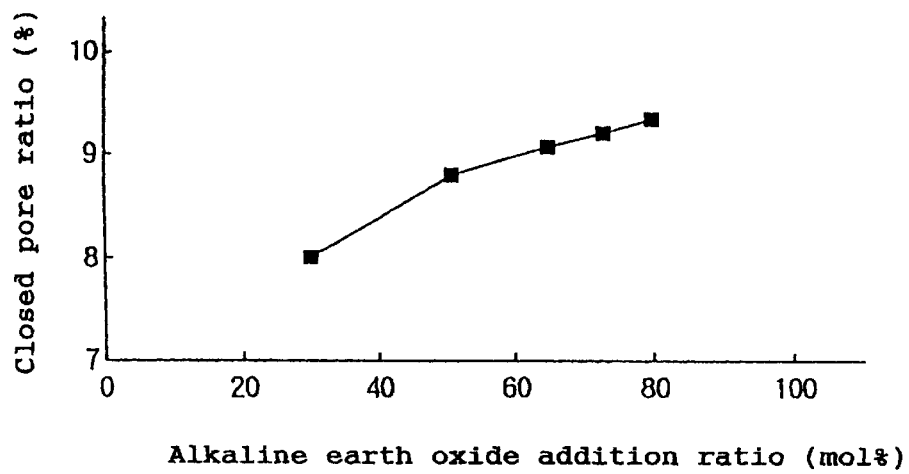
FIG. 1 is a graph showing the relationship between the addition ratio of alkaline earth oxides and the porosity remaining in blank according to the present invention.

Hereinafter, preferred embodiments according to the present invention will be described referring to the accompanying drawings and TABLES. TABLE 1 shows the chemical composition of raw materials used in comparative examples and the preferred embodiments, TABLE 2 shows the chemical composition of Bristle glaze and TABLES 3 to 15 show the used raw materials of blanks related to the conventional examples, the comparative examples and the present invention, the amounts of contained minerals in raw materials, physical properties of blanks, etc.

Incidentally, TABLES 3, 4, 5, 6, 7, 8, 9, 10, 11, 12, 13, 14 and 15 show the test blanks Nos. 1–11, Nos. 12–21, Nos. 22–31, Nos. 32–41, Nos. 42–49, Nos. 51–60, Nos. 61–70, Nos. 71–74, Nos. 81–88, Nos. 89–96, Nos. 97–104, Nos. 105–112 and Nos. 201–203, respectively.

TABLE 1

Chemical Composition and Contained Minerals of Raw Materials Used (wt %)

| Name of Raw Material | SiO$_2$ | Al$_2$O$_3$ | TiO$_2$ | Fe$_2$O$_3$ | CaO | MgO | Na$_2$O | K$_2$O | Ig.Loss | Contained Minerals[1] |
|---|---|---|---|---|---|---|---|---|---|---|
| Pottery stone | 69.5 | 21.9 | 0.20 | 0.50 | 0.20 | — | — | 1.70 | 6.00 | |
| Alumina | — | 99.7 | — | — | — | — | 0.20 | — | — | |
| Frog-eyed clay | 53.5 | 29.9 | 1.20 | 1.00 | 0.30 | 0.40 | 0.20 | 2.10 | 11.6 | |
| Kaoline | 48.1 | 36.4 | 0.20 | 0.80 | 0.20 | 0.30 | 0.10 | 2.20 | 11.8 | |
| Feldspar | 56.1 | 25.2 | 0.20 | 0.10 | 1.10 | — | 7.70 | 8.80 | 0.90 | |
| Dolomite | 2.5 | — | — | 0.10 | 32.3 | 19.5 | — | — | 45.5 | |
| Fired alum shale | 7.5 | 85.7 | 3.30 | 1.40 | 0.30 | 0.20 | — | 0.20 | 1.50 | |
| Calcium carbonate | — | — | — | — | 55.8 | — | — | — | 44.2 | |
| Magnesium carbonate | — | — | — | — | — | 47.8 | — | — | 52.5 | |
| Barium carbonate | — | — | — | (BaO 77.2) | — | — | — | — | 22.3 | |
| Pyrophyllite raw material | 65.4 | 28.1 | 0.10 | 0.01 | 0.23 | 0.02 | 0.11 | 1.09 | 5.00 | pyrophyllite 90, quartz 9 |
| Chamotte A | 52.5 | 41.6 | 0.28 | 2.94 | 1.12 | 0.56 | 0.34 | 0.44 | 0.14 | mullite 50 |
| Chamotte B | 81.0 | 13.8 | 0.11 | 0.52 | 0.15 | 0.06 | 0 | 3.61 | 0.71 | quartz 43 |
| Chamotte C | 88.8 | 9.2 | 0.10 | 0.19 | 0.15 | 0.02 | 0 | 1.22 | 0.38 | quartz 64, corundum 1 |

[1]Except trace mineral and glassy substance

TABLE 2

| | SiO$_2$ | Al$_2$O$_3$ | TiO$_2$ | Fe$_2$O$_3$ | CaO | MgO | Na$_2$O | K$_2$O | ZnO |
|---|---|---|---|---|---|---|---|---|---|
| Chemical Composition (wt %) | 66.3 | 10.1 | 0.7 | 0.2 | 12.5 | 1.3 | 0.6 | 3.8 | 5 |

TABLE 3

| Blank No. | 1 | 2 | 3 | 4 | 5 | 6 | 7 | 8 | 9 | 10 | 11 |
|---|---|---|---|---|---|---|---|---|---|---|---|
| Presence of raw material mixing (O - presence) | | | | | | | | | | | |
| Alumina | — | O | O | O | O | O | O | O | O | O | O |
| Fired alum shale | — | — | — | — | — | — | — | — | — | — | — |
| Silica sand 10 μm | — | — | — | — | O | O | — | — | — | — | — |
| Silica sand 15 μm | — | — | — | — | — | — | O | — | — | — | — |

TABLE 3-continued

| Blank No. | 1 | 2 | 3 | 4 | 5 | 6 | 7 | 8 | 9 | 10 | 11 |
|---|---|---|---|---|---|---|---|---|---|---|---|
| Pottery stone | O | — | — | — | — | — | — | — | — | — | — |
| Clay | O | O | O | O | O | O | O | O | O | O | O |
| Feldspar | O | O | O | O | O | O | O | O | O | O | O |
| Dolomite | — | — | — | — | — | — | — | — | — | — | — |
| Magnesite | — | — | — | — | — | — | — | — | — | — | — |
| Calcite | — | — | — | — | — | — | — | — | — | — | — |
| Barium carbonate | — | — | — | — | — | — | — | — | — | — | — |
| Composition of minerals in raw material | | | | | | | | | | | |
| Corundum | — | 10 | 20 | 25 | 25 | 25 | 25 | 30 | 40 | 50 | 60 |
| Mullite | — | — | — | — | — | — | — | — | — | — | — |
| Quartz | 34.2 | 9.3 | 8.5 | 8.1 | 25.9 | 25.6 | 25.9 | 8.4 | 7.6 | 6.3 | 4.9 |
| Kaolinites | 32.6 | 45.5 | 39.0 | 25.7 | 26.0 | 27.6 | 26.0 | 29.3 | 22.8 | 19.5 | 16.3 |
| Sericite | 28.7 | 19.3 | 16.5 | 15.1 | 11.0 | 11.7 | 11.0 | 12.4 | 9.6 | 8.3 | 6.9 |
| Others | — | 16 | 16 | 16 | 12 | 10 | 12 | 20 | 20 | 16 | 12 |
| Crystal-composed minerals[1] | — | 19.3 | 28.5 | 33.1 | 50.9 | 50.6 | 50.9 | 38.4 | 47.6 | 56.3 | 64.9 |
| Average grain size of raw materials (μm) | 8.0 | 7.3 | 7.2 | 6.8 | 5.8 | 5.3 | 5.3 | 6.4 | 6.1 | 5.5 | 5.5 |
| Firing temperature (° C.) | 1200 | 1200 | 1200 | 1200 | 1200 | 1200 | 1200 | 1200 | 1250 | 1300 | 1400 |
| Blank composition (wt %) | | | | | | | | | | | |
| Crystal phase | 25 | 44 | 48 | 50 | 42 | 44 | 47 | 49 | 50 | 55 | 63 |
| Glass phase | 75 | 56 | 52 | 5o | 58 | 56 | 53 | 51 | 50 | 45 | 37 |
| Chemical composition of the glass phase | | | | | | | | | | | |
| $SiO_2$ | 72.0 | 74.6 | 71.2 | 70.3 | 69.8 | 68.6 | 67.6 | 66.6 | 60.8 | 57.9 | 56.6 |
| $Al_2O_3$ | 18.0 | 12.6 | 16.0 | 17.0 | 22.6 | 24.3 | 24.5 | 20.2 | 27.0 | 30.9 | 33.0 |
| $Na_2O$ | 0.9 | 3.2 | 3.3 | 3.4 | 2.1 | 1.7 | 2.1 | 4.1 | 4.1 | 3.6 | 3.3 |
| $K_2O$ | 4.3 | 6.3 | 6.3 | 6.2 | 3.8 | 3.5 | 3.9 | 6.5 | 6.1 | 5.5 | 5.1 |
| MgO | 0.9 | 0.4 | 0.4 | 0.4 | 0.2 | 0.2 | 0.2 | 0.3 | 0.2 | 0.2 | 0.2 |
| CaO | 1.5 | 0.7 | 0.7 | 0.7 | 0.5 | 0.4 | 0.5 | 0.8 | 0.7 | 0.7 | 0.6 |
| Others | 1.5 | 2.2 | 2.0 | 1.9 | 1.1 | 1.2 | 1.2 | 1.6 | 1.3 | 1.2 | 1.2 |
| Flux portion[2] | 5.8 | 5.9 | 5.6 | 5.4 | 4.0 | 3.7 | 4.0 | 6.0 | 5.6 | 4.5 | 3.4 |
| Alkaline earth mole ratio[3] | 46 | 17 | 16 | 15 | 16 | 17 | 16 | 14 | 13 | 13 | 13 |
| Contained minerals | | | | | | | | | | | |
| Corundum | — | 11 | 20 | 26 | 26 | 26 | 27 | 31 | 40 | 50 | 60 |
| Mullite | 12.9 | 33 | 28 | 24 | 6 | 5 | 5 | 10 | 10 | 5 | 3 |
| Quartz | 12.1 | — | — | — | 6 | 7 | 9 | — | — | — | — |
| Blank physical properties | | | | | | | | | | | |
| Water absorbing rate (%) | 0.03 | 0.06 | 0.04 | 0.04 | 0.03 | 0.04 | 0.08 | 0.05 | 0.04 | 0.06 | 0.08 |
| Strength (MPa) | 85 | 102 | 121 | 138 | 152 | 148 | 133 | 123 | 169 | 198 | 168 |
| Firing deformation (mm) | 31.1 | 29.5 | 28.9 | 28.4 | 16.3 | 14.5 | 16.8 | 18.1 | 32.5 | 21.3 | 30.7 |
| Thermal shock resistance ΔT(C) | 120 | 90 | 90 | 90 | 90 | 90 | 110 | 80 | 80 | 80 | 70 |
| Glaze matching (%) | 100 | 24 | 25 | 23 | 49 | 51 | 38 | 21 | 15 | 12 | 11 |
| Firing shrinkage rate | 9.8 | I0.8 | I0.1 | 9.1 | 9.2 | 9.3 | 9.1 | 8.8 | 9.3 | 9.2 | 9.1 |
| Porosity (%) | 6.3 | 5.6 | 5.9 | 5.8 | 5.3 | 5.9 | 5.6 | 5.8 | 5.7 | 6.5 | 5.9 |

[1]Corundum, quartz, etc.
[2]Total of alkaline and alkaline earth oxides
[3]Total amount of alkaline earth oxides in 2

TABLE 4

| Blank No. | 12 | 13 | 14 | 15 | 16 | 17 | 18 | 19 | 20 | 21 |
|---|---|---|---|---|---|---|---|---|---|---|
| Presence of raw material mixing (O - presence) | | | | | | | | | | |
| Alumina | O | O | O | O | — | — | — | — | — | — |
| Fired alum shale | — | — | — | — | O | O | O | O | O | O |
| Silica sand 10 μm | — | — | — | — | — | — | — | — | — | O |
| Silica sand 15 μm | O | O | O | O | O | O | O | O | O | — |
| Pottery Stone | — | — | — | — | — | — | — | — | — | — |
| Clay | O | O | O | O | O | O | O | O | — | — |
| Feldspar | O | O | O | O | O | O | O | O | — | — |
| Dolomite | O | O | O | O | — | O | O | O | O | O |
| Magnesite | — | — | — | — | — | — | — | — | — | — |
| Calcite | | | | | | | | | | |
| Barium carbonate | — | — | — | — | — | — | — | — | — | — |

TABLE 4-continued

| Blank No. | 12 | 13 | 14 | 15 | 16 | 17 | 18 | 19 | 20 | 21 |
|---|---|---|---|---|---|---|---|---|---|---|
| Composition of minerals in raw material | | | | | | | | | | |
| Corundum | 25 | 25 | 25 | 25 | 20 | 20 | 20 | 20 | 20 | 20 |
| Mullite | — | — | — | — | 5 | 5 | 5 | 5 | 5 | 5 |
| Quartz | 25.1 | 24.6 | 24.1 | 24.0 | 25.3 | 24.4 | 24.1 | 24.0 | 23.7 | 23.7 |
| Kaolinites | 29.3 | 30.6 | 30.6 | 29.6 | 29.3 | 32.2 | 32.8 | 32.5 | 32.8 | 32.8 |
| Sericite | 12.4 | 12.9 | 12.9 | 12.5 | 12.4 | 13.6 | 13.9 | 13.8 | 13.9 | 13.9 |
| Others | 8.2 | 6.8 | 7.3 | 8.8 | 8.0 | 4.7 | 4.1 | 4.7 | 4.5 | 4.5 |
| Crystal-composed minerals[1] | 50.1 | 49.6 | 49.1 | 49.0 | 50.3 | 49.4 | 49.1 | 49.0 | 48.7 | 48.7 |
| Average grain size of raw materials ($\mu$m) | 5.3 | 5.3 | 5.3 | 5.3 | 5.3 | 5.3 | 5.3 | 5.3 | 5.3 | 5.3 |
| Firing temperature (° C.) | 1200 | 1200 | 1200 | 1200 | 1200 | 1200 | 1200 | 1200 | 1200 | 1200 |
| Blank composition (wt %) | | | | | | | | | | |
| Crystal phase | 44 | 48 | 46 | 44 | 41 | 43 | 45 | 46 | 48 | 42 |
| Glass phase | 56 | 52 | 54 | 56 | 59 | 57 | 55 | 54 | 52 | 58 |
| Chemical composition of the glass phase | | | | | | | | | | |
| $SiO_2$ | 67.7 | 68.8 | 68.4 | 68.8 | 66.2 | 69.2 | 68.9 | 69.1 | 71.3 | 70.6 |
| $Al_2O_3$ | 24.3 | 22.5 | 21.4 | 19.5 | 24.5 | 21.2 | 20.8 | 19.6 | 16.2 | 18.3 |
| $Na_2O$ | 1.4 | 1.1 | 0.7 | 0.6 | 1.5 | 0.7 | 0.5 | 0.4 | 0.2 | 0.2 |
| $K_2O$ | 3.4 | 3.3 | 2.7 | 2.5 | 3.5 | 2.8 | 2.6 | 2.6 | 2.5 | 2.2 |
| MgO | 0.6 | 1.1 | 0.7 | 0.6 | 1.5 | 0.7 | 0.5 | 0.4 | 0.2 | 0.2 |
| CaO | 1.0 | 1.7 | 3.2 | 4.4 | 0.5 | 1.4 | 2.0 | 2.6 | 3.5 | 3.1 |
| Others | 1.4 | 1.6 | 1.5 | 1.4 | 3.4 | 3.7 | 3.8 | 3.9 | 4.1 | 3.7 |
| Flux portion[2] | 3.7 | 3.7 | 4.7 | 5.7 | 3.5 | 3.3 | 3.6 | 4.0 | 4.4 | 4.4 |
| Alkaline earth mole ratio[3] | 37 | 53 | 73 | 80 | 23 | 53 | 66 | 72 | 80 | 80 |
| Contained minerals | | | | | | | | | | |
| Corundum | 27 | 27 | 27 | 28 | 19 | 19 | 19 | 19 | 19 | 19 |
| Mullite | 6 | 9 | 9 | 8 | 11 | 15 | 16 | 17 | 20 | 17 |
| Quartz | 11 | 12 | 10 | 8 | 11 | 9 | 9 | 10 | 9 | 6 |
| Blank physical properties | | | | | | | | | | |
| Water absorbing rate (%) | 0.04 | 0.06 | 0.03 | 0.05 | 0.04 | 0.05 | 0.05 | 0.04 | 0.06 | 0.07 |
| Strength (MPa) | 156 | 154 | 158 | 161 | 153 | 148 | 156 | 150 | 153 | 171 |
| Firing deformation (mm) | 13.8 | 13.8 | 15.2 | 16.8 | 15.2 | 13.9 | 14.0 | 14.5 | 15.0 | 15.3 |
| Thermal shock resistance$\Delta$T(C) | 110 | 110 | 120 | 130 | 120 | 120 | 130 | 140 | 140 | 130 |
| Glaze matching (%) | 55 | 63 | 84 | 94 | 45 | 65 | 75 | 78 | 92 | 97 |
| Firing shrinkage rate | 8.7 | 9.1 | 8.8 | 9.0 | 10.1 | 9.8 | 10.2 | 10.1 | 10.0 | 10.3 |
| Porosity (%) | 7.4 | 8.5 | 9.3 | 9.8 | 7.0 | 8.1 | 8.6 | 9.3 | 9.8 | 10.0 |

[1]Corundum quartz, etc.
[2]Total of alkaline and alkaline earth oxides
[3]Mole ratio of alkaline earth oxides in 2

TABLE 5

| Blank No. | 22 | 23 | 24 | 25 | 26 | 27 | 28 | 29 | 30 | 31 |
|---|---|---|---|---|---|---|---|---|---|---|
| Presence of raw material mixing (O - presence) | | | | | | | | | | |
| Alumina | — | — | — | — | — | — | — | — | — | — |
| Fired alum shale | O | O | O | O | O | O | O | O | O | O |
| Silica sand 10 $\mu$m | O | O | O | O | O | — | — | — | — | O |
| Silica sand 15 $\mu$m | — | — | — | — | — | O | O | O | O | O |
| Pottery stone | — | — | — | — | — | — | — | — | — | — |
| Clay | O | O | O | O | O | O | O | O | O | O |
| Feldspar | — | — | O | O | O | O | O | O | O | O |
| Dolomite | O | O | O | O | — | O | O | O | O | O |
| Magnesite | — | — | — | — | — | — | — | — | — | — |
| Calcite | — | — | — | — | — | — | — | — | — | — |
| Barium carbonate | — | — | — | — | — | — | — | — | — | — |
| Composition of minerals in raw material | | | | | | | | | | |
| Corundum | 20 | 20 | 20 | 20 | 20 | 24 | 24 | 24 | 24 | 24 |
| Mullite | 5 | 5 | 5 | 5 | 5 | 6 | 6 | 6 | 6 | 6 |
| Quartz | 14.5 | 19.1 | 28.4 | 33.0 | 37.7 | 24.9 | 24.2 | 23.9 | 23.7 | 23.4 |
| Kaolinites | 39.3 | 36.1 | 29.6 | 26.3 | 22.9 | 25.7 | 28.3 | 28.6 | 28.1 | 28.6 |
| Sericite | 16.6 | 15.3 | 12.5 | 11.1 | 9.7 | 10.9 | 12.0 | 12.1 | 11.9 | 12.1 |
| Others | 4.5 | 4.5 | 4.4 | 4.4 | 4.6 | 8.4 | 5.5 | 5.3 | 6.0 | 5.9 |
| Crystal-composed minerals[1] | 39.5 | 44.1 | 53.4 | 58.0 | 62.7 | 54.9 | 54.2 | 53.9 | 53.7 | 53.4 |

TABLE 5-continued

| Blank No. | 22 | 23 | 24 | 25 | 26 | 27 | 28 | 29 | 30 | 31 |
|---|---|---|---|---|---|---|---|---|---|---|
| Average grain size of raw materials (μm) | 5.3 | 5.3 | 5.3 | 5.3 | 5.3 | 5.0 | 5.0 | 5.0 | 5.0 | 5.0 |
| Firing temperature (° C.) | 1200 | 1200 | 1200 | 1200 | 1200 | 1200 | 1200 | 1200 | 1200 | 1200 |
| Blank composition (wt %) | | | | | | | | | | |
| Crystal phase | 44 | 43 | 42 | 43 | 45 | 45 | 48 | 47 | 46 | 46 |
| Glass phase | 56 | 57 | 58 | 57 | 55 | 55 | 52 | 53 | 54 | 54 |
| Chemical composition of the glass phase | | | | | | | | | | |
| $SiO_2$ | 66.4 | 68.5 | 73.5 | 77.1 | 80.3 | 65.6 | 70.4 | 68.5 | 66.8 | 66.1 |
| $Al_2O_3$ | 21.2 | 19.7 | 16.1 | 12.9 | 9.7 | 24.1 | 18.9 | 20.5 | 21.1 | 21.1 |
| $Na_2O$ | 0.2 | 0.2 | 0.2 | 0.2 | 0.3 | 1.6 | 0.9 | 0.7 | 0.6 | 0.3 |
| $K_2O$ | 2.7 | 2.4 | 2.1 | 2.0 | 1.9 | 3.5 | 3.0 | 2.7 | 2.6 | 2.3 |
| MgO | 2.2 | 2.1 | 1.8 | 1.7 | 1.7 | 0.5 | 1.0 | 1.3 | 1.9 | 2.3 |
| CaO | 3.3 | 3.2 | 2.8 | 2.7 | 2.7 | 0.8 | 1.5 | 2.1 | 2.9 | 3.7 |
| Others | 4.1 | 3.9 | 3.5 | 3.4 | 3.3 | 3.9 | 4.3 | 4.2 | 4.1 | 4.2 |
| Flux portion[2] | 4.7 | 4.5 | 4.0 | 3.8 | 3.7 | 3.5 | 3.4 | 3.6 | 4.3 | 4.6 |
| Alkaline earth mole ratio[3] | 78 | 79 | 79 | 78 | 78 | 30 | 52 | 63 | 73 | 81 |
| Contained minerals | | | | | | | | | | |
| Corundum | 19 | 19 | 19 | 19 | 19 | 22 | 23 | 22 | 22 | 22 |
| Mullite | 21 | 19 | 16 | 16 | 16 | 12 | 16 | 16 | 15 | 15 |
| Quartz | 4 | 5 | 7 | 8 | 10 | 11 | 9 | 9 | 9 | 9 |
| Blank physical properties | | | | | | | | | | |
| Water absorbing rate p (%) | 0.04 | 0.06 | 0.04 | 0.08 | 0.10 | 0.04 | 0.06 | 0.07 | 0.05 | 0.08 |
| Strength (MPa) | 168 | 163 | 152 | 154 | 150 | 141 | 154 | 151 | 148 | 143 |
| Firing deformation (mm) | 14.8 | 15.5 | 15.8 | 17.3 | 19.5 | 16.0 | 13.8 | 14.8 | 17.6 | 17.8 |
| Thermal shock resistance ΔT(C) | 130 | 130 | 130 | 120 | 120 | 120 | 120 | 130 | 130 | 140 |
| Glaze matching (%) | 78 | 92 | 103 | 106 | 111 | 73 | 78 | 80 | 84 | 88 |
| Firing shrinkage rate | 10.2 | 10.3 | 10.1 | 10.5 | 10.5 | 10.2 | 9.8 | 10.1 | 10.0 | 10.3 |
| Porosity (%) | 9.2 | 8.9 | 9.1 | 9.2 | 9.1 | 8.0 | 8.8 | 9.1 | 9.4 | 9.6 |

[1]Corundum, quartz, etc.
[2]Total of alkaline and alkaline earth oxides
[3]Mole ratio of alkaline earth oxides in 2

TABLE 6

| Blank No. | 32 | 33 | 34 | 35 | 36 | 37 | 38 | 39 |
|---|---|---|---|---|---|---|---|---|
| Presence of raw material mixing (O - presence) | | | | | | | | |
| Alumina | — | — | — | — | — | — | — | — |
| Fired alum shale | O | O | O | O | O | O | O | O |
| Silica sand 10 μm | O | O | O | O | O | — | — | O |
| Silica sand 15 μm | (3 μm) | (5 μm) | (20 μm) | (25 μm) | (30 μm) | O | O | O |
| Pottery stone | — | — | — | — | — | — | — | — |
| Clay | O | O | O | O | O | O | O | O |
| Feldspar | — | — | — | — | — | — | — | — |
| Dolomite | O | O | O | O | O | O | O | O |
| Magnesite | — | — | — | — | — | — | — | — |
| Calcite | — | — | — | — | — | — | — | — |
| Barium carbonate | — | — | — | — | — | — | — | — |
| Composition of minerals in raw material | | | | | | | | |
| Corundum | 20 | ← | ← | ← | ← | ← | ← | ← |
| Mullite | 5 | ← | ← | ← | ← | ← | ← | ← |
| Quartz | 23.7 | ← | ← | ← | ← | ← | ← | ← |
| Kaolinites | 32.8 | ← | ← | ← | ← | ← | ← | ← |
| Sericite | 13.9 | ← | ← | ← | ← | ← | ← | ← |
| Others | 4.5 | ← | ← | ← | ← | ← | ← | ← |
| Crystal-composed minerals[1] | 48.7 | ← | ← | ← | ← | ← | ← | ← |
| Average grain size of raw materials (μm) | 5.3 | 5.3 | 5.3 | 5.3 | 5.3 | 6.1 | 8.0 | 10.5 |
| Firing temperature (° C.) | 1200 | 1200 | 1200 | 1200 | 1200 | 1200 | 1300 | 1400 |
| Blank composition (wt %) | | | | | | | | |
| Crystal phase | 38 | 39 | 52 | 56 | 57 | 48 | 42 | 36 |
| Glass phase | 62 | 61 | 48 | 44 | 43 | 52 | 58 | 64 |
| Chemical composition of the glass phase | | | | | | | | |
| $SiO_2$ | 71.3 | 70.8 | 70.4 | 69.4 | 68.6 | 71.3 | 69.3 | 67.7 |

TABLE 6-continued

| Blank No. | 32 | 33 | 34 | 35 | 36 | 37 | 38 | 39 |
|---|---|---|---|---|---|---|---|---|
| $Al_2O_3$ | 18.2 | 18.5 | 16.1 | 15.9 | 16.3 | 16.2 | 19.5 | 22.1 |
| $Na_2O$ | 0.1 | 0.1 | 0.2 | 0.2 | 0.2 | 0.2 | 0.2 | 0.1 |
| $K_2O$ | 2.1 | 2.1 | 2.7 | 2.9 | 3.0 | 2.5 | 2.2 | 2.0 |
| MgO | 1.9 | 2.1 | 1.8 | 1.7 | 1.7 | 0.5 | 1.0 | 1.3 |
| CaO | 2.9 | 3.0 | 3.8 | 4.1 | 4.2 | 3.5 | 3.1 | 2.8 |
| Others | 3.4 | 3.5 | 4.4 | 4.8 | 4.9 | 4.1 | 3.7 | 3.3 |
| Flux portion[2] | 4.4 | ← | ← | ← | ← | ← | ← | ← |
| Alkaline earth mole ratio[3] | 80 | ← | ← | ← | ← | ← | ← | ← |
| Contained minerals | | | | | | | | |
| Corundum | 19 | 19 | 19 | 19 | 19 | 19 | 19 | 19 |
| Mullite | 16 | 16 | 21 | 22 | 22 | 20 | 16 | 12 |
| Quartz | 3 | 4 | 12 | 15 | 16 | 9 | 7 | 5 |
| Blank physical properties | | | | | | | | |
| Water absorbing rateB (%) | 0.01 | 0.03 | 0.09 | 0.23 | 0.46 | 0.09 | 0.06 | 0.04 |
| Strength (MPa) | 163 | 161 | 142 | 131 | 125 | 136 | 132 | 128 |
| Firing deformation (mm) | 18.1 | 16.7 | 15.2 | 14.8 | 14.9 | 16.2 | 20.1 | 28.5 |
| Thermal shock resistance$\Delta$T(C) | 110 | 110 | 140 | 140 | 130 | 140 | 130 | 130 |
| Glaze matching (%) | 83 | 96 | 91 | 88 | 89 | 98 | 96 | 97 |
| Firing shrinkage rate | 10.5 | 10.3 | 10.2 | 9.9 | 9.5 | 9.7 | 9.2 | 8.2 |
| Porosity (%) | 9.1 | 9.2 | 9.3 | 9.8 | 9.8 | 9.5 | 9.5 | 9.2 |

[1]Corundum, quartz, etc.
[2]Total of alkaline and alkaline earth oxides
[3]Mole ratio of alkaline earth oxides in 2

TABLE 7

| Blank No. | 40 | 41 | 42 | 43 | 44 | 45 | 46 | 47 | 48 |
|---|---|---|---|---|---|---|---|---|---|
| Presence of raw material mixing (O - presence) | | | | | | | | | |
| Alumina | — | — | — | — | — | — | — | — | — |
| Fired alum shale | O | O | O | O | O | O | O | O | O |
| Silica sand 10 μm | — | — | — | — | — | — | — | — | — |
| Silica sand 15 μm | O | O | O | O | O | O | O | O | O |
| Pottery stone | — | — | — | — | — | — | — | — | — |
| Clay | O | O | O | O | O | O | O | O | O |
| Feldspar | O | b | O | O | O | O | O | O | O |
| Dolomite | — | — | — | — | — | — | O | O | O |
| Magnesite | O | O | O | O | O | O | — | — | — |
| Calcite | O | O | O | O | O | O | — | — | — |
| Barium carbonate | — | — | — | 0 | 0 | 0 | — | — | — |
| Composition of minerals in raw material | | | | | | | | | |
| Corundum | 24 | 24 | 24 | 24 | 24 | 24 | 24 | 24 | 17 |
| Mullite | 6 | 6 | 6 | 6 | 6 | 6 | 6 | 6 | 4 |
| Quartz | 23.7 | 24.1 | 23.8 | 23.7 | 23.7 | 23.7 | 23.7 | 23.7 | 24.7 |
| Kaolinites | 28.5 | 24.4 | 28.7 | 28.5 | 28.4 | 28.1 | 26.0 | 26.0 | 38.6 |
| Sericite | 12.0 | 10.3 | 12.2 | 12.0 | 12.0 | 11.9 | 11.0 | 11.0 | 7.9 |
| Others | 5.6 | 11.0 | 5.2 | 5.6 | 5.7 | 6.3 | 9.3 | 9.3 | 7.8 |
| Crystal-composed minerals[1] | 53.7 | 54.1 | 53.8 | 53.7 | 53.7 | 53.7 | 53.7 | 53.7 | 45.7 |
| Average grain size of raw materials (μm) | 5.3 | 5.3 | 5.3 | 5.3 | 5.3 | 5.3 | 5.3 | 5.3 | 4.7 |
| Firing temperature (° C.) | 1200 | 1200 | 1200 | 1200 | 1200 | 1200 | 1230 | 1250 | 1200 |
| Blank composition (wt %) | | | | | | | | | |
| Crystal phase | 47 | 49 | 45 | 44 | 42 | 47 | 43 | 43 | 40 |
| Glass phase | 53 | 51 | 55 | 56 | 53 | 53 | 57 | 57 | 60 |
| Chemical composition of the glass phase | | | | | | | | | |
| $SiO_2$ | 67.7 | 66.3 | 67.9 | 68.0 | 67.7 | 66.9 | 65.0 | 62.5 | 70.8 |
| $Al_2O_3$ | 20.4 | 17.8 | 21.1 | 20.4 | 20.8 | 19.8 | 19.2 | 20.8 | 19.3 |
| $Na_2O$ | 0.6 | 1.3 | 0.6 | 0.6 | 0.5 | 0.6 | 0.5 | 0.1 | 0.3 |
| $K_2O$ | 2.6 | 3.2 | 2.5 | 2.5 | 2.4 | 2.6 | 2.3 | 1.9 | 2.0 |
| MgO | 1.7 | 1.0 | 2.5 | 1.4 | 1.1 | 0.7 | 3.4 | 4.1 | 1.7 |
| CaO | 2.7 | 6.2 | 1.2 | 2.3 | 1.9 | 3.3 | 5.6 | 6.7 | 2.8 |
| Others | 4.2 | 4.2 | 4.1 | 4.0 | 3.9 | 4.2 | 4.0 | 3.9 | 3.0 |
| Flux portion[2] | 4.1 | 6.0 | 3.8 | 4.2 | 4.5 | 4.87 | 6.47 | 7.29 | 4.10 |
| Alkaline earth mole ratio[3] | 71 | 71 | 70 | 70 | 68 | 71 | 85 | 91 | 78 |

TABLE 7-continued

| Blank No. | 40 | 41 | 42 | 43 | 44 | 45 | 46 | 47 | 48 |
|---|---|---|---|---|---|---|---|---|---|
| Contained minerals | | | | | | | | | |
| Corundum | 22 | 22 | 22 | 22 | 22 | 22 | 22 | 22 | 16 |
| Mullite | 16 | 17 | 15 | 15 | 14 | 16 | 14 | 13 | 16 |
| Quartz | 9 | 10 | 8 | 7 | 6 | 9 | 7 | 8 | 8 |
| Blank physical properties | | | | | | | | | |
| Water absorbing rateB % | 0.08 | 0.12 | 0.06 | 0.06 | 0.04 | 0.12 | 0.14 | 0.23 | 0.08 |
| Strength (MPa) | 152 | 154 | 146 | 157 | 154 | 151 | 147 | 133 | 155 |
| Firing deformation (mm) | 15.6 | 17.9 | 16.0 | 16.4 | 16.2 | 15.3 | 18.7 | 21.3 | 14.3 |
| Glaze matching (%) | 91 | 98 | 90 | 80 | 73 | 93 | 89 | 93 | 93 |
| Firing shrinkage rate | 10.3 | 10.2 | 10.3 | 10.1 | 10.3 | 10.2 | 9.3 | 9.1 | 10.2 |
| Porosity (%) | 9.1 | 9.4 | 9.5 | 9.4 | 9.5 | 9.5 | 9.6 | 9.7 | 9.7 |

[1] Corundum, quartz, etc.
[2] Total of alkaline and alkaline earth oxides
[3] Mole ratio of alkaline earth oxides in 2

TABLE 8

| Blank No. | 51 | 52 | 53 | 54 | 55 | 56 | 57 | 58 | 59 | 60 |
|---|---|---|---|---|---|---|---|---|---|---|
| Presence of raw material mixing (O - presence) | | | | | | | | | | |
| Pottery stone | | | O | | | | | | | |
| Silica sand 10 μm | O | O | | | O | O | O | O | O | O |
| Silica sand 20 μm | | | O | | | | | | | |
| Alumina | | | | | O | O | O | O | O | O |
| Fired alum shale | | | | | | | | | | |
| Chamotte A | O | O | O | | | | | | | |
| Chamotte B | | | | | | | | | | |
| Chamotte C | | | | | | | | | | |
| Pyrophyllite raw material | | | | | | | | | | |
| Clay | O | O | O | O | O | O | O | O | O | O |
| Feldspars | | | O | | | O | O | | O | O |
| Dolomite | | | | | | O | O | | | |
| Composition of minerals in raw material | | | | | | | | | | |
| Corundum | 0 | 0 | 0 | 0 | 24.9 | 24.9 | 24.9 | 24.9 | 24.9 | 24.9 |
| Mullite | 15.9 | 15.9 | 15.9 | 0 | 0 | 0 | 0 | 0 | 0 | 0 |
| Quartz | 17.1 | 17.1 | 23.3 | 34.2 | 23.6 | 23.7 | 23.7 | 23.6 | 24.4 | 24.8 |
| Kaolinites | 35.8 | 35.8 | 28.0 | 32.6 | 29.6 | 29.6 | 29.6 | 34.6 | 34.5 | 34.5 |
| Sericite | 15.1 | 15.1 | 11.8 | 28.7 | 10.3 | 10.3 | 10.3 | 10.3 | 10.3 | 10.3 |
| Pyrophyllite | 0 | 0 | 0 | 2.5 | 0 | 0 | 0 | 0 | 0 | 0 |
| Average grain size of raw materials (μm) | 8.4 | 8.4 | 9.8 | 8.0 | 4.6 | 4.7 | 4.6 | 3.2 | 6.8 | 8.6 |
| Deposit-thickness speed constant (10-4 cm$^2$/s) | 1.0 | 1.8 | 1.9 | 1.3 | 1.8 | 1.8 | 1.8 | 1.4 | 2.1 | 2.3 |
| Firing temperature (° C.) | 1200 | 1200 | 1200 | 1200 | 1200 | 1200 | 1200 | 1200 | 1200 | 1200 |
| Blank composition (wt %) | | | | | | | | | | |
| Crystal phase | 32.9 | 35.1 | 38.4 | 29.6 | 52.3 | 47.3 | 46.1 | 45.1 | 52.3 | 55.7 |
| Glass phase | 67.1 | 64.9 | 61.6 | 70.4 | 47.7 | 52.7 | 53.9 | 54.9 | 47.7 | 44.3 |
| Chemical composition of the glass phase | | | | | | | | | | |
| SiO$_2$ | 67.0 | 69.2 | 71.1 | 72.2 | 68.7 | 68.1 | 67.6 | 71.4 | 68.7 | 65.0 |
| Al$_2$O$_3$ | 26.1 | 23.2 | 20.6 | 21.2 | 26.2 | 25.2 | 24.6 | 24.2 | 24.8 | 27.3 |
| Na$_2$O | 0.31 | 0.69 | 1.10 | 0.39 | 0.24 | 0.26 | 0.27 | 0.21 | 0.92 | 1.33 |
| K$_2$O | 2.15 | 2.46 | 2.80 | 4.10 | 2.53 | 2.31 | 2.26 | 2.19 | 3.21 | 3.80 |
| MgO | 0.57 | 0.56 | 0.55 | 0.29 | 0.40 | 1.14 | 1.53 | 0.35 | 0.39 | 0.41 |
| CaO | 0.78 | 0.85 | 0.93 | 0.35 | 0.29 | 1.56 | 2.21 | 0.25 | 0.38 | 0.45 |
| Contained minerals | | | | | | | | | | |
| Corundum | 0 | 0 | 0 | 0 | 26.8 | 26.5 | 26.3 | 26.8 | 26.9 | 26.5 |
| Mullite | 22.7 | 24.2 | 25.2 | 15.1 | 10.8 | 9.3 | 9.1 | 9.7 | 10.3 | 9.9 |
| Quartz | 10.2 | 11.2 | 13.2 | 14.5 | 14.7 | 11.5 | 10.7 | 5.6 | 15.1 | 19.3 |
| Crystal flux amount[1] (wt %) | 2.55 | 2.93 | 3.31 | 3.61 | 1.65 | 2.78 | 3.38 | 1.65 | 2.33 | 2.65 |
| Blank physical properties | | | | | | | | | | |
| Water absorbing rate (%) | 13.6 | 15.2 | 14.1 | 7.6 | 11.6 | 5.2 | 4.1 | 9.6 | 7.5 | 9.4 |
| Firing shrinkage rate (%) | 4.4 | 3.9 | 4.2 | 7.1 | 5.8 | 8.8 | 9.4 | 6.7 | 7.4 | 6.5 |
| Strength (MPa) | 43 | 36 | 42 | 48 | 76 | 103 | 115 | 106 | 91 | 82 |
| Firing deformation (mm) | 5.9 | 5.6 | 8.5 | 12.3 | 7.0 | 9.1 | 11.8 | 6.7 | 8.5 | 12.5 |

TABLE 8-continued

| Blank No. | 51 | 52 | 53 | 54 | 55 | 56 | 57 | 58 | 59 | 60 |
|---|---|---|---|---|---|---|---|---|---|---|
| Thermal shock resistance (° C.) | 110 | 110 | 110 | 120 | 130 | 130 | 130 | 120 | 130 | 130 |
| Glaze matching (%) | 105 | 113 | 111 | 116 | 96 | 98 | 94 | 102 | 92 | 106 |
| True density (g/cm$^3$) | 2.63 | 2.64 | 2.65 | 2.60 | 2.90 | 2.88 | 2.87 | 2.88 | 2.90 | 2.90 |
| Bulk density (g/cm$^3$) | 1.91 | 1.86 | 1.91 | 2.13 | 2.17 | 2.47 | 2.50 | 2.25 | 2.38 | 2.29 |
| Porosity (%) | 27.3 | 29.5 | 27.9 | 18.0 | 25.2 | 14.3 | 13.0 | 21.6 | 18.1 | 21.3 |

[1]Weight % of the total amount of alkaline oxides and alkaline earth oxides to the whole blank

TABLE 9

| Blank No. | 61 | 62 | 63 | 64 | 65 | 66 | 67 | 68 | 69 | 70 |
|---|---|---|---|---|---|---|---|---|---|---|
| Presence of raw material mixing (O - presence) | | | | | | | | | | |
| Pottery stone | | | | | | | | | | |
| Silica sand 10 μm | O | O | O | O | O | O | O | O | O | O |
| Silica sand 20 μm | | | | | | | | | | |
| Alumina | O | O | O | O | | | | | | |
| Fired alum shale | | | | | O | O | O | O | O | O |
| Chamotte A | | | | | | | | | | |
| Chamotte B | | | | | | | | | | |
| Chamotte C | | | | | | | | | | |
| Pyrophyllite raw material | | | | | | | | | | O |
| Clay | O | O | O | O | O | O | O | O | O | O |
| Feldspars | | O | | O | | O | O | O | O | |
| Dolomite | | | | | | O | O | O | O | |
| Composition of minerals in raw material | | | | | | | | | | |
| Corundum | 10.0 | 39.9 | 24.9 | 24.9 | 18.8 | 18.8 | 18.8 | 18.8 | 18.8 | 18.8 |
| Mullite | 0 | 0 | 0 | 0 | 5.0 | 5.0 | 5.0 | 5.0 | 5.0 | 5.0 |
| Quantz | 24.8 | 23.3 | 14.4 | 33.3 | 23.6 | 23.8 | 23.7 | 23.7 | 23.8 | 15.3 |
| Kaolinites | 44.2 | 25.1 | 40.5 | 39.1 | 34.5 | 34.5 | 34.5 | 34.5 | 34.5 | 29.1 |
| Sericite | 14.4 | 7.4 | 12.8 | 8.7 | 10.3 | 10.3 | 10.3 | 10.3 | 10.3 | 8.2 |
| Pyrophyllite | 0 | 0 | 0 | 0 | 0 | 0 | 0 | 0 | 0 | 18.2 |
| Average grain size of raw materials (μm) | 4.6 | 4.7 | 4.6 | 4.6 | 4.6 | 4.6 | 4.6 | 4.6 | 4.6 | 4.7 |
| Deposit thickness speed constant (10-4 cm$^2$/s) | 1.6 | 1.8 | 1.4 | 2.2 | 1.9 | 1.8 | 1.8 | 1.9 | 2.0 | 2.6 |
| Firing temperature (° C.) | 1200 | 1200 | 1200 | 1200 | 1200 | 1200 | 1200 | 1200 | 1200 | 1200 |
| Blank composition (wt %) | | | | | | | | | | |
| Crystal phase | 44.7 | 57.2 | 43.6 | 56.5 | 49.3 | 46.1 | 42.5 | 39.8 | 36.7 | 43.6 |
| Glass phase | 55.3 | 42.8 | 56.4 | 43.5 | 50.7 | 53.9 | 57.5 | 60.2 | 63.3 | 56.4 |
| Chemical composition of the glass phase | | | | | | | | | | |
| SiO$_2$ | 71.2 | 57.6 | 61.9 | 73.6 | 67.2 | 67.3 | 65.7 | 64.1 | 65.2 | 67.0 |
| Al$_2$O$_3$ | 23.0 | 36.6 | 33.0 | 20.8 | 25.2 | 24.5 | 25.7 | 26.6 | 24.8 | 26.3 |
| Na$_2$O | 0.18 | 1.34 | 0.22 | 0.62 | 0.13 | 0.22 | 0.16 | 0.16 | 0.23 | 0.14 |
| K$_2$O | 2.88 | 3.25 | 2.52 | 2.74 | 2.49 | 2.42 | 2.21 | 2.11 | 2.07 | 2.22 |
| MgO | 0.46 | 0.32 | 0.41 | 0.36 | 0.45 | 0.75 | 1.11 | 1.43 | 1.76 | 0.36 |
| CaO | 0.32 | 0.41 | 0.26 | 0.35 | 0.42 | 0.95 | 1.57 | 2.11 | 2.69 | 0.41 |
| Contained minerals | | | | | | | | | | |
| Corundum | 11.2 | 33.1 | 26.8 | 26.9 | 19.9 | 19.6 | 18.1 | 18.5 | 19.4 | 20.7 |
| Mullite | 17.6 | 9.5 | 8.4 | 8.9 | 14.7 | 14.0 | 13.6 | 10.9 | 9.5 | 13.4 |
| Quartz | 15.9 | 14.6 | 8.4 | 20.7 | 14.7 | 12.5 | 10.8 | 10.4 | 7.8 | 9.5 |
| Crystal flux amount (wt %) | 2.12 | 2.27 | 1.92 | 1.77 | 1.77 | 2.34 | 2.90 | 3.51 | 4.27 | 1.76 |
| Blank physical properties | | | | | | | | | | |
| Water absorbing rate (%) | 11.8 | 10.6 | 12.6 | 13.1 | 10.7 | 7.3 | 5.9 | 3.0 | 0.09 | 14.0 |
| Firing sbrinkage rate (%) | 5.7 | 5.1 | 4.9 | 4.8 | 6.1 | 8.3 | 8.8 | 9.6 | 9.6 | 4.6 |
| Strength (MPa) | 71 | 83 | 69 | 72 | 82 | 98 | 105 | 115 | 132 | 76 |
| Firing deformation (mm) | 6.2 | 7.8 | 5.6 | 6.7 | 7.0 | 8.5 | 9.5 | 12.1 | 14.7 | 4.3 |
| Thermal shock resistance (° C.) | 130 | 120 | 120 | 120 | 140 | 140 | 130 | 130 | 120 | 130 |
| Glaze matching (%) | 108 | 98 | 107 | 113 | 101 | 98 | 106 | 97 | 95 | 106 |
| True density (g/cm$^3$) | 2.69 | 3.00 | 2.87 | 2.91 | 2.81 | 2.80 | 2.77 | 2.75 | 2.75 | 2.80 |
| Bulk density (g/cm$^2$) | 2.01 | 2.29 | 2.10 | 2.11 | 2.15 | 2.31 | 2.34 | 2.43 | 2.49 | 1.99 |
| Porosity (%) | 25.5 | 23.7 | 26.9 | 27.4 | 23.6 | 17.6 | 15.5 | 11.9 | 9.4 | 28.9 |

TABLE 10

| Blank No. | 71 | 72 | 73 | 74 |
|---|---|---|---|---|
| Presence of raw material mixing (O - presence) | | | | |
| Pottery stone | | | | |
| Silica sand 10 μm | O | O | O | O |
| Silica sand 20 μm | | | | |
| Alumina | | | | |
| Fired alum shale | O | O | O | O |
| Chamotte A | | O | O | |
| Chamotte B | | | | O |
| Chamotte C | | | | |
| Pyrophyllite raw material | O | | | |
| Clay | O | O | O | O |
| Feldspars | | | | |
| Dolomite | | | | |
| Composition of minerals in raw material | | | | |
| Corundum | 18.8 | 18.8 | 18.8 | 18.8 |
| Mullite | 5.0 | 14.9 | 19.9 | 5.0 |
| Quartz | 15.9 | 13.5 | 13.2 | 22.1 |
| Kaolinites | 22.1 | 29.1 | 22.1 | 29.1 |
| Sericite | 5.5 | 8.2 | 5.5 | 8.2 |
| Pyrophyllite | 27.3 | 0 | 0 | 0 |
| Average grain size of raw materials (μm) | 4.7 | 4.5 | 4.7 | 4.5 |
| Deposit-thickness speed constant (10-4 cm²/s) | 2.8 | 2.5 | 3.2 | 2.2 |
| Firing temperature (° C.) | 1200 | 1200 | 1200 | 1200 |
| Blank composition (wt %) | | | | |
| Crystal phase | 44.1 | 50.5 | 54.7 | 45.4 |
| Glass phase | 55.9 | 49.5 | 45.3 | 54.6 |
| Chemical composition of the glass phase | | | | |
| $SiO_2$ | 68.6 | 69.0 | 71.2 | 72.6 |
| $Al_2O_3$ | 25.2 | 21.7 | 18.3 | 19.5 |
| $Na_2O$ | 0.15 | 0.26 | 0.36 | 0.10 |
| $K_2O$ | 2.01 | 2.22 | 1.98 | 3.28 |
| MgO | 0.30 | 0.64 | 0.75 | 0.38 |
| CaO | 0.42 | 0.85 | 1.15 | 0.39 |
| Contained minerals | | | | |
| Corundum | 19.8 | 19.9 | 20.1 | 20.4 |
| Mullite | 14.0 | 23.7 | 26.8 | 14.8 |
| Quartz | 10.3 | 6.9 | 7.8 | 10.2 |
| Crystal flux amount (wt %) | 1.61 | 1.97 | 1.92 | 2.26 |
| Blank physical properties | | | | |
| Water absorbing rate (%) | 15.2 | 12.7 | 14.8 | 8.1 |
| Firing shrinkage rate (%) | 4.0 | 5.1 | 4.1 | 7.7 |
| Strength (MPa) | 71 | 91 | 84 | 104 |
| Firing deformation (mm) | 4.1 | 4.2 | 3.8 | 8.2 |
| Thermal shock resistance (° C.) | 130 | 140 | 140 | 130 |
| Glaze matching (%) | 115 | 107 | 113 | 102 |
| True density (g/cm³) | 2.79 | 2.85 | 2.88 | 2.81 |
| Bulk density (g/cm³) | 1.95 | 2.08 | 2.01 | 2.27 |
| Porosity (%) | 30.4 | 26.9 | 30.1 | 19.1 |

TABLE 11

| Blank No. | 81 | 82 | 83 | 84 | 85 | 86 | 87 | 88 |
|---|---|---|---|---|---|---|---|---|
| Presence of raw material mixing (O - presence) | | | | | | | | |
| Alumina | — | — | — | — | — | — | — | — |
| Fired alum shale | O | O | O | O | O | O | O | O |
| Silica sand 10 μm | — | — | — | — | — | — | — | — |
| Silica sand 15 μm | O | O | O | O | O | O | O | O |
| Pottery stone | O | O | O | O | O | O | O | O |
| Clay | O | O | O | O | O | O | O | O |
| Feldspar | O | O | O | O | O | O | O | O |
| Dolomite | O | O | O | O | O | O | O | O |
| Magnesite | — | — | — | — | — | — | — | — |
| Calcite | — | — | — | — | — | — | — | — |
| Barium carbonate | — | — | — | — | — | — | — | — |
| Composition of minerals in raw material | | | | | | | | |
| Corundum | 21.15 | 21.15 | 21.15 | 21.15 | 21.67 | 21.67 | 21.67 | 21.67 |
| Mullite | 5.29 | 5.29 | 5.29 | 5.29 | 5.17 | 5.17 | 5.17 | 5.17 |
| Quartz | 24.24 | 24.24 | 24.24 | 24.24 | 23.69 | 23.69 | 23.69 | 23.69 |
| Kaolinites | 37.73 | 37.73 | 37.73 | 37.73 | 36.87 | 36.87 | 36.87 | 36.87 |
| Sericite | 10.18 | 10.18 | 10.18 | 10.18 | 9.95 | 9.95 | 9.95 | 9.95 |
| Others | 1.42 | 1.42 | 1.42 | 1.42 | 3.66 | 3.66 | 3.66 | 3.66 |
| Crystal-composed minerals[1] | 50.68 | 50.68 | 50.68 | 50.68 | 50.53 | 50.53 | 50.53 | 50.53 |
| Average grain size of raw materials (μm) | 4.3 | 4.3 | 4.3 | 4.3 | 4.5 | 4.5 | 4.5 | 4.5 |
| Firing temperature (° C.) | 1100 | 1200 | 1300 | 1400 | 1100 | 1200 | 1300 | 1400 |

TABLE 11-continued

| Blank No. | 81 | 82 | 83 | 84 | 85 | 86 | 87 | 88 |
|---|---|---|---|---|---|---|---|---|
| Blank composition (wt %) | | | | | | | | |
| Crystal phase | 62.6 | 57.6 | 56.2 | 52.6 | 61.1 | 52.3 | 52.2 | 49.6 |
| Glass phase | 37.4 | 42.4 | 43.8 | 47.4 | 38.9 | 47.7 | 47.8 | 50.4 |
| Chemical composition of the blank | | | | | | | | |
| $SiO_2$ | 52.68 | 52.68 | 52.68 | 52.68 | 52.04 | 52.04 | 52.04 | 52.04 |
| $Al_2O_3$ | 43.45 | 43.45 | 43.45 | 43.45 | 42.87 | 42.87 | 42.87 | 42.87 |
| $Na_2O$ | 0.05 | 0.05 | 0.05 | 0.05 | 0.05 | 0.05 | 0.05 | 0.05 |
| $K_2O$ | 1.21 | 1.21 | 1.21 | 1.21 | 1.19 | 1.19 | 1.19 | 1.19 |
| MgO | 0.20 | 0.20 | 0.20 | 0.20 | 0.68 | 0.68 | 0.68 | 0.68 |
| CaO | 0.23 | 0.23 | 0.23 | 0.23 | 1.02 | 1.02 | 1.02 | 1.02 |
| Others | 2.17 | 2.17 | 2.17 | 2.17 | 2.15 | 2.15 | 2.15 | 2.15 |
| Flux portion[2] | 1.69 | 1.69 | 1.69 | 1.69 | 2.94 | 2.94 | 2.94 | 2.94 |
| Alkaline earth mole ratio[3] | 39.927 | 39.927 | 39.927 | 39.927 | 72.161 | 72.161 | 72.161 | 72.161 |
| Chemical composition of the glass phase | | | | | | | | |
| $SiO_2$ | 64.68 | 52.68 | 52.68 | 71.405 | 52.038 | 52.038 | 52.038 | 52.038 |
| $Al_2O_3$ | 24.98 | 16.61 | 9.12 | 7.79 | 24.77 | 16.31 | 10.65 | 12.42 |
| $Na_2O$ | 0.14 | 0.13 | 0.12 | 0.11 | 0.14 | 0.11 | 0.11 | 0.10 |
| $K_2O$ | 3.23 | 2.85 | 2.76 | 2.55 | 3.07 | 2.50 | 2.50 | 2.37 |
| MgO | 0.54 | 0.48 | 0.46 | 0.43 | 1.75 | 1.42 | 1.42 | 1.35 |
| CaO | 0.61 | 0.54 | 0.52 | 0.48 | 2.62 | 2.13 | 2.13 | 2.02 |
| Others | 5.81 | 5.13 | 4.96 | 4.59 | 5.52 | 4.50 | 4.49 | 4.26 |
| Contained minerals | | | | | | | | |
| Corundum | 20.4 | 19.9 | 19.5 | 13.2 | 20.1 | 19.8 | 18.4 | 8.9 |
| Mullite | 19.1 | 23.0 | 27.8 | 37.0 | 18.3 | 21.3 | 27.0 | 38.6 |
| Quartz | 23.1 | 14.7 | 8.9 | 2.4 | 22.7 | 11.2 | 6.8 | 2.1 |
| Blank physical properties | | | | | | | | |
| Water absorbing rate (%) | 20.3 | 14.1 | 7.2 | 0.17 | 20.5 | 9.1 | 1.8 | 0.033 |
| Firing shrinkage rate (%) | 1.1 | 4.3 | 7.3 | 9.2 | 0.9 | 6.6 | 8.9 | 9.2 |
| Strength (MPa)[4] | 24.5 | 63.5 | 112.3 | 148.2 | 33.9 | 91.2 | 116.7 | bubbling |
| Firing deformation (mm) | 1.1 | 5.6 | 9.5 | 14.7 | 2.2 | 9.3 | 12.8 | 21.2 |
| Porosity (%)[4] | 36.3 | 29.0 | 17.4 | 9.5 | 36.5 | 20.7 | 10.7 | 9.4 |
| Thermal shock resistance$\Delta T(°C.)$[4] | 140 | 140 | 130 | 100 | 140 | 140 | 130 | bubbling |
| Glaze matching (%)[5] | — | 105 | — | — | — | 102 | — | — |

[1]Corundum, quartz, etc.
[2]Total amount of alkaline and alkaline earth oxides
[3]Mole percentage of alkaline earth oxides in 2
[4]For those of vigorous bubbling, strength and thermal shock resistsnce have not yet been messured.
[5]Because of using a glaze for firing temperature of 1200° C., those for other firing temperatures than 1200° C. have not yet been estimated.

TABLE 12

| Blank No. | 89 | 90 | 91 | 92 | 93 | 94 | 95 | 96 |
|---|---|---|---|---|---|---|---|---|
| Presence of raw material mixing (O - presence) | | | | | | | | |
| Alumina | — | — | — | — | — | — | — | — |
| Fired alum shale | O | O | O | O | O | O | O | O |
| Silica sand 10 μm | — | — | — | — | — | — | — | — |
| Silica sand 15 μm | O | O | O | O | O | O | O | O |
| Pottery stone | O | O | O | O | O | O | O | O |
| Clay | O | O | O | O | O | O | O | O |
| Feldspar | O | O | O | O | O | O | O | O |
| Dolomite | O | O | O | O | O | O | O | O |
| Magnesite | — | — | — | — | — | — | — | — |
| Calcite | — | — | — | — | — | — | — | — |
| Barium carbonate | — | — | — | — | — | — | — | — |
| Composition of minerals in raw material | | | | | | | | |
| Corundum | 20.00 | 20.00 | 20.00 | 20.00 | 19.11 | 19.11 | 19.11 | 19.11 |
| Mullite | 5.00 | 5.00 | 5.00 | 5.00 | 4.78 | 4.78 | 4.78 | 4.78 |
| Quartz | 23.17 | 23.17 | 23.17 | 23.17 | 22.70 | 22.70 | 22.70 | 22.70 |
| Kaolinites | 35.68 | 35.68 | 35.68 | 35.68 | 34.09 | 34.09 | 34.09 | 34.09 |
| Sericite | 9.62 | 9.62 | 9.62 | 9.62 | 9.19 | 9.19 | 9.19 | 9.19 |
| Others | 6.52 | 6.52 | 6.52 | 6.52 | 10.13 | 10.13 | 10.13 | 10.13 |

TABLE 12-continued

| Blank No. | 89 | 90 | 91 | 92 | 93 | 94 | 95 | 96 |
|---|---|---|---|---|---|---|---|---|
| Crystal-composed minerals[1] | 48.17 | 48.17 | 48.17 | 48.17 | 46.59 | 46.59 | 46.59 | 46.59 |
| Average grain size of raw materials (μm) | 4.7 | 4.7 | 4.7 | 4.7 | 4.8 | 4.8 | 4.8 | 4.8 |
| Firing temperature (° C.) | 1100 | 1200 | 1300 | 1400 | 1100 | 1200 | 1300 | 1400 |
| Blank composition (wt %) | | | | | | | | |
| Crystal phase | 56.1 | 47.6 | 44.1 | 49.3 | 48.2 | 39.0 | 38.4 | 49.3 |
| Glass phase | 43.9 | 52.4 | 55.9 | 50.7 | 51.8 | 61.0 | 61.6 | 50.7 |
| Chemical composition of the blank | | | | | | | | |
| $SiO_2$ | 51.55 | 51.55 | 51.55 | 51.55 | 51.24 | 51.24 | 51.24 | 51.24 |
| $Al_2O_3$ | 42.14 | 42.14 | 42.14 | 42.14 | 41.21 | 41.21 | 41.21 | 41.21 |
| $Na_2O$ | 0.16 | 0.16 | 0.16 | 0.16 | 0.39 | 0.39 | 0.39 | 0.39 |
| $K_2O$ | 1.28 | 1.28 | 1.28 | 1.28 | 1.50 | 1.50 | 1.50 | 1.50 |
| MgO | 1.08 | 1.08 | 1.08 | 1.08 | 1.39 | 1.39 | 1.39 | 1.39 |
| CaO | 1.70 | 1.70 | 1.70 | 1.70 | 2.25 | 2.25 | 2.25 | 2.25 |
| Others | 2.10 | 2.10 | 2.10 | 2.10 | 2.02 | 2.02 | 2.02 | 2.02 |
| Flux portion[2] | 4.22 | 4.22 | 4.22 | 4.22 | 5.52 | 5.52 | 5.52 | 5.52 |
| Alkaline earth mole ratio[3] | 77.978 | 77.978 | 77.978 | 77.978 | 77.121 | 77.121 | 77.121 | 77.121 |
| Chemical composition of the glass phase | | | | | | | | |
| $SiO_2$ | 57.30 | 71.81 | 70.84 | 74.67 | 60.62 | 66.22 | 66.89 | 73.03 |
| $Al_2O_3$ | 28.31 | 16.13 | 17.86 | 12.87 | 24.81 | 21.41 | 20.86 | 12.08 |
| $Na_2O$ | 0.36 | 0.30 | 0.27 | 0.31 | 0.74 | 0.63 | 0.63 | 0.76 |
| $K_2O$ | 2.92 | 2.45 | 2.29 | 2.53 | 2.89 | 2.46 | 2.43 | 2.96 |
| MgO | 2.46 | 2.06 | 1.93 | 2.13 | 2.68 | 2.28 | 2.26 | 2.74 |
| CaO | 3.87 | 3.24 | 3.04 | 3.35 | 4.34 | 3.69 | 3.65 | 4.43 |
| Others | 4.78 | 4.01 | 3.76 | 4.14 | 3.91 | 3.32 | 3.29 | 3.99 |
| Contained minerals | | | | | | | | |
| Corundum | 19.8 | 19.9 | 13.2 | 5.1 | 19.1 | 14.8 | 9.7 | 3.5 |
| Mullite | 13.8 | 19.2 | 26.4 | 42.5 | 12.9 | 18.6 | 26.0 | 44.0 |
| Quartz | 22.5 | 8.5 | 4.5 | 1.7 | 16.2 | 5.6 | 2.7 | 1.8 |
| Blank physical properties | | | | | | | | |
| Water absorbing rate (%) | 20.6 | 0.2 | 0.026 | 1.3 | 21.3 | 0.034 | 0.2 | 1.9 |
| Firing shrinkage rate (%) | 0.9 | 9.1 | 8.8 | 8.5 | 0.5 | 8.8 | 8.08 | 7.5 |
| Strength (MPa)[4] | 35.4 | 146.5 | 134.9 | bubbling | 37.4 | 128.7 | bubbling | bubbling |
| Firing deformation (mm) | 3.4 | 15.0 | 25.0 | >40 | 3.0 | 23.3 | >40 | >40 |
| Porosity (%)[4] | 36.4 | 9.6 | 9.4 | — | 37.0 | 9.7 | — | — |
| Thermal shock resistance ΔT(° C.)[4] | 140 | 130 | 130 | bubbling | 140 | 130 | bubbling | bubbling |
| Glaze matching (%)[5] | — | 98 | — | — | — | 94 | — | — |

[1]Corundum, quartz, etc.
[2]Total amount of alkaline and alkaline earth oxides
[3]Mole percentage of alkaline earth oxides in 2
[4]For those of vigorous bubbling, strength and thermal shock resistance have not yet been measured.
[5]Because of using a glaze for firing temperature of 1200° C., those for other firing temperatures than 1200° C. have not yet been estimated.

TABLE 13

| Blank No | 97 | 98 | 99 | 100 | 101 | 102 | 103 | 104 |
|---|---|---|---|---|---|---|---|---|
| Presence of raw material mixing O - presence) | | | | | | | | |
| Alumina | — | — | — | — | — | — | — | — |
| Fired alum shale | O | O | O | O | O | O | O | O |
| Silica sand 10 μm | — | — | — | — | — | — | — | — |
| Silica sand 15 μm | O | O | O | O | O | O | O | O |
| Pottery stone | O | O | O | O | O | O | O | O |
| Clay | O | O | O | O | O | O | O | O |
| Feldspar | O | O | O | O | O | O | O | O |
| Dolomite | O | O | O | O | O | O | O | O |
| Magnesite | — | — | — | — | — | — | — | — |
| Calcite | — | — | — | — | — | — | — | — |
| Barium carbonate | — | — | — | — | — | — | — | — |
| Composition of minerals in raw material | | | | | | | | |
| Corundum | 21.15 | 21.15 | 21.15 | 21.15 | 21.67 | 21.67 | 21.67 | 21.67 |
| Mullite | 5.29 | 5.29 | 5.29 | 5.29 | 5.17 | 5.17 | 5.17 | 5.17 |
| Quartz | 24.24 | 24.24 | 24.24 | 24.24 | 23.69 | 23.69 | 23.69 | 23.69 |

TABLE 13-continued

| Blank No | 97 | 98 | 99 | 100 | 101 | 102 | 103 | 104 |
|---|---|---|---|---|---|---|---|---|
| Kaolinites | 37.73 | 37.73 | 37.73 | 37.73 | 32.87 | 36.87 | 36.87 | 36.87 |
| Sericite | 10.18 | 10.18 | 10.18 | 10.18 | 9.95 | 9.95 | 9.95 | 9.95 |
| Others | 1.42 | 1.42 | 1.42 | 1.42 | 3.66 | 3.66 | 3.66 | 3.66 |
| Crystal-composed minerals[1] | 50.68 | 50.68 | 50.68 | 50.68 | 50.53 | 50.53 | 50.53 | 50.53 |
| Average grain size of raw materials ($\mu$m) | 6.7 | 6.7 | 6.7 | 6.7 | 6.7 | 6.7 | 6.7 | 6.7 |
| Firing temperature (° C.) | 1100 | 1200 | 1300 | 1400 | 1100 | 1200 | 1300 | 1400 |
| Blank composition (wt %) | | | | | | | | |
| Crystal phase | 61.6 | 58.1 | 57.2 | 51.8 | 61.2 | 52.0 | 51.0 | 46.2 |
| Glass phase | 38.4 | 41.9 | 42.8 | 48.2 | 38.8 | 48.0 | 49.0 | 53.8 |
| Chemical composition of the blank | | | | | | | | |
| $SiO_2$ | 52.68 | 52.68 | 52.68 | 52.68 | 52.04 | 52.04 | 52.04 | 52.04 |
| $Al_2O_3$ | 43.45 | 43.45 | 43.45 | 43.45 | 42.87 | 42.87 | 42.87 | 42.87 |
| $Na_2O$ | 0.05 | 0.05 | 0.05 | 0.05 | 0.05 | 0.05 | 0.05 | 0.05 |
| $K_2O$ | 1.21 | 1.21 | 1.21 | 1.21 | 1.19 | 1.19 | 1.19 | 1.19 |
| MgO | 0.20 | 0.20 | 0.20 | 0.20 | 0.68 | 0.68 | 0.68 | 0.68 |
| CaO | 0.23 | 0.23 | 0.23 | 0.23 | 1.02 | 1.02 | 1.02 | 1.02 |
| Others | 2.17 | 2.17 | 2.17 | 2.17 | 2.15 | 2.15 | 2.15 | 2.15 |
| Flux portion[2] | 1.69 | 1.69 | 1.69 | 1.69 | 2.94 | 2.94 | 2.94 | 2.94 |
| Alkaline earth mole ratio[3] | 39.927 | 39.927 | 39.927 | 39.927 | 72.161 | 72.161 | 72.161 | 72.161 |
| Chemical composition of the glass phase | | | | | | | | |
| $SiO_2$ | 64.00 | 73.90 | 82.77 | 82.61 | 61.90 | 72.35 | 77.26 | 74.33 |
| $Al_2O_3$ | 25.93 | 16.87 | 8.20 | 9.36 | 24.98 | 17.05 | 12.35 | 16.21 |
| $Na_2O$ | 0.14 | 0.13 | 0.12 | 0.11 | 0.14 | 0.11 | 0.11 | 0.10 |
| $K_2O$ | 3.15 | 2.89 | 2.83 | 2.51 | 3.07 | 2.49 | 2.43 | 2.22 |
| MgO | 0.53 | 0.48 | 0.47 | 0.42 | 1.75 | 1.41 | 1.39 | 1.26 |
| CaO | 0.59 | 0.55 | 0.53 | 0.47 | 2.62 | 2.12 | 2.08 | 1.89 |
| Others | 5.66 | 5.19 | 5.08 | 4.51 | 5.53 | 4.47 | 4.38 | 3.99 |
| Contained minerals | | | | | | | | |
| Corundum | 20.0 | 19.8 | 19.7 | 14.1 | 19.9 | 19.9 | 18.8 | 9.6 |
| Mullite | 18.8 | 23.1 | 28.2 | 34.6 | 18.5 | 20.6 | 25.1 | 34.2 |
| Quartz | 22.8 | 15.2 | 9.3 | 3.1 | 22.8 | 11.5 | 7.1 | 2.4 |
| Blank physical properties | | | | | | | | |
| Water absorbing rate (%) | 19.6 | 14.9 | 8.7 | 4.0 | 19.7 | 10.6 | 5.2 | 0.066 |
| Firing shrinkage rate (%) | 1.5 | 3.8 | 6.1 | 7.5 | 1.2 | 5.5 | 7.1 | 8.1 |
| Strength (MPa)[4] | 16.9 | 46.1 | 97.6 | 129.7 | 19.5 | 84.6 | 101.2 | 119.1 |
| Firing deformation (mm) | 1.3 | 5.3 | 11.2 | 16.4 | 2.2 | 9.8 | 17.5 | 25.4 |
| Porosity (%)[4] | 35.6 | 30.3 | 20.3 | 12.9 | 35.7 | 23.4 | 14.5 | 9.5 |
| Thermal shock resistance$\Delta T(C)$[4] | 140 | 140 | 140 | 130 | 140 | 140 | 130 | 120 |
| Glaze matching (%) | — | 112 | — | — | — | 103 | — | — |

[1]Corundum, quartz, etc.
[2]Total amount of alkaline and alkaline earth oxides
[3]Mole percentage of alkaline earth oxides in 2
[4]For those of vigorous bubbling, strength and thermal shock resistance have not yet been measured.
[5]Because of using a glaze for firing temperature of 1200° C., those for other firing temperatures than 1200° C. have not yet been estimated.

TABLE 14

| Blank No. | 105 | 106 | 107 | 108 | 109 | 110 | 111 | 112 |
|---|---|---|---|---|---|---|---|---|
| Presence of raw material mixing O - presence) | | | | | | | | |
| Alumina | — | — | — | — | — | — | — | — |
| Fired alum shale | O | O | O | O | O | O | O | O |
| Silica sand 10 $\mu$m | — | — | — | — | — | — | — | — |
| Silica sand 15 $\mu$m | O | O | O | O | O | O | O | O |
| Pottery stone | O | O | O | O | O | O | O | O |
| Clay | O | O | O | O | O | O | O | O |
| Feldspar | O | O | O | O | O | O | O | O |
| Dolomite | O | O | O | O | O | O | O | O |
| Magnesite | — | — | — | — | — | — | — | — |
| Calcite | — | — | — | — | — | — | — | — |
| Barium carbonate | — | — | — | — | — | — | — | — |

TABLE 14-continued

| Blank No. | 105 | 106 | 107 | 108 | 109 | 110 | 111 | 112 |
|---|---|---|---|---|---|---|---|---|
| Composition of minerals in raw material | | | | | | | | |
| Corundum | 20.00 | 20.00 | 20.00 | 20.00 | 19.11 | 19.11 | 19.11 | 19.11 |
| Mullite | 5.00 | 5.00 | 5.00 | 5.00 | 4.78 | 4.78 | 4.78 | 4.78 |
| Quartz | 23.17 | 23.17 | 23.17 | 23.17 | 22.70 | 22.70 | 22.70 | 22.70 |
| Kaolinites | 35.68 | 35.68 | 35.68 | 35.68 | 34.09 | 34.09 | 34.09 | 34.09 |
| Sericite | 9.62 | 9.62 | 9.62 | 9.62 | 9.19 | 9.19 | 9.19 | 9.19 |
| Others | 6.52 | 6.52 | 6.52 | 6.52 | 10.13 | 10.13 | 10.13 | 10.13 |
| Crystal-composed minerals[1] | 48.17 | 48.17 | 48.17 | 48.17 | 46.59 | 46.59 | 46.59 | 46.59 |
| Average grain size of raw materials ($\mu$m) | 6.6 | 6.6 | 6.6 | 6.6 | 6.6 | 6.6 | 6.6 | 6.6 |
| Firing temperature (° C.) | 1100 | 1200 | 1300 | 1400 | 1100 | 1200 | 1300 | 1400 |
| Blank composition (wt %) | | | | | | | | |
| Crystal phase | 56.6 | 48.2 | 46.7 | 49.2 | 49.4 | 41.6 | 41.2 | 49.5 |
| Glass phase | 43.4 | 51.8 | 53.3 | 50.8 | 50.6 | 58.4 | 58.8 | 50.5 |
| Chemical composition of the blank | | | | | | | | |
| $SiO_2$ | 51.55 | 51.55 | 51.55 | 51.55 | 51.24 | 51.24 | 51.24 | 51.24 |
| $Al_2O_3$ | 42.14 | 42.14 | 42.14 | 42.14 | 41.21 | 41.21 | 41.21 | 41.21 |
| $Na_2O$ | 0.16 | 0.16 | 0.16 | 0.16 | 0.39 | 0.39 | 0.39 | 0.39 |
| $K_2O$ | 1.28 | 1.28 | 1.28 | 1.28 | 1.50 | 1.50 | 1.50 | 1.50 |
| MgO | 1.08 | 1.08 | 1.08 | 1.08 | 1.39 | 1.39 | 1.39 | 1.39 |
| CaO | 1.70 | 1.70 | 1.70 | 1.70 | 2.25 | 2.25 | 2.25 | 2.25 |
| Others | 2.10 | 2.10 | 2.10 | 2.10 | 2.02 | 2.02 | 2.02 | 2.02 |
| Flux portion[2] | 4.22 | 4.22 | 4.22 | 4.22 | 5.52 | 5.52 | 5.52 | 5.52 |
| Alkaline earth mole ratio[3] | 77.978 | 77.978 | 77.978 | 77.978 | 77.121 | 77.121 | 77.121 | 77.121 |
| Chemical composition of the glass phase | | | | | | | | |
| $SiO_2$ | 56.58 | 69.97 | 72.63 | 74.33 | 58.97 | 68.22 | 69.68 | 74.24 |
| $Al_2O_3$ | 28.87 | 17.83 | 15.62 | 13.23 | 26.12 | 18.86 | 17.49 | 10.82 |
| $Na_2O$ | 0.36 | 0.30 | 0.29 | 0.31 | 0.76 | 0.66 | 0.66 | 0.76 |
| $K_2O$ | 2.96 | 2.48 | 2.41 | 2.53 | 2.96 | 2.57 | 2.55 | 2.97 |
| MgO | 2.49 | 2.09 | 2.03 | 2.13 | 2.75 | 2.38 | 2.36 | 2.75 |
| CaO | 3.92 | 3.28 | 3.19 | 3.35 | 4.44 | 3.85 | 3.82 | 4.45 |
| Others | 4.84 | 4.05 | 3.94 | 4.13 | 4.00 | 3.47 | 3.44 | 4.01 |
| Contained minerals | | | | | | | | |
| Corundum | 19.7 | 18.9 | 15.7 | 7.2 | 19.6 | 18.5 | 13.2 | 6.1 |
| Mullite | 13.8 | 19.5 | 25.3 | 39.3 | 11.7 | 16.3 | 24.7 | 41.3 |
| Quartz | 23.1 | 9.8 | 5.7 | 2.7 | 18.1 | 6.8 | 3.3 | 2.1 |
| Blank physical properties | | | | | | | | |
| Water absorbing rate (%) | 19.9 | 6.8 | 0.52 | 1.1 | 20.5 | 0.15 | 0.66 | 4.4 |
| Firing shrinkage rate (%) | 1.1 | 6.7 | 7.3 | 7.1 | 1.0 | 8.1 | 7.5 | 6.9 |
| Strength (MPa)[4] | 24.3 | 88.0 | 128.9 | bubbling | 28.0 | bubbling | bubbling | bubbling |
| Firing deformation (mm) | 2.9 | 16.6 | 312 | >40 | 3.4 | 24.0 | >40 | >40 |
| Porosity (%)[4] | 35.9 | 17.0 | 35.9 | — | 9.8 | — | — | — |
| Thermal shock resistance$\Delta$T(C)[4] | 140 | 140 | 140 | bubbling | 140 | bubbling | bubbling | bubbling |
| Glare matching (%)[5] | — | 103 | — | — | — | 93 | — | — |

[1]Corundum, quartz, etc.
[2]Total amount of alkaline and alkaline earth oxides
[3]Mole pencentage of alkaline earth oxides in 2
[4]For those of vigorous bubbling, strength and thermal shock resistance have not yet been measured.
[5]Because of using a glaze for firing temperature of 1200° C., those for other firing temperatures than 1200° C. have not yet been estimated.

TABLE 15

| Blank No. | 201 | 202 | 203 |
|---|---|---|---|
| Presence of raw material mixing O - presence) | | | |
| Alumina | — | — | — |
| Fired alum shale | — | — | — |
| Silica sand 10 $\mu$m | — | — | — |
| Silica sand 15 $\mu$m | — | — | — |
| Pottery stone | O | O | O |
| Clay | O | O | O |
| Feldspar | O | O | O |
| Dolomite | O | O | O |
| Magnesite | — | — | — |
| Calcite | — | — | — |
| Barium carbonate | — | — | — |
| Composition of minerals in raw material | | | |
| Corundum | 0.00 | 0.00 | 0.00 |
| Mullite | 0.00 | 0.00 | 0.00 |
| Quartz | 31.65 | 31.65 | 33.83 |

TABLE 15-continued

| Blank No. | 201 | 202 | 203 |
|---|---|---|---|
| Kaolinites | 34.62 | 34.62 | 33.83 |
| Sericite | 24.36 | 24.36 | 27.98 |
| Others | 9.37 | 9.37 | 4.81 |
| Crystal-composed minerals[1] | 31.65 | 31.65 | 33.83 |
| Average grain size of raw materials ($\mu$m) | 6.4 | 5.1 | 4.9 |
| Firing temperature (° C.) | 1200 | 1200 | 1200 |
| Blank composition (wt %) | | | |
| Crystal phase | 24.0 | 21.5 | 23.1 |
| Glass phase | 76.0 | 78.5 | 76.9 |
| Chemical composition of the blank | | | |
| $SiO_2$ | 68.37 | 68.37 | 70.27 |
| $Al_2O_3$ | 24.86 | 24.86 | 24.41 |
| $Na_2O$ | 1.04 | 1.04 | 0.46 |
| $K_2O$ | 2.67 | 2.67 | 3.14 |
| MgO | 0.59 | 0.59 | 0.31 |
| CaO | 0.99 | 0.99 | 0.45 |
| Others | 1.48 | 1.48 | 0.96 |
| Flux portion[2] | 5.29 | 5.29 | 4.36 |
| Alkaline earth mole ratio[3] | 41.733 | 41.733 | 27.846 |
| Chemical composition of the glass phase | | | |
| $SiO_2$ | 71.288 | 72.145 | 73.382 |
| $Al_2O_3$ | 19.86 | 19.23 | 19.70 |
| $Na_2O$ | 1.3684 | 1.3248 | 0.5982 |
| $K_2O$ | 3.5132 | 3.4013 | 4.0832 |
| MgO | 0.7763 | 0.7516 | 0.4031 |
| CaO | 1.3026 | 1.2611 | 0.5852 |
| Others | 1.9474 | 1.8854 | 1.2484 |
| Contained minerals | | | |
| Corundum | 0 | 0 | 0 |
| Mullite | 13.6 | 13.6 | 12.9 |
| Quartz | 10.4 | 7.9 | 10.2 |
| Blank physical properties | | | |
| Water absorbing rate (%) | 0.03 | 0.03 | 0.02 |
| Firing shrinkage rate (%) | 9.2 | 9.3 | 9.6 |
| Strength (MPa)[4] | 120.7 | 133.7 | 127.0 |
| Firing deformation (mm) | 22.3 | 20.3 | 14.9 |

As raw material for alumina of alumina ceramic blank, alumina made by Sumitomo Chemical Industry Ltd. was used. As silica sand, ground powder of Masuda silica rock was used. The purity of $SiO_2$ is 99.5%.

Preparation of blank is performed in accordance with the following method.

First, by adding water and an appropriate amount of water glass as deflocculant to the raw material for blank and grinding the mixture with a ball mill, crude slurry was obtained.

Next, by pouring starting slurry into a plaster mold for test-piece molding and releasing it from the mold after the deposit-thickness formation, test pieces were molded. The test pieces were fired at 1100–1400° C. in an electric furnace. The grain size of raw materials was measured by the laser scattering method (microtrack FRA).

The strength of blank was measured on ϕ13×130 mm test pieces under conditions of span 100 mm and cross head speed 2.5 mm/min by the 3-point bending method.

In addition, the strength of ceramic materials differs with shapes of test pieces. Thus, TABLE 16 and TABLE 17 show the experimental results concerning the relation between the shapes and the strength of test pieces.

TABLE 16

Relation between Strength Measurement Test Piece Shape and Strength in Ceramic blank
Strength for Individual Shapes of Test Pieces in Ceramic blank

| Test Piece Shape | Bending Strength (MPa) |
|---|---|
| Round bar, about 13 mm in diameter, about 130 mm in length | 147.0 |
| Flat, about 27 mm in width, about 10 mm in thickness, about 130 mm in length | 116.5 |
| Flat, about 30 mm in width, about 7 mm in thickness, about 130 mm in length | 116.9 |
| Flat, one-side applied glaze[*], about 30 mm in width, about 8 mm in thickness, about 130 mm in length | 107.8 |

[*]Test piece cut out from sanitary ware produced with this ceramic blank

TABLE 17

Strength for Individual Shapes of Test Pieces in Ceramic blank

| Test Piece Shape | Bending Strength (MPa) |
|---|---|
| Round bar, about 13 mm in diameter, about 130 mm in length | 82.2 |
| Flat, about 27 mm in width, about 10 mm in thickness, about 130 mm in length | 70.2 |
| Flat, about 30 mm in width, about 7 mm in thickness, about 130 mm in length | 62.8 |
| Flat, one-side applied glaze[*], about 30 mm in width, about 10 mm in thickness, about 130 mm in length | 63.4 |

[*]Test piece cut out from sanitary ware produced with this ceramic blank

With respect to firing deformed amount, the flexure after the firing and the thickness of test pieces, measurements were made with 30 mm wide, 15 mm thick and 260 mm long test pieces (unfired blanks) supported at span of 200 mm during the firing. Since the flexure at this time varies at the inverse proportion to the square of the thickness of the test pieces after the firing, the flexure converted for the thickness of 10 mm by using the following formula was defined as firing deformed amount.

Firing deformed amount=measured flexure×(thickness of a test piece after the firing)$^2$/$10^2$ With respect to matching of a glaze (glaze peeling, occurrence of beading), firing was performed after applying the Bristle glaze shown in TABLE 2 to the outer circumference of a semicircular test piece referred to as a ring, 100 mm in diameter, 4 mm in thickness and 30 mm in width, so as to be about 0.5 mm in thickness, and the obtained result was expressed in % relative to the diameter of the comparative blank 1. The greater this value is, the better the matching of a glaze proves to be.

With thermal shock resistance, a 25 mm wide, 10 mm thick and 110 mm long test piece was thrown into water and cooled rapidly after being maintained at a predetermined temperature for an hour or higher, and the presence of cracks generated was checked for estimation, thereby revealing the maximum temperature difference without cracks being generated.

With respect to firing deformed amount during reheating, after firing 30 mm wide, 5 mm thick and 230 mm long test pieces (fired blanks) supported on two points in a span of 200 mm, the temperature was raised to 1000° C. in 4 hr, further raised to a predetermined temperature at the rate of 100° C. for one hour and was kept at the predetermined temperature for one hour, the test pieces were allowed to stand for natural cooling until the temperature reached to room temperatures and the flexure of the test pieces observed at the time is defined as deformed amount during reheating.

When the thickness of a test piece does not reach 5 mm, however, a corrected value is to be adopted as the deformed amount at the reheating because the flexure is inversely proportional to the thickness of the test piece.

The correction method comprises the steps of actually measuring the deformed amount at the reheating on two types of test pieces different in thickness, calculating a value of n according to the following equation, and further evaluating the deformed amount at the reheating for a 5 mm thick test piece.

Deformed amount 2=deformed amount 1×(thickness 1. thickness 2)$^n$

Deformed amount 1: deformed amount at the reheating on test piece of thickness 1;

Deformed amount 2: deformed amount at the reheating on test piece of thickness 2; and n: constant for correction.

TABLES 18–21 show the experimental results concerning deformed amount at the reheating. TABLE 18 shows raw materials used for test blanks Nos. 301–304, amounts of minerals contained in raw material, physical properties of blanks and such others, TABLE 19 shows firing deformed amount of each blank and deformed amounts for different reheating temperatures, TABLE 20 shows the relation between test temperatures and thickness correction and TABLE 21 shows the relation between firing deformed amount and high-temperature creep or reheating deformed amount.

TABLE 18

| Blank No. | 301 | 302 | 303 | 304 |
|---|---|---|---|---|
| Presence of raw material mixing O - presence) | | | | |
| Alumina | — | — | — | — |
| Fired alum shale | — | — | O | O |
| Silica sand 10 μm | — | — | — | — |
| Silica sand 15 μm | — | — | O | O |
| Pottery stone | O | O | O | O |
| Clay | O | O | O | O |
| Feldspar | O | O | O | O |
| Dolomite | O | O | O | O |
| Magnesite | — | — | — | — |
| Calcite | — | — | — | — |
| Barium carbonate | — | — | — | — |
| Composition of minerals in raw material | | | | |
| Corundum | 0.00 | 0.00 | 20.00 | 21.20 |
| Mullite | 0.00 | 0.00 | 5.00 | 5.17 |
| Quartz | 32.64 | 31.65 | 23.17 | 24.32 |
| Kaolinites | 30.79 | 34.62 | 35.67 | 36.87 |
| Sericite | 26.57 | 24.38 | 9.62 | 10.18 |
| Others | 10.00 | 9.37 | 6.54 | 2.26 |
| Crystal composed minerals[1] | 32.64 | 31.65 | 48.17 | 50.69 |
| Average grain size of raw materials (μm) | 8.3 | 8.1 | 4.5 | 4.5 |
| Firing temperature (° C.) | 1200 | 1200 | 1200 | 1200 |
| Blank composition (wt %) | | | | |
| Crystal phase | 24.8 | 25.2 | 44.6 | 49.3 |
| Glass phase | 75.2 | 74.8 | 55.4 | 50.7 |
| Chemical composition of the blank | | | | |
| $SiO_2$ | 70.65 | 68.73 | 51.55 | 52.58 |

TABLE 18-continued

| Blank No. | 301 | 302 | 303 | 304 |
|---|---|---|---|---|
| $Al_2O_3$ | 22.66 | 24.86 | 42.14 | 43.35 |
| $Na_2O$ | 0.73 | 1.04 | 0.16 | 0.15 |
| $K_2O$ | 3.42 | 2.67 | 1.28 | 1.23 |
| MgO | 0.72 | 0.59 | 1.08 | 0.21 |
| CaO | 1.17 | 0.99 | 1.70 | 0.23 |
| Others | 0.65 | 1.48 | 2.09 | 2.25 |
| Flux portion[2] | 6.04 | 5.29 | 4.22 | 1.82 |
| Alkaline earth mole ratio[3] | 44.631 | 41.733 | 77.948 | 37.58 |
| Chemical composition of the glass phase | | | | |
| $SiO_2$ | 72.904 | 70.863 | 69.366 | 66.535 |
| $Al_2O_3$ | 18.20 | 20.09 | 19.24 | 25.44 |
| $Na_2O$ | 0.9707 | 1.3904 | 0.2888 | 0.2959 |
| $K_2O$ | 4.5479 | 3.5695 | 2.3105 | 2.426 |
| MgO | 0.9574 | 0.7888 | 1.9495 | 0.4142 |
| CaO | 1.5559 | 1.3235 | 3.0686 | 0.4536 |
| Others | 0.8644 | 1.9786 | 3.7726 | 4.4379 |
| Contained minerals | | | | |
| Corundum | 0 | 0 | 18.7 | 19.9 |
| Mullite | 12.5 | 13.7 | 17.8 | 14.7 |
| Quartz | 12.3 | 11.5 | 8.1 | 14.7 |
| Blank physical properties | | | | |
| Water absorbing rate (%) | 0.04 | 0.07 | 0.07 | 10.7 |
| Firing shrinkage rate (%) | 9.5 | 8.7 | 9.6 | 6.1 |
| Strength (MPa) | 82.2 | 90.1 | 147.0 | 78.5 |
| Firing deformation (mm) | 34.6 | 22.3 | 16.2 | 7.0 |
| True density (g/cm$^3$) | 2.63 | 2.64 | 2.82 | 2.85 |
| Bulk density (g/cm$^3$) | 2.39 | 2.39 | 2.51 | 2.18 |
| Porosity (%) | 10.0 | 10.5 | 12.4 | 30.7 |

TABLE 19

Firing Deformed Amount of Individual Blanks (mm)

| Blank No. | Measured value | Thickness measured value | 10 mm-thickness correction value |
|---|---|---|---|
| 301 | 38.3 | 9.505 | 34.60 |
| 302 | 25.5 | 9.345 | 22.27 |
| 303 | 18.8 | 9.292 | 16.23 |
| 303 | 29.2 | 7.452 | 16.22* |
| 303 | 41.5 | 6.258 | 16.25* |
| 304 | 6.2 | 10.586 | 6.95 |

Deformed Amount during Reheating at 1180° C. × 1 Hr (mm)

| Blank No. | Measured value | Thickness measured value | 5 mm-thickness correction value |
|---|---|---|---|
| 301 | 12.5 | 6.242 | 20.64 |
| 302 | 7.25 | 5.930 | 10.37 |
| 303 | 1.1 | 5.729 | 1.35 |
| 304 | 0 | 5.821 | 0.00 |

Deformed Amount during Reheating at 1200° C. × 1 Hr (mm)

| Blank No. | Measured value | Thickness measured value | 5 mm-thickness correction value |
|---|---|---|---|
| 301 | 26.65 | 5.75 | 36.55 |
| 302 | 13.05 | 5.37 | 15.16 |
| 303 | 2.55 | 5.31 | 2.79 |
| 304 | 0 | 5.65 | 0.00 |

Deformed Amount during Reheating at 1200° C. × 1 Hr (mm)
10 mm thick sample

| Blank No. | Measured value | Thickness measured value | 5 mm-thickness correction value |
|---|---|---|---|
| 301 | 8.6 | 9.487 | 36.57 |

TABLE 19-continued

| | | | |
|---|---|---|---|
| 302 | 4.1 | 9.312 | 15.13 |
| 303 | 1.1 | 9.226 | 2.79 |
| 304 | 0 | 9.152 | 0.00 |

| Creep Deformed Amount during Reheating at 1220° C. × 1 Hr (mm) | | | n-Value of Individual Blanks | |
|---|---|---|---|---|
| | Thickness | 5 mm-thickness | | |
| Blank No. | Measured value | measured value | correction value | Blank No. | n |
| 301 | 15.6 | 9.475 | 66.15 | 301 | 2.26 |
| 302 | 16.2 | 5.939 | 23.25 | 302 | 2.10 |
| 303 | 2.8 | 5.795 | 3.50 | 303 | 1.52 |
| 304 | 0 | 5.852 | 0.00 | 304 | — |

*As a result of modification of thickness in firing deformed amount measurement test piece, the firing deformed amount is inversely proportional to the square of thickness.

TABLE 20

Reheating Temperature and Deformed Amount of Fired Ceramic Blanks

| Blank No. | 1180 | 1200 | 1220 |
|---|---|---|---|
| 301 | 20.64 | 36.55 | 66.15 |
| 302 | 10.37 | 15.16 | 23.25 |
| 303 | 1.35 | 2.79 | 3.50 |
| 304 | 0.00 | 0.00 | 0.00 |

TABLE 21

Fired Deformed Amount and Reheating Deformed Amount of Ceramic Blanks

| Blank No. | 301 | 302 | 303 | 304 |
|---|---|---|---|---|
| Fired deformed amount (mm) | 34.60 | 22.27 | 16.23 | 6.95 |
| Reheating deformed amount*) (mm) | 36.55 | 15.16 | 2.79 | 0.00 |

*)Reheating temperature 1200° C.

In these, measurements of porosity of fired blanks were carried out according to the following equation.

Porosity=(true density−bulk density)÷true density

Bulk density of blanks was measured by Archimedes method and true density was measured with a gas-filled multi-volume densimeter by using samples of blanks crushed to about 10 μm or smaller in average grain size.

In addition, viscosity of prepared crude slurry was measured at 60 rpm, number of revolution, with a B-type viscosimeter.

Hereinafter, the experimental results shown in TABLES 3–15 mentioned above will be described referring also to the drawings.

First, with reference to TABLE 3, as compared with the comparative blank 1, with increasing addition of alumina, a higher strength is obtained in alumina ceramic blanks such as the comparative blanks 2–11. By contraries, thermal shock resistance worsens and firing deformed amount increases.

In addition, the matching of a glaze becomes extremely worse and such Bristle glaze cannot be used.

Even in such alumina ceramics, thermal shock resistance and matching of a glaze are somewhat improved by addition of silica sand. For thermal shock resistance, use of coarse-grained silica sand and for matching of a glaze, use of fine-grained silica sand are largely effective in improvement. However, use of coarse-grained silica sand will leads to a decrease in strength. By such methods, thermal shock resistance and matching of a glaze can be somewhat improved but a sufficient effect is not obtained.

As shown in FIG. 1, an increase in the addition ratio of alkaline earth oxides in sintering assistant will increase the porosity (amount of closed pores) remaining in blanks.

Figure 2:
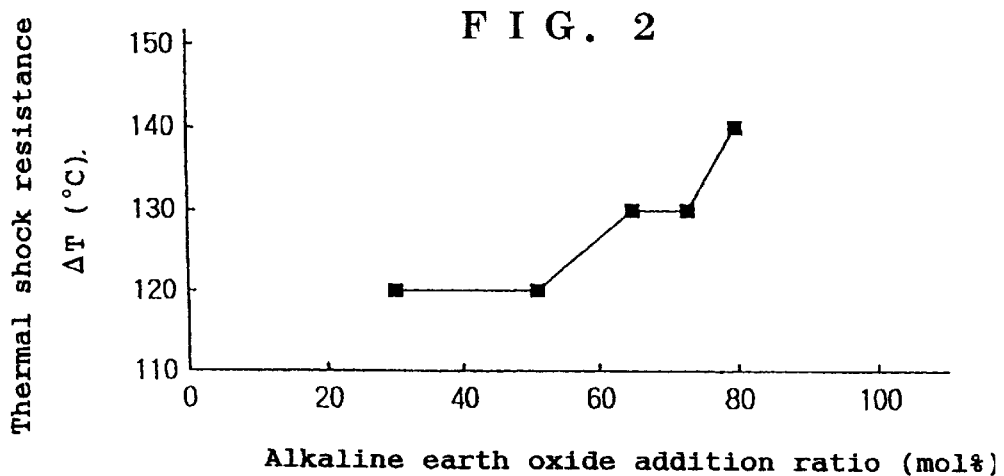
FIG. 2 is a graph showing the relationship between the addition ratio of alkaline earth oxides and thermal shock resistance according to the present invention.
Figure 3:
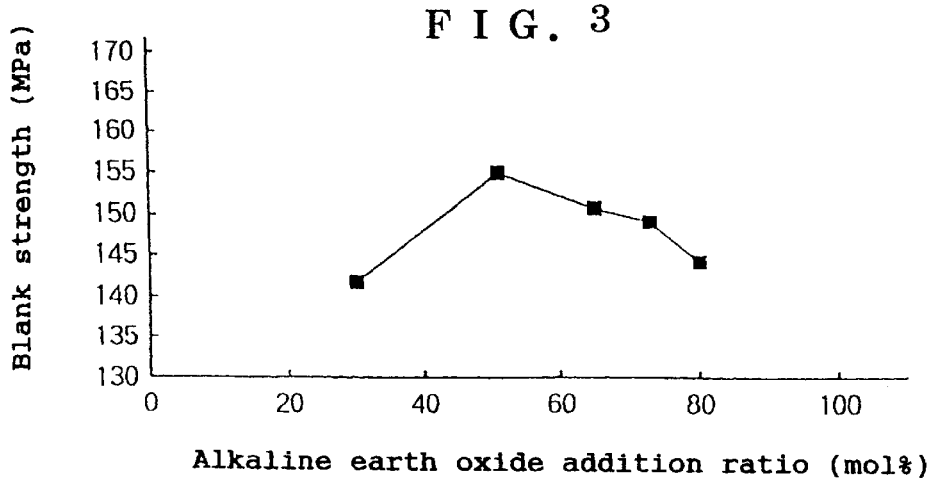
FIG. 3 is a graph showing the relationship between the addition ratio of alkaline earth oxides and the strength of blank according to the present invention.

And as shown in FIG. 2, an enhancement of thermal shock resistance in proportion to the former increase is noticed. On the hand, as shown in FIG. 3, no feared decrease in strength is noticed.

Concerning this increase in porosity and enhancement of thermal shock resistance, the same result was obtained also for mixing examples of other blanks.

Figure 4:
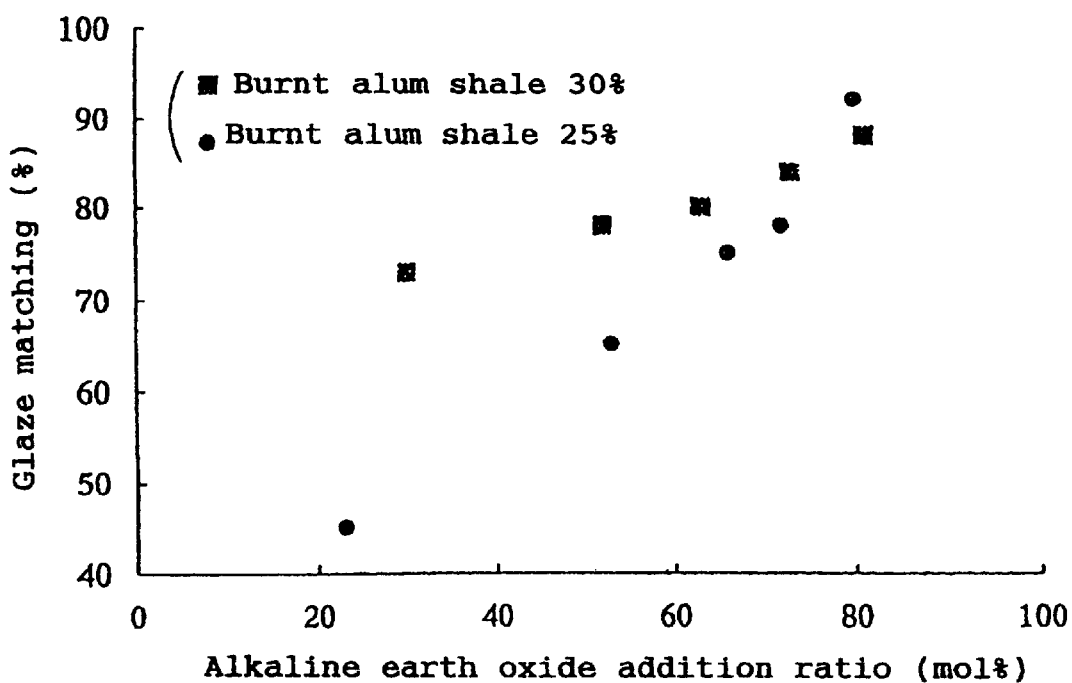
FIG. 4 is a graph showing the relationship between the addition ratio of alkaline earth oxides and the matching of a glaze for individual mixed amounts of fired alum shale according to the present invention.

Next, as shown in FIG. 4, the matching of a glaze can be similarly improved by increasing the addition ratio of alkaline earth oxides. On the other hand, firing deformation becomes minimum at an alkaline earth oxides addition ratio of 50 mol % or thereabout as shown in FIG. 5 and firing deformation worsens even at lower and higher ratios.

Figure 5:
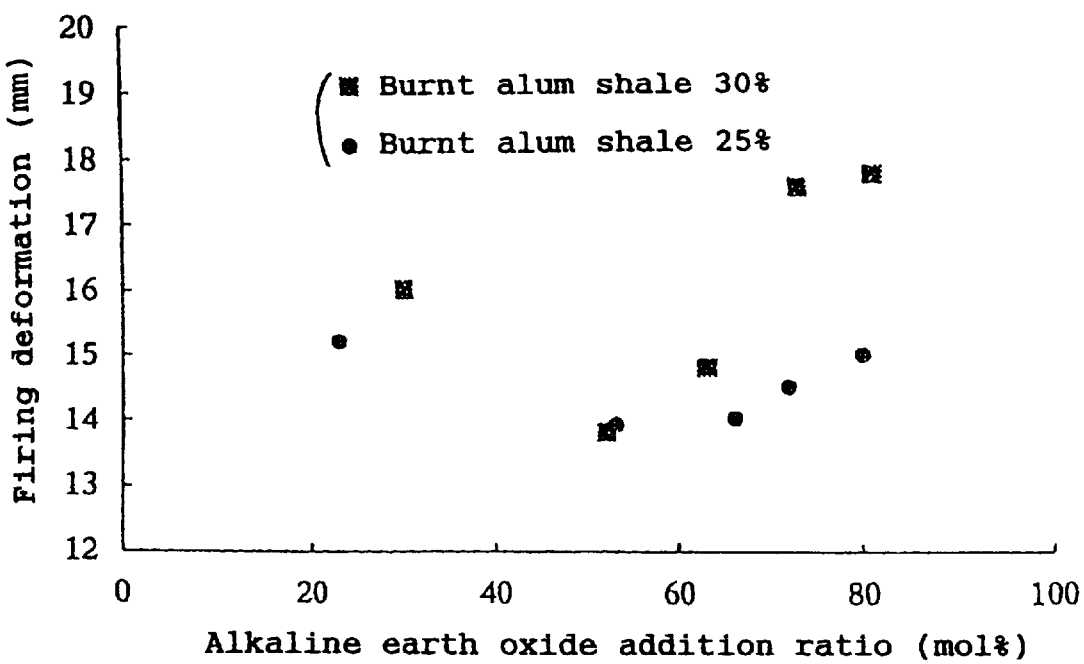
FIG. 5 is a graph showing the relationship between the addition ratio of alkaline earth oxides and the firing deformed amount for individual mixed amounts of fired alum shale according to the present invention.

Meanwhile, as shown in FIG. 4 or 5, the relation between improving effect in the matching of a glaze or firing deformation and alkaline earth oxides differs with the mixing of raw materials, such as mixed amount of burnt alum shale. This dependence is connected with the total amount of minerals, such as corundum, mullite and quartz remaining in blanks, contained in the raw materials and with increasing a total amount of them, such that the difference in firing deformed amount relative to the addition ratio of alkaline earth oxides becomes marked. The effect for matching improvement of a glaze becomes similar.

Next, concerning the relation between the sorts of alkaline earth oxides and the effect thereof, more or less of difference is observed. First, when the alkaline earth oxides are MgO and CaO, differences in firing deformed amounts and matching of a glaze appears in dependence on individual ratios.

Figure 6:
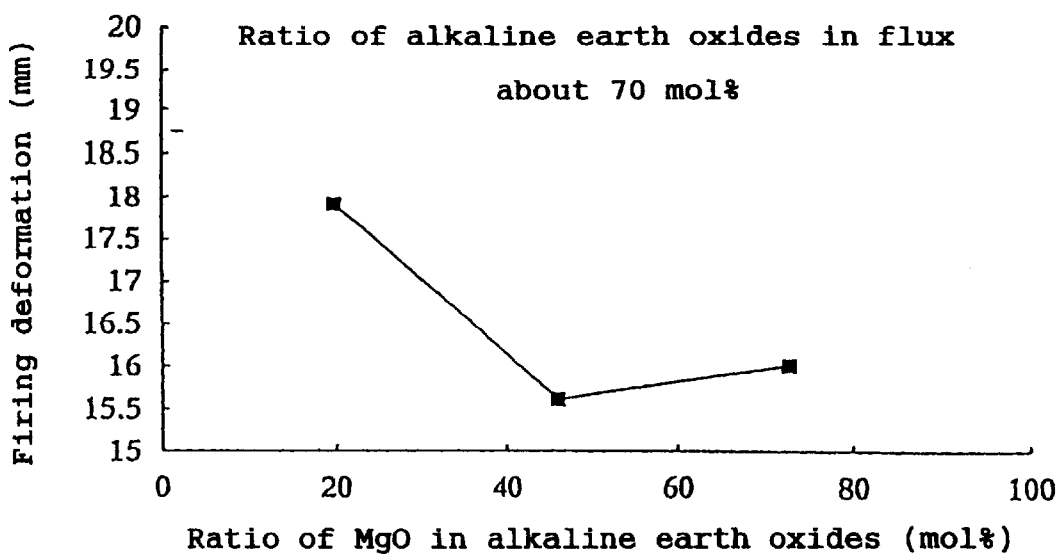
FIG. 6 is a graph showing the relationship between the ratio of MgO in alkaline earth oxides and the firing deformed amount the alkaline earth oxides comprising MgO and CaO according to the present invention.
Figure 7:
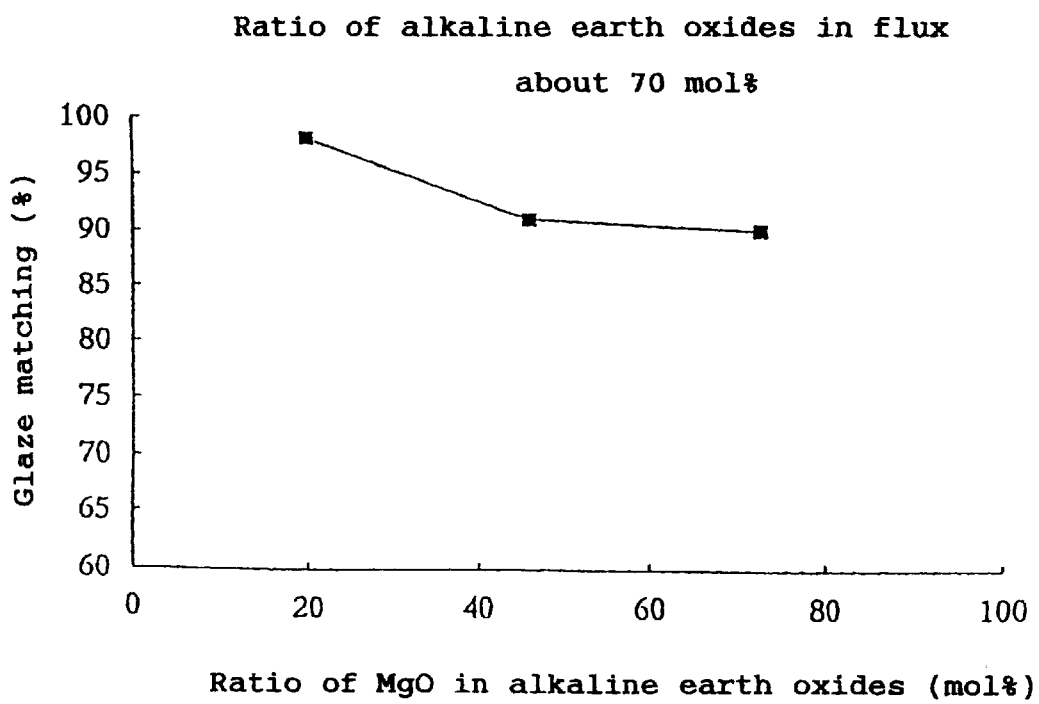
FIG. 7 is a graph showing the relationship between the ratio of MgO in alkaline earth oxides and the matching of a glaze for the alkaline earth oxides comprising MgO and CaO according to the present invention.

That is, the firing deformed amount reaches a minimum at a mole ratio of about 1:1 between MgO and CaO as shown in FIG. 6, whereas the matching of a glaze tends to worsen with increasing ratio of MgO as shown in FIG. 7.

Furthermore, also when the alkaline earth oxides are MgO, CaO and BaO, the firing deformed amount and matching of a glaze exhibit a different tendency in dependence of individual ratios.

Figure 8:
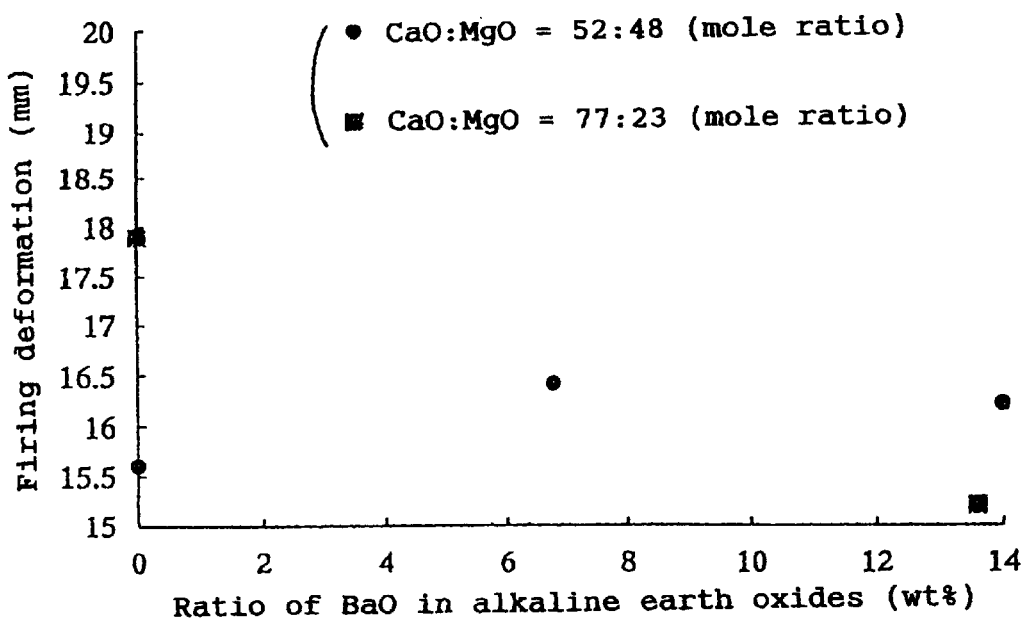
FIG. 8 is a graph showing the relationship between the ratio of BaO in alkaline earth oxides and the firing deformed amount for individual ratios of CaO to MgO in alkaline earth oxides according to the present invention.

That is, as shown in FIG. 8, at a larger ratio of CaO to MgO, the firing deformed amount decreases with increasing ratio of BaO. By contraries, at a smaller ratio of CaO, the firing deformed amount increases with increasing ratio of BaO.

Figure 9:
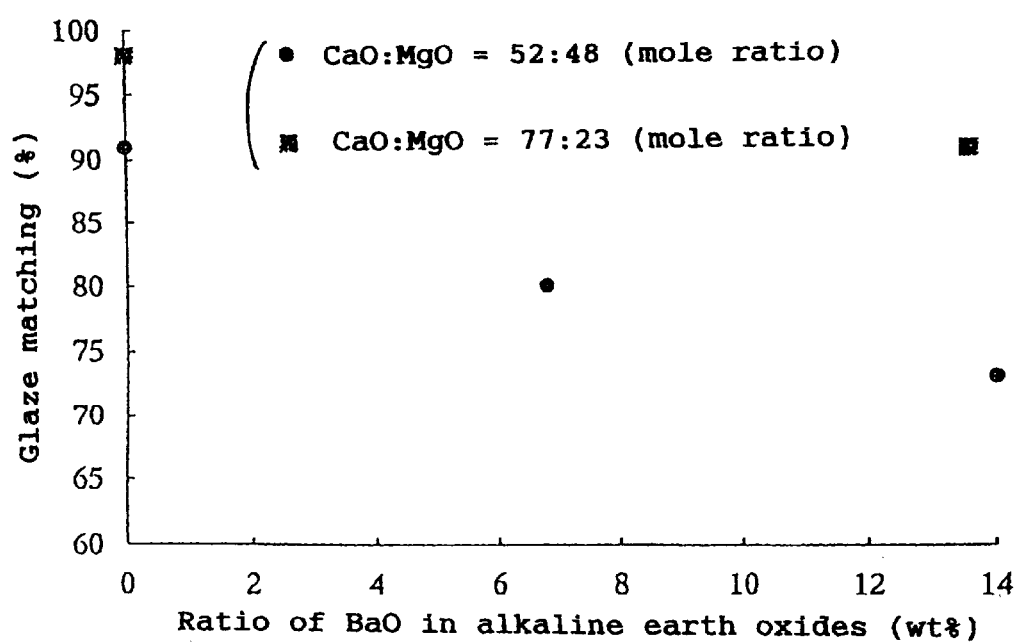
FIG. 9 is a graph showing the relationship between the ratio of BaO in alkaline earth oxides and the matching of a glaze for individual ratios of CaO to MgO in alkaline earth oxides according to the present invention.

And, as shown in FIG. 9, the matching of a glaze tends to worsen with increasing ratios of MgO and BaO to CaO.

As mentioned above, independence of the sorts of alkaline earth oxides, differences in firing deformed amounts and matching of a glaze is observed and above all, CaO shows a specific property.

When CaO is used singly, a blank of good matching of a glaze and large firing deformed amount is obtained. To make the firing deformed amount small while the matching of a glaze maintained, a combined use of MgO or BaO with CaO is preferable. By contraries, at too small a ratio of CaO, both matching of a glaze and firing deformed amount worsen.

Incidentally, so that the desirable effect of the present invention is expected to be a maximum, even a combination of CaO and MgO is sufficient and by setting the mole ratio of them to about 1:1, a blank excellent in the matching of a glaze and small in firing deformed amount can be obtained.

Meanwhile, dolomite and various carbonates were used as addition source of alkaline earth oxides, but no difference dependent on the source in effect was observed.

Next, as clearly seen from a comparison between the blanks Nos. 11–15, the matching with a glaze greatly improves by increasing the amount of quartz in the raw material. On the other hand, the firing deformed amount increases.

And as clearly seen from a comparison between the blanks Nos. 21–25, the grain size of quartz used as raw material affects the matching with a glaze, firing deformation and thermal shock resistance. In other words, for too small grain size of quartz, a worsening tendency is observed in all, whereas the sintering property of blanks worsens for too great grain size.

From these it follows that the grain size and amount of quartz used as raw material should be set within an appropriate range corresponding to intended purposes.

Next, as observed in the blanks Nos. 26–30, the sintering temperature of blanks can be lowered by making the grain size of raw materials finer and a finer grain size is favorable for a reduction of firing deformed amount from the relation with the required amount of sintering assistant.

However, since the matching with a glaze and thermal shock resistance have a worsening tendency, an appropriate grain size setting corresponding to purposes and setting the amount of sintering assistant are necessary.

In the above, for blanks different in raw material and composition, the difference in strength, thermal shock resistance, matching with a glaze and firing deformed amount have been compared, but as described below, a point of view is possible that these differences result from the difference in firing method.

Figure 10:
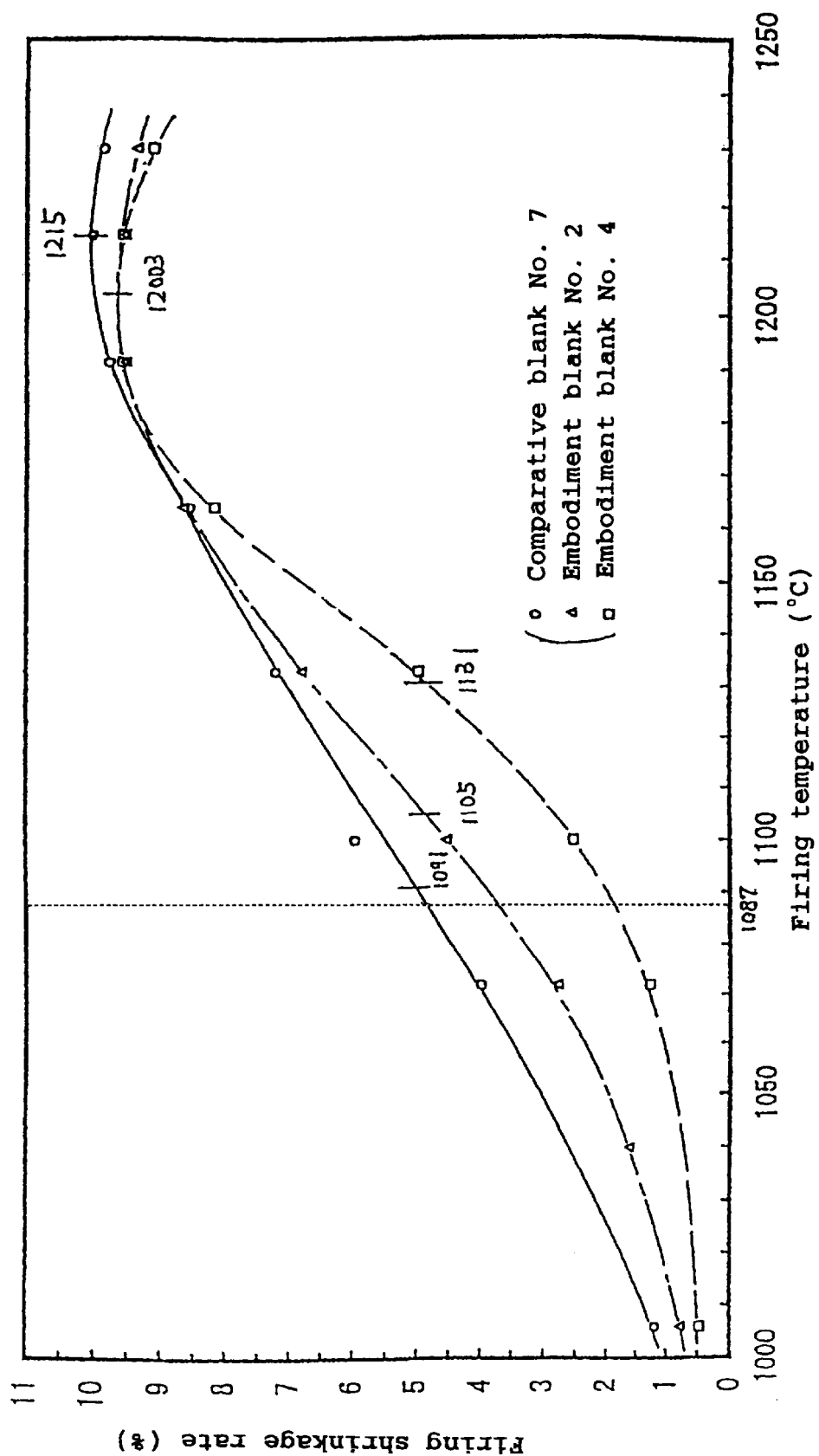
FIG. 10 is a graph showing the relationship between the firing temperature and the firing shrinkage rate for individual types of blanks according to the present invention.

To be specific, among the relations between the firing temperature and firing shrinkage rate for principal blanks shown in TABLE 22, those related to the comparative blank No. 7 and embodiment blanks Nos. 2 and 4 are shown in FIG. 10, which reveals that the temperature difference between the temperature at which the shrinkage rate of blank due to firing becomes maximum and the temperature at which the shrinkage rate of blank due to firing becomes a half of the maximum is 124° C. for the comparative blank No. 7 having a thermal shock resistance of 130ΔT (° C.), whereas the temperature difference is 98° C. and 82° C. respectively for the embodiment blanks Nos. 2 and 4 having a thermal shock resistance of 130 and 150ΔT (° C.), respectively. A relation is observed that thermal shock resistance is enhanced with a smaller temperature difference.

TABLE 22

| Firing temperature (° C.) | 1006 | 1040 | 1072 | 1100 | 1133 | 1164 | 1192 | 1215 | 1230 |
|---|---|---|---|---|---|---|---|---|---|
| (1) Comparative Blank No. 1 | | | | | | | | | |
| Water absorbing rate (%) | 22.5 | 20.3 | 16.9 | 12.7 | 17.2 | 1.24 | 0.04 | 0.04 | 0.11 |
| Firing shrinkage rate (%) | 0.44 | 1.3 | 12.75 | 5.03 | 17.42 | 9.49 | 9.92 | 9.63 | 9.04 |
| (2) Comparative Blank No. 7 | | | | | | | | | |
| Water absorbing rate (%) | 18.7 | | 12.9 | 9.35 | 6.46 | 3.05 | 0.10 | 0.06 | 0.05 |
| Firing shrinkage rate (%) | 1.17 | | 3.96 | 5.93 | 7.20 | 8.54 | 9.75 | 9.99 | 9.83 |
| (3) Embodiment Blank No. 2 | | | | | | | | | |
| Water absorbing rate (%) | 20.4 | 18.6 | 15.9 | 12.3 | 7.50 | 1.34 | 0.04 | 0.04 | 0.04 |
| Firing shrinkage rate (%) | 0.78 | 1.61 | 2.77 | 4.51 | 6.79 | 8.66 | 9.51 | 9.51 | 9.35 |
| (4) Embodiment Blank No. 4 | | | | | | | | | |
| Water absorbing rate (%) | 22.0 | | 19.9 | 17.0 | 11.7 | 4.10 | 0.06 | 0.03 | 0.03 |
| Firing shrinkage rate (%) | 0.46 | | 1.26 | 2.50 | 4.92 | 8.16 | 9.55 | 9.54 | 9.09 |

| Firing temperature (° C.) | 1030 | 1065 | 1095 | 1120 | 1150 | 1175 | 1200 | 1220 | 1238 |
|---|---|---|---|---|---|---|---|---|---|
| (5) Embodiment Blank No. 16 | | | | | | | | | |
| Water absorbing rate (%) | | 15.2 | 11.4 | 8.15 | 5.29 | 1.52 | 0.06 | 0.06 | 0.04 |
| Firing shrinkage rate (%) | | 3.10 | 4.95 | 6.45 | 7.70 | 9.21 | 9.73 | 9.85 | 9.80 |
| (6) Embodiment Blank No. 17 | | | | | | | | | |
| Water absorbing rate (%) | | 17.7 | 14.1 | 10.2 | 6.28 | 1.72 | 0.06 | 0.06 | 0.06 |
| Firing shrinkage rate (%) | | 1.91 | 3.72 | 5.50 | 7.29 | 9.10 | 9.72 | 9.80 | 9.80 |

| Firing temperature (° C.) | 1045 | 1081 | 1116 | 1150 | 1161 | 1170 | 1186 | 1200 | 1218 |
|---|---|---|---|---|---|---|---|---|---|
| (7) Embodiment Blank No 18 | | | | | | | | | |
| Water absorbing rate (%) | 18.5 | 14.2 | 9.57 | 5.22 | 3.03 | 0.88 | 0.08 | 0.05 | 0.03 |
| Firing shrinkage rate (%) | 1.55 | 3.60 | 5.78 | 7.74 | 8.65 | 9.72 | 9.72 | 9.88 | 9.74 |

| Firing temperature (° C.) | 1030 | 1065 | 1095 | 1120 | 1150 | 1175 | 1200 | 1220 | 1238 |
|---|---|---|---|---|---|---|---|---|---|
| (8) Embodiment Blank No. 19 | | | | | | | | | |
| Water absorbing rate (%) | | 18.6 | 15.9 | 11.9 | 6.70 | 0.65 | 0.07 | 0.06 | 0.05 |
| Firing shrinkage rate (%) | | 1.51 | 2.78 | 4.73 | 7.12 | 9.46 | 9.81 | 9.88 | 9.83 |
| (9) Embodiment Blank No. 20 | | | | | | | | | |
| Water absorbing rate (%) | 23.1 | 22.6 | 21.1 | 17.3 | 11.0 | 4.60 | 0.44 | 0.11 | 0.14 |
| Firing shrinkage rate (%) | 0.10 | 0.20 | 0.25 | 2.13 | 5.09 | 8.03 | 9.54 | 9.81 | 9.79 |
| (10) Embodiment Blank No. 37 | | | | | | | | | |
| Water absorbing rate (%) | 23.11 | 22.58 | 21.08 | 17.27 | 10.98 | 4.61 | 0.437 | 0.108 | 0.139 |

TABLE 22-continued

| | | | | | | | | | |
|---|---|---|---|---|---|---|---|---|---|
| Firing shrinkage rate (%) | 0.00 | 0.10 | 0.68 | 2.36 | 5.15 | 8.00 | 9.55 | 9.60 | 9.58 |

(11) Embodiment Blank No. 38

| | | | | | | | | | |
|---|---|---|---|---|---|---|---|---|---|
| Water absorbing rate (%) | 23.03 | 22.79 | 21.86 | 18.99 | 13.06 | 7.46 | 1.88 | 0.213 | 0.214 |
| Firing shrinkage rate (%) | 0.00 | 0.00 | 0.34 | 1.61 | 4.28 | 6.75 | 9.02 | 9.59 | 9.60 |

Incidentally, the temperature at which the shrinkage rate of blank due to firing becomes maximum means a firing temperature of 1215° C. at which the shrinkage rate becomes 10%, for example, in the comparative blank No. 7 and the temperature at which the shrinkage rate of blank due to firing becomes a half of the maximum means a temperature of 1091° C. at which the shrinkage rate becomes 5% also for comparative blank No. 7.

Figure 11:
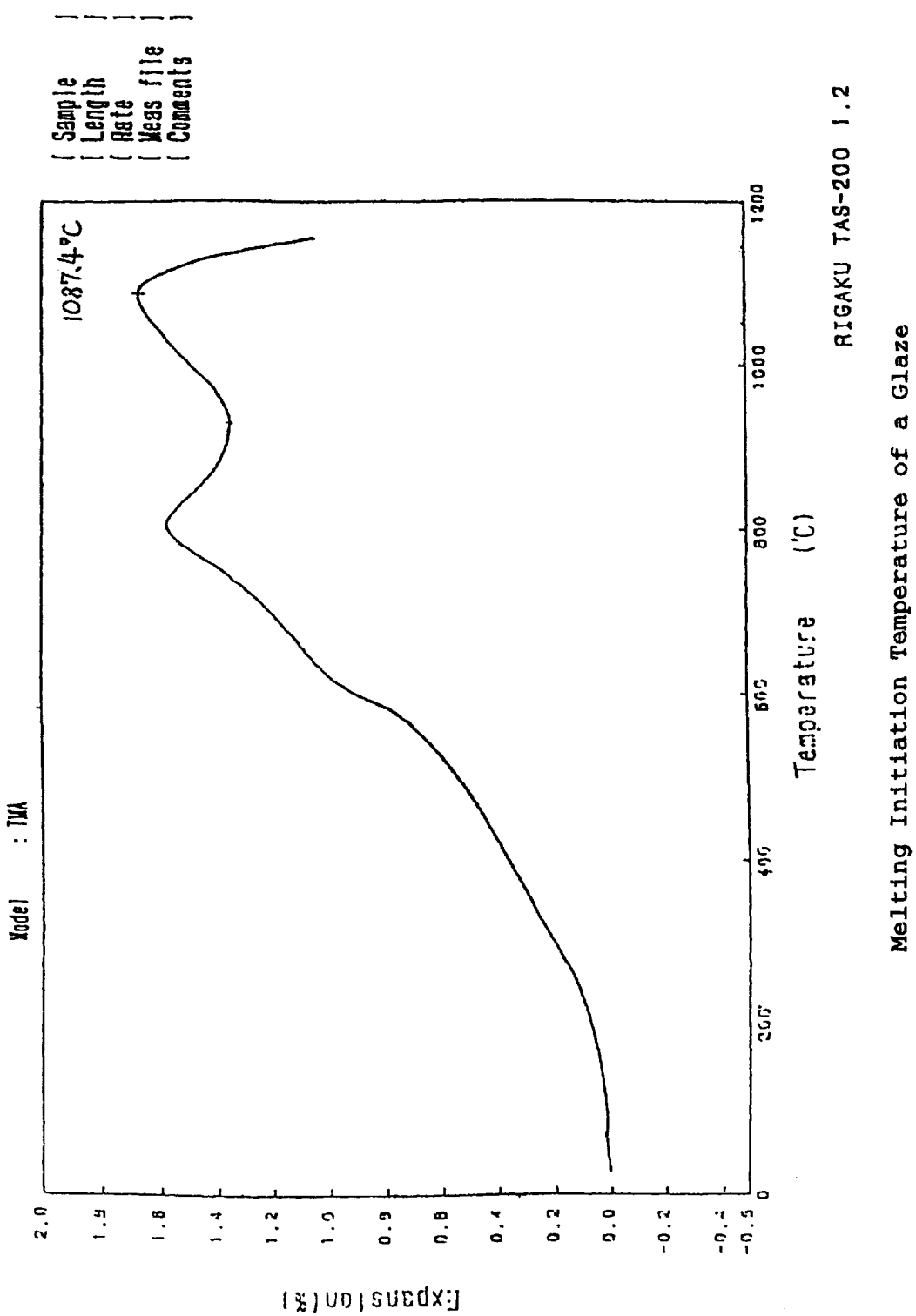
FIG. 11 is a graph showing the vitrification initiating temperature of a glaze used in the present invention.

And, the melting start temperature of the Bristle glaze used in the embodiments is 1087.4° C. as shown in FIG. 11 and the shrinkage rates of blanks at that time is 4.8% for the comparative blank No. 7 having a matching with a glaze of 38%, but 3.7% and 1.8%, respectively for the embodiment blanks No. 2 and 4 having respective matchings with a glaze of 63% and 94%. This reveals a relationship that the matching with a glaze is enhanced with a smaller shrinkage rate of blanks at the melting start temperature of the Bristle glaze, as shown in FIG. 10.

Figure 12:
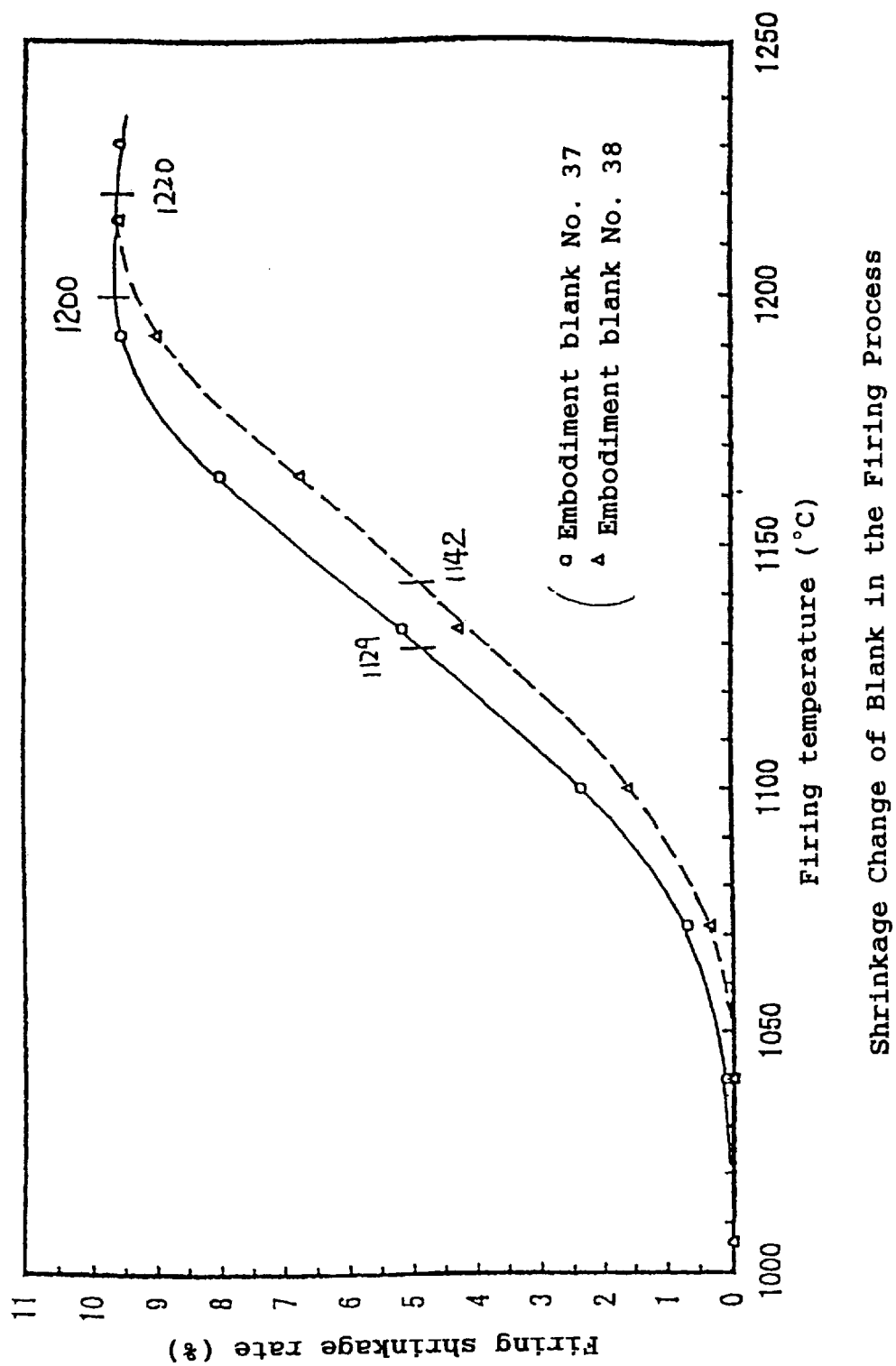
FIG. 12 is a graph showing the relationship between the firing temperature and the firing shrinkage rate for individual types of blanks according to the present invention.

Furthermore, FIG. 12 shows the relationship between the firing temperature and the firing shrinkage rate of the embodiment blanks Nos. 37 and 38 having a large firing deformed amount.

In these embodiment blanks Nos. 37 and 38, the temperature difference between the temperature at which the shrinkage rate of blank due to firing becomes maximum and the temperature at which the shrinkage rate of blank due to firing becomes a half of the maximum is 110° C. or smaller for both blanks, but the temperature difference for the embodiment blank No. 37 having a larger firing deformed amount is 71° C., below 75° C., whereas the temperature difference for the embodiment blank No. 38 having a smaller firing deformed amount is above 75° C. and below 110° C. A relationship is observed that if the temperature difference is within the range of 75° C. to 110° C., the firing deformed amount is small and otherwise the firing deformed amount becomes large.

Next, the results of TABLES 8–15 will be described.

The blanks Nos. 51–54 show the results of conventional blanks as comparative examples, the blanks Nos. 51–53 have a small shrinkage and deformation at the firing and are similar to those applied to large articles for sanitary ware in foreign countries. These blanks are very small in shrinkage and deformation but low in strength. In addition, when sanitary ware is produced by slurry slip molding, the degree of deposit-thickness speed during the molding affects the productivity. The greater the deposit-thickness speed is, the higher the productivity becomes because the molding is completed in a shorter period of time. To increase this deposit-thickness speed, there is a method which involves increasing the solid portion in the slurry, by using an emulsion-like slurry or by modifying the mixing of raw materials. The deposit-thickness speed was increased at identical mixing to the blank No. 51 in the blank No. 52 and at modified mixing in the blank No. 53 of slurry. Like these cases, when the deposit-thickness speed is increased the strength lowers in all methods.

On the other hand, except Nos. 57, 68 and 69, the blanks Nos. 55–74 are those exhibiting the effect according to the present invention, where Nos. 57, 68 and 69 are comparative examples.

Nos. 55–57 are blanks wherein alumina is used as raw material and the amount of sintering flux is modified, Nos. 58–60 are ones wherein alumina is used as raw material and the grain size of raw material is modified, Nos. 61 and 62 are ones wherein the amount of alumina used is modified, Nos. 63 and 64 are ones wherein alumina is used as raw material and the amount of silica sand used is modified, Nos. 65–69 are ones wherein fired alum shale is used as material source of corundum and mullite and the amount of sintering flux is modified, Nos. 70 and 71 are ones wherein fired alum shale is used as material, a raw material containing pyrophyllite as mineral is used and the amount of this raw material used is modified, Nos. 72 and 73 are ones wherein fired alum shale is used as material, chamotte raw material containing mullite as mineral is used and the amount of this raw material used is modified, and No. 74 is one wherein fired alum shale is used as raw material and chamotte raw material containing quartz as mineral and much alkaline oxides are used.

Even when a reduction of shrinkage amount and deformed amount are intended by using a raw material serving as source of corundum and dispersing particles of corundum in the blank to adjust the amount of sintering flux like these in the firing, a higher strength than that of the prior art can be maintained. In addition, by increasing the amount of corundum in the blank, the strength tends to increase but the deformed amount also tends to increase, so that it is required to properly set the amount of corundum by adjusting the mixed amount of a raw material serving as an introducing source of the corundum corresponding to the expected characteristics.

With respect to the grain size of raw materials for blank, a finer grain size is the more favorable for deformed amount and firing shrinkage rate. However, extra energy is necessary for grinding the raw materials to achieve the finer grain size.

Figure 13:
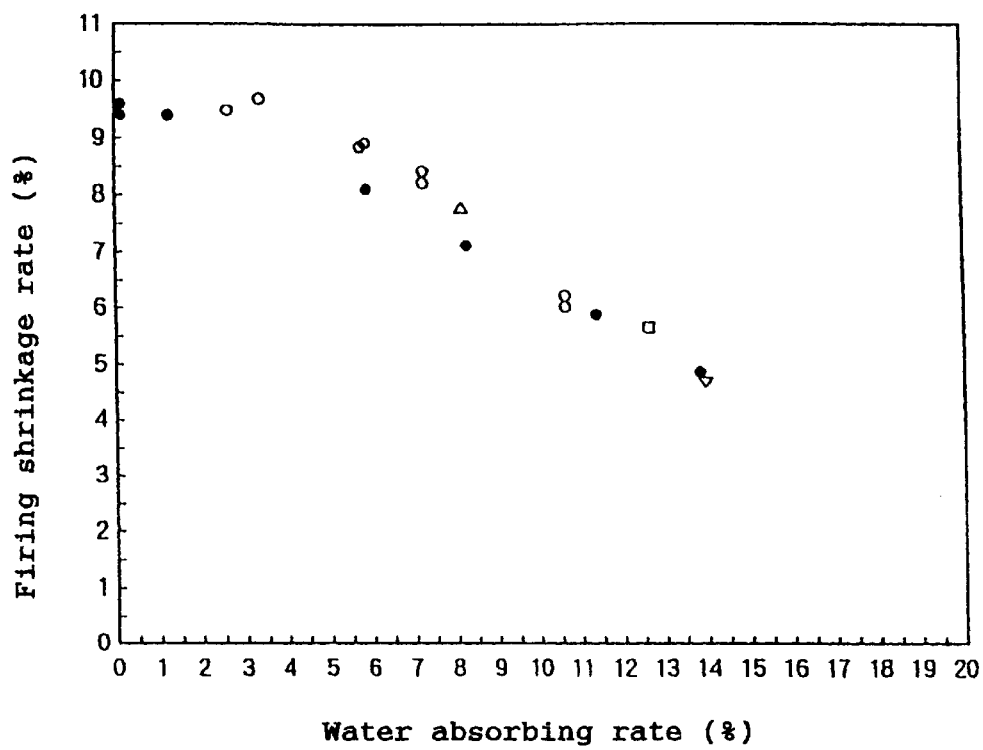
FIG. 13 is a graph showing the relationship between the water absorbing rate and the firing shrinkage rate.
Figure 14:
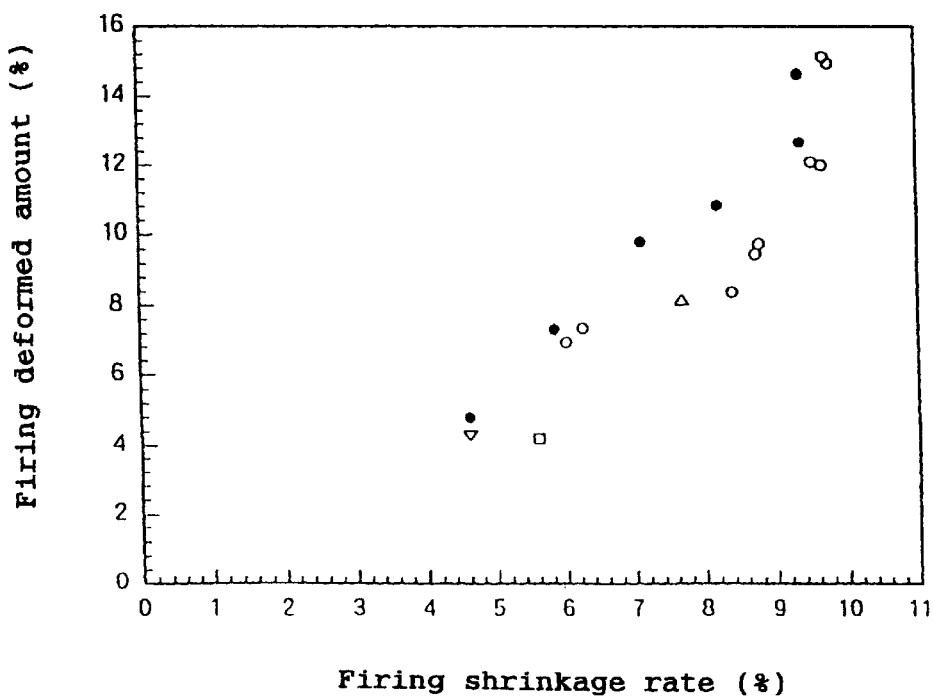
FIG. 14 is a graph showing the relationship between the firing shrinkage rate and the firing deformed amount.

Incidentally, FIG. 13 is a graph showing the relation between the water absorbing rate and the firing shrinkage rate, and FIG. 14 is a graph showing the relation between the firing shrinkage rate and the firing deformed amount. It is found from FIG. 13 that the water absorbing rate and the firing shrinkage rate are inversely proportional to each other and it is found from FIG. 14 that the firing shrinkage rate and the firing deformed amount are directly proportional to each other.

Meanwhile, generally as raw materials for ceramic blank, natural materials are used. Natural materials contain a mineral having water as bound water or constitutional water in various contents. The amount of such water is designated with Ig. Loss of a raw material and affects the final shrinkage amount or the like of blank at the firing. Both pyrophyllite raw material and chamotte raw material have a small Ig. Loss and are effective for a reduction of the firing shrinkage amount of blank, but chamotte raw material has hardly any Ig. Loss and accordingly is more favorable for a reduction of the firing shrinkage amount. On the other hand, pyrophyllite raw material has plasticity and accordingly is more favorable for the suppression of a decrease in plasticity. Anyway, use of these raw materials needs attention from the viewpoint of plasticity required for molding, but is sufficiently allowable only in the range of used amount shown in the embodiments.

It should be further noted in the use of chamotte material whether the quantity of alkaline material (alkaline earth conclusive) contained in the raw material is large or small. In order to minimize the firing shrinkage amount and the firing deformed amount, it is required to use a chamotte material containing as small quantity of alkaline material as possible.

When chamotte raw material abundant in alkaline material is used, it becomes difficult to set the amount of sintering flux in the whole blank for the present invention at 5 wt % or smaller. Also, if chamotte raw material abundant in alkaline is used, the softened amount of blank increases in the low-temperature region during the firing step, which increase is unfavorable for reduction of the firing deformed amount.

Chamotte raw material is roughly divided into material containing quartz as fired mineral of pottery stone or pagodite and material containing mullite obtained by firing of clay as a main mineral and partly containing quartz. As shown also in embodiments of the invention, use of the latter chamotte raw material is more favorable for the relation of shrinkage amount to deformed amount and strength.

The blanks Nos. 81, 85, 87, 89, 93, 98, 101, 105 and 109 have a firing shrinkage rate of 4% or lower and are not burn-tightened, so that the strength is 50 MPa or lower.

The blanks Nos. 82, 86, 99, 102, 106 and 112 have a firing shrinkage rate of 4% to 7%, and accordingly are not high-strength blanks, but probably pertain to low-deformed, low-shrunk blanks. In particular, the blanks Nos. 106 and 112 manifest a large deformed amount because the amount of flux does not pertain to the characteristics set forth in claim 31. Other blanks manifest a small deformed amount because the amount of flux pertains to the characteristics set forth in claim 31.

The blanks Nos. 83, 84, 88, 90, 92, 94, 96, 100, 103, 104, 107, 108, 110 and 111 have a firing shrinkage rate of 7% or higher and accordingly are probable to pertain to a high-strength blanks and/or low-deformed low-shrunk blanks. Among them, the blanks No. 83 satisfies all of claims 8, 12 and 31 and accordingly is a high-strength, low-deformed and low-shrunk blank. The blanks Nos. 84, 87, 90, 100 and 103 pertain to claims 8 and 12 but do not pertain to claim 31 and accordingly are high-strength blanks but are not low-deformed low-shrunk blanks. The blanks Nos. 91, 94, 104 and 107 do not pertain to claim 31 and accordingly are not low-deformed, low-shrunk blanks. They do, however, pertain to claim 8, but do not pertain to claim 12 and accordingly are high-strength, highly deformed blanks. Furthermore, the blanks Nos. 88, 92, 95, 96, 108, 110, 111 and 112 do not pertain to claim 31 and accordingly are also not low-deformed low-shrunk blanks. They do, however, pertain to claim 8, but not to claim 12 and accordingly ought to be high-strength highly deformed blanks, but lower in strength because of bubble formation due to excessive burning.

Incidentally, if fired at the most suitable temperatures of 1100° C.–1200° C., the blank No. 110 would have a high strength of 100 MPa or higher.

TABLE 23 mentioned below shows the test result obtained when a starting slurry was prepared in the same mixing ratio as with the blank No. 20 and a test piece was made using a plaster mold by the slurry slip molding. With increasing concentration of slurry at a constant viscosity, the wet strength and dry strength increase and the dry shrinkage rate decreases. However, at too high concentration, the viscosity of slurry cannot be lowered. When the viscosity of slurry becomes higher than 1000 cp, the flow of slurry worsens and filling of slurry into a mold during the slurry slip molding becomes difficult.

TABLE 23

| Concentration (vol %) | 40 | 45 | 47 | 50 | 55 |
|---|---|---|---|---|---|
| Starting slurry viscosity (cp) | 530 | 540 | 580 | 650 | 1120 |
| Wet strength (kPa) | 170 | 248 | 321 | 355 | 340 |
| Dry shrinkage rate (%) | 3.6 | 2.8 | 2.4 | 2.1 | 2.2 |
| Dry strength (MPa) | 3.2 | 3.9 | 4.4 | 4.5 | 4.7 |

[Advantage of the Invention]

As described above, ceramic blanks according to the present invention enable the blank strength to be made higher and the firing deformed amount and firing shrinkage amount to be made smaller than those of conventional ceramic blanks. In addition, the degree of freedom in design of products such as designing property, scaling up, dimensional accuracy and lightweight property widens. Furthermore, the productivity of large-sized products such as stools, urinals and washbowls is promoted.

And still, ceramic blanks according to the present invention manifest an excellent deposit-thickness speed in cast molding and do not undergo a lowered productivity, unlike conventional blanks.

INDUSTRIAL APPLICABILITY

Ceramics, ceramic blanks, production methods thereof, sanitary ware and production method thereof according to the present invention are contributable to the production of products such as a stool, urinal, urinal tank and washbowl.

Although the invention is described above in terms of the presently preferred embodiments, it will be understood by those skilled in the art that variations and modifications may be made thereto without departing from the spirit, gist or essence thereof. The scope of the invention is indicated by the appended claims, rather than by the foregoing description.

What is claimed is:

1. A ceramic object comprising a glaze applied to a surface of a ceramic blank comprising crystal and glass phases with alkali oxides and alkaline earth oxides contained in the glass phase, wherein a mole ratio of alkaline earth oxides to the total amount of alkali oxides and alkaline earth oxides is 30 mol % or higher, and comprising quartz in said crystal phase, said blank having a least one of a bending strength of 100 MPa or higher and a firing shrinkage rate of 7% or higher, the ceramic blank having a porosity of 7.5% or higher, said object having at least one of a thermal shock resistance of 120° C., a firing shrinkage rate of 12% or lower, a firing deformed amount of 25 mm or smaller and a deformed amount after reheating at 1200° C. of 15 mm or smaller.

2. A ceramic object as set forth in claim 1 having a water absorbing rate of 3% or lower.

3. A ceramic object as set forth in claim 1 having a crystal phase which contains corundum.

4. A ceramic object as set forth in claim 1 which is obtained by molding the object by a slurry slip molding method and thereafter firing the molded object.

5. A ceramic object as set forth in claim 4 which is sanitary ware.

6. A method for producing the ceramic as defined in claim 1 comprising the steps of molding a starting slurry by a slurry slip molding and thereafter firing a molded object, wherein for a concentration of the starting slurry, letting the total starting slurry have a volume ratio of 100, a starting solid portion is 42–52% and a viscosity of the starting slurry is 1000cp or lower.

7. A ceramic blank comprising crystal and glass phases with alkali oxides and alkaline earth oxides contained in the glass phase, wherein a mole ratio of alkaline earth oxides to the total amount of alkali oxides and alkaline earth oxides is 30 mol % or higher, and comprising quartz in said crystal phase.

8. A ceramic blank as set forth in claim 7, wherein said crystal phase also contains corundum.

9. A ceramic blank as set forth in claim 8, further including a glaze applied to the surface thereof.

10. A ceramic blank as set forth in claim 9 wherein the blank is fired so that a firing shrinkage rate of the blank reaches 7% or higher.

11. A ceramic blank as set forth in claim 10 wherein a total amount (wt %) of alkali oxides and alkaline earth oxides contained in the blank, relative to the whole blank, is controlled corresponding to firing temperatures as follows:
7 wt % or lower for firing below 1200°;
5 wt % or lower for firing at temperatures ranging from 1200° C. to 1300° C. exclusive;
4 wt % or lower for firing at temperatures ranging from 1300° C. to 1400° C. exclusive; and
2.5 wt % or lower for firing at or above 1400° C.

12. A ceramic blank as set forth in claim 11 wherein the mole ratio of alkali earth oxides relative to the total amount of alkali oxides and alkaline earth oxides in the ceramic blank is in a range of 30 mol %–70 mol % inclusive.

13. A ceramic blank as set forth in claim 7 comprising 25–75 wt % glass phase and 30–70 wt % crystal phase wherein the glass phase comprises of 50–80 wt % $SiO_2$ and 10–35 wt % $Al_2O_3$ and the crystal phase comprises of 10–60 wt % corundum, 1–30 wt % mullite and 1–30 wt % quartz.

14. A ceramic blank as set forth in claim 6 wherein the alkaline earth oxides comprise 20–80 mol % CaO.

15. A ceramic blank as set forth in claim 7 wherein a raw material comprising corundum as principal mineral or a raw material which generates corundum after firing, clay material and sintering assistant material are employed as main raw materials in forming the blank through steps of moldings, drying and firing, and at least one of quartz material and pottery stone material is added to the main raw materials prior to molding, and said sintering assistant material is selected from the group consisting of at least one of dolomite, calcium carbonate, magnesium carbonate, barium carbonate, strontium carbonate and magnesium hydroxide.

16. A ceramic blank as set forth in claim 15 wherein, letting the whole raw material content of the blank be 100, the total content of corundum, mullite and quartz amounts of the raw material content is 60 wt % or smaller.

17. A ceramic blank as set forth in claim 15 wherein an average grain size of all of the raw materials employed in forming the blank is 1–10 µm.

18. A ceramic blank as set forth in claim 15 wherein an average grain size of quartz added to the main raw materials is 25 µm or smaller.

19. Sanitary ware comprising a ceramic blank as set forth in claim 7.

20. Sanitary ware as set forth in claim 19 having an average wall thinkness of 20 mm or smaller.

21. Sanitary ware as set forth in claim 20, which is a urinal and has an average wall thickness of 16 mm or smaller.

22. Sanitary ware as set forth in claim 20, which is one of a stool and a urinal tank, and has an average wall thickness of 9 mm or smaller.

23. Sanitary ware as set forth in claim 20, which is a washbowl having an average wall thickness of 13 mm or smaller.

24. Sanitary ware as set forth in claim 20, wherein the sanitary ware has a dimension defined by the sum of height, width and depth thereof which is less than 1600 mm, and has an average thickness of 12 mm or smaller.

25. Sanitary ware as set forth in claim 20, wherein the sanitary ware has a dimension defined by the sum of height, width and depth thereof which is 1600 mm or larger, and has an average wall thickness is of 16 mm or smaller.

26. Sanitary ware as set forth in claim 20, wherein the sanitary ware has a dimension defined by the sum of height, width and depth thereof which is 2000 mm or larger.

27. Sanitary ware as set forth in claim 26, wherein a ratio of an area of a single-wall portion thereof molded by sludge slip molding to an area of a double-wall portion thereof molded by solid slip molding is 0.5 or lower.

28. Sanitary ware as set forth in claim 20, including a portion with a hole for water to pass through, and a thickiness of the portion around the hole is thicker than a thickness of other portions thereof.

29. Sanitary ware as set forth in claim 20, wherein a ratio of an average thickness for a double-wall portion molded by solid slip molding to an average thickness for a single-wall portion molded by sludge slip molding is 1.0 to 2.0.

30. A ceramic blank comprising the glass phase and the crystal phase with corundum and quartz contained in main constituents of the crystal phase, wherein the blank is sintered by firing and a difference between a temperature at which the firing shrinkage rate of the aforesaid blank becomes maximum and a temperature at which the firing shrinkage rate becomes half of the aforesaid maximum is controlled to be 110° C. or lower.

31. A ceramic blank as set forth in claim 30, wherein the difference between the temperature at which the firing shrinkage rate of the aforesaid blank becomes maximum and the temperature at which the firing shrinkage rate becomes half of the aforesaid maximum is controlled to be in a range from 75° C. to 110° C. inclusive.

32. A method for producing the ceramic blank as defined in claim 20 comprising glass phase and crystal phase with corundum and quartz contained as main constituents of the crystal phase, said method comprising steps of molding, drying and sintering by firing the blank, wherein said sintering step involves controlling a firing temperature such that a difference between a temperature at which a firing shrinkage rate of the blank becomes maximum and a temperature at which the firing shrinkage rate of the blank reaches a half of the maximum shrinkage rate is 110° C. or less.

33. A method for producing ceramic blank as set forth in claim 32, wherein the difference between the temperature at which the firing shrinkage rate of the aforesaid blank becomes maximum and the temperature at which the firing shrinkage rate becomes half of the aforesaid maximum is controlled to be in a range from 75° C. to 110° C. inclusive.

34. A ceramic blank comprising glass phase and crystal phase with corundum and quartz contained as main constituents of the crystal phase and with a glaze applied to a surface of the blanks wherein the blank is sintered by firing and wherein compositions of the ceramic blank and the glaze are such that a firing shrinkage rate of the blank at a temperature where the aforesaid glaze begins to melt or shrink is 4.5% or lower.

35. A method for producing a ceramic blank as defined in claim 22 comprising glass phase and crystal phase with corundum and quartz contained as main constituents of the crystal phase, the method comprising the steps of applying a glaze to a surface of the blank and thereafter sintering the blank by firing, wherein compositions of the ceramic blank and the glaze are controlled such that the glaze begins to melt or shrink at a time where the firing shrinkage rate of the aforesaid blank is 4.5% or lower.

36. A ceramic blank comprising glass phase and crystal phase with alumina contained in the crystal phase being entirely present as composite minerals with other minerals, and alkali oxides and alkaline earth oxides contained in the glass phase, wherein a total amount of alkali oxides and alkaline earth oxides relative to the whole blank is 5.5 wt % or lower and an average grain size of raw materials used in forming the blank is 7 µm or smaller.

37. A ceramic blank comprising crystal and glass phases with alkali oxides and alkaline earth oxides contained in the glass phase wherein a total amount (wt %) of alkali oxides and alkaline earth oxides relative to the whole blank is controlled corresponding to firing temperatures as follows:

7 wt % or lower for firing at temperatures ranging from 1100° C. to 1130° C. exclusive;

6 wt % or lower for firing at temperatures ranging from 1130° C. to 1170° C. exclusive;

3.5 wt % or lower for firing at temperatures ranging from 1170° C. to 1200° C. exclusive; and 3 wt % or lower for firing at temperatures ranging from 120° C. to 1300° C. exclusive;

2 wt % or lower for firing at temperatures ranging from 1300° C. to 1400° C. exclusive; and 1.5 wt % or lower for firing at temperatures at or above 1400° C.

38. A ceramic blank as set forth in claim 37 wherein corundum is contained in the crystal phase.

39. A ceramic blank as set forth in claim 38, wherein mullite is contained in the crystal phase in the amount of 10 wt % or higher.

40. A ceramic blank as set forth in claim 37 further comprising a glaze applied to a surface thereof.

41. A ceramic blank comprising glass phase and crystal phase with corundum contained as a main constituent of the crystal phase, the glass phase containing alkali oxides and alkaline earth oxides with $SiO_2$ as a main constituent, and said crystal phase further contains chamotte raw material is contained as raw material, said chamotte raw material being mullite chamotte.

42. A ceramic blank as set forth in claim 41 wherein the content of the chamotte raw material is 10 wt % or higher relative to the whole blank.

43. A ceramic blank as set forth in claim 42 wherein pyrophyllite is also contained as the raw material, and the content of the pyrophyllite is 10 wt % or higher relative to the whole blank.

44. A ceramic blank as set forth in claim 41 wherein a raw material comprising corundum or a raw material which generates corundum after firing, clay material and sintering assistant material are employed as main raw materials of the blank, at least one of quartz material and pottery stone material is added to the main raw materials, molding and drying of the blank are performed wherein all of the raw materials have an average grain size of 10 µm or smaller, and a glaze is coated on a surface of the blank, and optionally firing, after the glazing.

45. A ceramic object comprising (1) a ceramic blank and (2) a glaze applied to a surface of the ceramic blank, wherein:

the ceramic blank comprises a crystal phase having mullite and quartz as main components, a glass phase having $SiO_2$ and $Al_2O_3$ as main components, and another crystal phase including at least one of cristobalite and corundum;

said ceramic blank includes 50–70 wt % $SiO_2$ and 30–50 wt % $Al_2O^3$ as main components, alkali oxides and alkaline earth oxides; and the ceramic blank having at least two of a bending strength of 50 MPa or higher, a porosity of 15% or higher, a firing shrinkage rate of 9% or lower, a firing deformed amount of 10 mm or smaller, a deformed amount after reheating at 1200° C. of 5 mm or smaller, and a bulk density of 2.4 $g/cm^3$.

46. A ceramic object as spt forth in claim 45, wherein the ceramic object is molded by slip slurry casting and is sintered.

47. A ceramic object as set forth in claim 45, wherein the ceramic object is sanitary ware.

48. A ceramic object as set forth in claim 45, wherein the ceramic blank has at least three of a bending strength of 50 MPa or higher, a porosity of 15% or higher, a firing shrinkage rate of 9% or lower, a firing deformed amount of 10 mm or smaller, a deformed amount after reheating at 1200° C. of 5 mm or smaller, and a bulk density of 2.4 $g/cm^3$.

49. A ceramic object as set forth in claim 45, wherein the ceramic blank has at least four of a bending strength of 50 MPa or higher, a porosity of 15% or higher, a firing shrinkage rate of 9% or lower, a firing deformed amount of 10 mm or smaller, a deformed amount after reheating at 1200° C. of 5 mm or smaller, and a bulk density of 2.4 $g/cm^3$.

* * * * *

UNITED STATES PATENT AND TRADEMARK OFFICE
CERTIFICATE OF CORRECTION

PATENT NO.     : 6,242,117 B1
DATED          : June 5, 2001
INVENTOR(S)    : N. Koga, M. Taneo, M. Yasuda, S. Tateyama, A. Matsumoto, T. Nishikawa,
                 M. Otsu and F. Hongo It is certified that error appears in the above-identified patent and that said Letters Patent is hereby corrected as shown below:

Title page,
Item [56], under References Cited, further under "FOREIGN PATENT DOCUMENTS", change "41-14814" to -- 41-14914 --.

Column 1,
Line 30, change "after the" to -- subsequent to --.
Line 45, after "materials" insert a period.

Column 2,
Line 21, before "quartz" insert -- the --.
Line 32, after "uses" insert -- as --.
Line 41, after "such" insert -- as --.
Line 52, change "alumima" to -- alumina --.

Column 3,
Line 24, change "mainly" to -- with a main --.
Line 48, change "shrunk" to -- shrinkage --.
Line 58, change "shrunk" to -- shrinkage --.
Line 65, change "shrunk" to -- shrinkage --.

Column 4,
Line 28, after "products" insert a comma.

Column 5,
Line 12, after "herein" insert a comma.
Line 13, before " "ceramics" " insert -- the term --.

Column 6,
Line 17, after "with alkaline" insert -- (or alkali) -- .
Line 21, after "higher." insert the sentence -- As used herein the language "alkaline oxides" is used interchangeably with "alkali oxides". --.
Line 49, after "ceramic" insert -- blank --.
Line 50, delete "is".

Column 7,
Line 23, change "blank, and for" to -- blank and, for --.
Line 50, after "that" insert a comma.
Line 54, delete "also"; after "that" insert a comma.
Line 67, change "to generate" to -- which generates --.

UNITED STATES PATENT AND TRADEMARK OFFICE
CERTIFICATE OF CORRECTION

PATENT NO.   : 6,242,117 B1
DATED        : June 5, 2001
INVENTOR(S)  : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Column 8,
Line 9, change "A12O$_3$" to -- A1$_2$O$_3$ --.
Line 27, delete "is".
Lines 61-62, delete "of claim 20".

Column 9,
Line 30, change "a" to -- an --.

Column 10,
Line 45, delete "is".

Column 13,
Line 5, after "amount" insert -- of --.

Columns 13-14,
"TABLE 2", under the title "TABLE 2" insert the line -- Bristle Glaze Composition --.

Columns 15-16,
"TABLE 3 - continued", in the 17th line of data (in the line beginning with "Glass phase"), under Blank No. 4, change "5o" to -- 50 --;
in the 29th line of data (in the line beginning with "Mullite" under the subheading "Contained minerals"), under Blank No. 8, change "10" to -- 18 --;
"TABLE 3 - continued" (continued), for the 34th line of data (in the line beginning with "Thermal shock resistance" under the subheading "Blank physical properties"), change "ΔT(C)" to -- ΔT (°C) --;
in the 36th line of data (in the line beginning with "Firing shrinkage rate" under the subheading "Blank physical properties"), under Blank Nos. 2 and 3, change "I0.8 I0.1" to -- 10.8 10.1 --;
"TABLE 4", in what should be the 10th line of data (in the line beginning with "Calcite"), under each of Blank Nos. 12 through 21, insert -- — -- (insert a dash).

Column 17-18,
"TABLE 4 - continued", for the 27th line of data (in the line beginning with "Thermal shock resistance" under the subheading "Blank physical properties"), change "ΔT(C)" to -- ΔT (°C) --;
under the table in the first footnote, after "Corundum" insert a comma.

UNITED STATES PATENT AND TRADEMARK OFFICE
CERTIFICATE OF CORRECTION

PATENT NO.    : 6,242,117 B1
DATED         : June 5, 2001
INVENTOR(S)   : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Columns 19-20,
"TABLE 5 - continued", in the 17th line of data, under the subheading "Blank physical properties", change "Water absorbing rate p (%)" to -- Water absorbing rate (%) --;
    for the 20th line of data (in the line beginning with "Thermal shock resistance" under the subheading "Blank physical properties"), change "ΔT(C)" to -- ΔT (°C) --.

Columns 21-22,
"TABLE 6 - continued", in the 12th line of data, under the subheading "Blank physical properties", change "Water absorbing rateB (%)" to -- Water absorbing rate (%) --;
    for the 15th line of data (in the line beginning with "Thermal shock resistance" under the subheading "Blank physical properties"), change "ΔT(C)" to -- ΔT (°C) --.
"TABLE 7", in the 7th line of data (in the line beginning with "Feldspar" under the subheading "Presence of raw material mixing ( ○ – presence)"), under Blank No. 41, change "b" to -- ○ --;
"TABLE 7", in the 11th line of data (in the line beginning with "Barium carbonate" under the subheading "Presence of raw material mixing (○ – presence)"), under each of Blank Nos. 43, 44, and 45, change "0" to -- ○ --.

Columns 23-24,
"TABLE 7 - continued", in the 4th line of data, under the subheading "Blank physical properties", change "Water absorbing rateB %" to -- Water absorbing rate (%) --;
    between the 6th and 7th lines of data (after the line that begins with "Firing deformation (mm)"), insert the following line of data: -- Thermal shock resistance ΔT (°C) 140 140 130 130 120 130 140 140 120 --.
"TABLE 8", in the 1st line of data (in the line beginning with "Pottery stone" under the subheading "Presence of raw material mixing (○ – presence)"), under Blank No. 53 delete "○", and under Blank No. 54 insert -- ○ --;
    for the 20th line of data (in the line beginning with "Deposit-thickness"), change "10-4 cm$^2$/s" to -- $10^{-4}$ cm$^2$/s --;
    in the 27th line of data (in the line beginning with "K$_2$O" under the subheading "Chemical composition of the glass phase"), under Blank No. 58, change "2.t9" to -- 2.19 --;
    in the 32nd line of data (in the line beginning with "Quartz" under the subheading "Contained minerals"), under Blank No. 58, change "5.6" to -- 8.6 --.

UNITED STATES PATENT AND TRADEMARK OFFICE
CERTIFICATE OF CORRECTION

PATENT NO. : 6,242,117 B1
DATED : June 5, 2001
INVENTOR(S) : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Columns 25-26,
"TABLE 8 - continued", for the 1st line of data, after "Thermal shock resistance" change "(°C.)" to -- $\Delta T$ (°C) --.
"TABLE 9", for the 20th line of data, change "Deposit thickness speed constant (10-4 $cm^2$/s)" to -- Deposit-thickness speed constant ($10^{-4}$ $cm^2$/s) --;
      for the 35th line of data, change "sbrinkage" to -- shrinkage --;
      for the 38th line of data (in the line beginning with "Thermal shock resistance" under the subheading "Blank physical properties"), change "(°C.)" to -- $\Delta T$ (°C) --;
      for the 41st line of data, change "(g/$cm^2$)" to -- (g/$cm^3$) --.

Column 27,
"TABLE 10", for the 20th line of data, change "(10-4 $cm^2$/s)" to -- ($10^{-4}$ $cm^2$/s) --.

Column 28,
Line 31, after "Thermal shock resistance" change "(°C.)" to -- $\Delta T$ (°C) --.

Column 29-30,
Under "TABLE 11 - continued", in footnote number 4, change "resistsnce" to -- resistance --;
      in footnote number 4, change "messured" to -- measured --.

Columns 31-32,
Under "TABLE 12 - continued" in footnote number 4, change "heen" to -- been --;
      in footnote number 5, change "heen" to -- been --.
"TABLE 13", in the heading above the data table, change "Blank No" to -- Blank No" to -- Blank No. --;
      in the subheading above the first line of data table, change "mixing ○ – presence)" to -- mixing (○ – presence) --.

Columns 33-34,
"TABLE 13 - continued", in the heading above the continued data table, change "Blank No" to -- Blank No. --;
      in the 17th line of data (in the line beginning with "Alkaline earth mole ratio[3]" under the subheading "Blank composition (wt%)"), under Blank No. 103, change "72.161" to -- 72.161 -- (change the final digit from small letter "l" to numeral "1");
"TABLE 13 - continued" (continued), for the 33rd line of data (in the line beginning with "Thermal shock resistance" under the subheading "Blank physical properties"), change "$\Delta T(C)^4$" to -- $\Delta T$ (°C)[4] --;
      for the 34th line of data (in the line beginning with "Glaze matching" under the subheading "Blank physical properties"), change "(%)" to -- (%)[5] --.

UNITED STATES PATENT AND TRADEMARK OFFICE
CERTIFICATE OF CORRECTION

PATENT NO. : 6,242,117 B1
DATED : June 5, 2001
INVENTOR(S) : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Columns 33-34 cont'd,
"TABLE 14", in the subheading above the first line of data, change "mixing ○ – presence)" to -- mixing (○ – presence) --.

Columns 35-36,
"TABLE 14 - continued", for the 34th line of data (in the line beginning with "Firing deformation (mm)" under the subheading "Blank physical properties"), under Blank No. 107, change "312" to -- 31.2 --;
for the 36th line of data (in the line beginning with "Thermal shock resistance" under the subheading "Blank pyhsical properties"), change "$\Delta T(C)^{4}$" to -- $\Delta T\ (^{\circ}C)^{4}$ --.
"TABLE 15", in the subheading above the first line of data, change "mixing ○ – presence)" to -- mixing (○ – presence) --.

Column 38,
Approximately line 21, in "TABLE 17", in the table heading, change "in Ceramic blank" to -- with Conventional Ceramic blank --.

Column 39,
Line 16, change "(thickness 1." to -- (thickness 1 ÷ --.
Approximately line 40, in "TABLE 18", in the subheading above the first line of data, change "mixing ○ – presence)" to -- mixing (○ – presence) --.

Column 41,
Line 67, change "leads" to -- lead --.

Column 42,
Line 9, before "hand" insert -- other --.
Line 19, change "FIG." to -- FIGs. --.
Line 42, change "dence of" to -- dence on --.
Line 50, change "independence" to -- in dependence --.

Column 44,
"TABLE 22", for the 1st line of data (in the line beginning with "Water absorbing rate (%)" under the subheading "(1) Comparative Blank No. 1"), under Firing temperature 1133°C, change "17.2" to -- 7.2 --;
for the 2nd line of data (in the line beginning with "Firing shrinkage rate (%)" under the subheading "(1) Comparative Blank No. 1"), under Firing temperature 1072°C, change "12.75" to -- 2.75 --;
under Firing temperature 1133°C, change "17.42" to -- 7.42 --;
above the 13th line data, change the subheading "(7) Embodiment Blank No 18" to -- (7) Embodiment Blank No. 18 --.

UNITED STATES PATENT AND TRADEMARK OFFICE
CERTIFICATE OF CORRECTION

PATENT NO. : 6,242,117 B1
DATED : June 5, 2001
INVENTOR(S) : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Column 45,
Between lines 21 and 22, after "respectively" insert a comma.
Approximately line 26, change "FIG. 10" to -- FIG. 11 --.

Column 46,
Line 57, after "material" insert -- Ig occurs --.
Line 60, change "Loss and are" to -- Minimizing losses of raw material Ig is --.
Line 62, change "Loss and accordingly" to -- Accordingly, use of chamotte --.

Column 47,
Line 39, change "a high-" to -- high- --.
Line 41, change "blanks" to -- blank --.

Column 48,
Line 66, after "starting" insert -- ceramic --.

Column 49,
Line 21, change "1200º" to -- 1200ºC --.
Line 28, "alkali" to -- alkaline --.
Between lines 35 and 36, change "claim 6" to -- claim 7 --.
Line 42, change "moldings" to -- molding --.

Column 50,
Line 11, delete "is".
Line 20, change "thicki-" to -- thick- --.
Line 42, change "claim 20" to -- claim 30 --.
Line 61, change "blanks" to -- blank --.
Line 67, change "claim 22" to -- claim 34 --.

Column 51,
Line 29, change "120ºC." to -- 1200ºC. --.
Lines 45-46, delete "is contained".

UNITED STATES PATENT AND TRADEMARK OFFICE
CERTIFICATE OF CORRECTION

PATENT NO.   : 6,242,117 B1
DATED        : June 5, 2001
INVENTOR(S)  : N. Koga, M. Taneo, M. Yasuda, S. Tateyama, A. Matsumoto, T. Nishikawa, M. Otsu and F. Hongo It is certified that error appears in the above-identified patent and that said Letters Patent is hereby corrected as shown below:

Column 52,
Line 12, after "firing" delete the comma.
Line 22, change "Al$_2$O$^3$" to -- Al$_2$O$_3$ --.
Line 30, change "spt" to -- set --.

Signed and Sealed this

Twenty-third Day of July, 2002

Attest:

JAMES E. ROGAN
Attesting Officer    Director of the United States Patent and Trademark Office